(12) United States Patent
Aoyama et al.

(10) Patent No.: US 10,514,137 B2
(45) Date of Patent: Dec. 24, 2019

(54) JOINING STRUCTURE OF LIGHT EMITTING UNITS

(71) Applicant: Semiconductor Energy Laboratory Co., Ltd., Atsugi-shi, Kanagawa-ken (JP)

(72) Inventors: Tomoya Aoyama, Kanagawa (JP); Yasuhiro Jinbo, Kanagawa (JP); Yoshiharu Hirakata, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 122 days.

(21) Appl. No.: 15/890,396

(22) Filed: Feb. 7, 2018

(65) Prior Publication Data

US 2018/0172222 A1    Jun. 21, 2018

Related U.S. Application Data

(63) Continuation of application No. 14/618,131, filed on Feb. 10, 2015, now Pat. No. 9,909,725.

(30) Foreign Application Priority Data

Feb. 14, 2014 (JP) .................... 2014-026273

(51) Int. Cl.
*F21L 4/02* (2006.01)
*F21V 21/005* (2006.01)
(Continued)

(52) U.S. Cl.
CPC . *F21L 4/00* (2013.01); *F21S 4/22* (2016.01); *F21V 21/145* (2013.01);
(Continued)

(58) Field of Classification Search
CPC ...... G02F 1/13336; F21V 21/145; F21L 4/22; F21L 4/00
See application file for complete search history.

(56) References Cited

U.S. PATENT DOCUMENTS 4,467,854 A    8/1984   Godfrey
4,559,727 A    12/1985  Lewyt
(Continued)

FOREIGN PATENT DOCUMENTS

EP    0899651 A    3/1999
EP    2039398 A    3/2009
(Continued)

OTHER PUBLICATIONS

Taiwanese Office Action (Application No. 104103935) dated Jun. 15, 2018.

*Primary Examiner* — Karabi Guharay
(74) *Attorney, Agent, or Firm* — Fish & Richardson P.C.

(57) ABSTRACT

An object of this invention is to provide a highly portable light-emitting device or a highly browsable light-emitting device. The light-emitting device includes a joint portion, and a plurality of light-emitting units apart from each other with the joint portion positioned therebetween. The joint portion and the light-emitting units are flexible. The joint portion can be bent to a curvature radius smaller than a curvature radius to which the light-emitting unit can be bent. The light-emitting unit is supplied with a signal through a side not adjacent to the joint portion or is supplied with a signal by wireless communication.

18 Claims, 22 Drawing Sheets

(51) Int. Cl.
  *F21L 4/00* (2006.01)
  *F21V 21/14* (2006.01)
  *F21S 4/22* (2016.01)
  *H05B 37/02* (2006.01)
  *F21V 15/015* (2006.01)
  *F21W 121/00* (2006.01)
  *F21Y 105/00* (2016.01)
  *F21Y 115/10* (2016.01)
  *F21Y 115/20* (2016.01)
  *F21Y 107/40* (2016.01)

(52) U.S. Cl.
  CPC ........ *F21V 15/015* (2013.01); *F21W 2121/00* (2013.01); *F21Y 2105/00* (2013.01); *F21Y 2107/40* (2016.08); *F21Y 2115/10* (2016.08); *F21Y 2115/20* (2016.08); *H05B 37/0272* (2013.01)

(56) References Cited

U.S. PATENT DOCUMENTS

| | | |
|---|---|---|
| 6,340,957 B1 | 1/2002 | Adler et al. |
| 6,372,608 B1 | 4/2002 | Shimoda et al. |
| 6,400,428 B1 * | 6/2002 | Izumi ................. G02F 1/13336 349/73 |
| 6,828,727 B2 | 12/2004 | Yamazaki |
| 7,027,110 B2 | 4/2006 | Akiyama et al. |
| 7,242,445 B2 | 7/2007 | Akiyama et al. |
| 7,446,757 B2 | 11/2008 | Mochizuki et al. |
| 7,817,142 B2 | 10/2010 | Kuwahara et al. |
| 7,994,715 B2 * | 8/2011 | Buchhauser ........ H01L 27/3225 313/509 |
| 8,177,441 B2 | 5/2012 | Kuwahara et al. |
| 8,367,440 B2 | 2/2013 | Takayama et al. |
| 8,576,209 B2 | 11/2013 | Miyaguchi |
| 8,608,392 B2 | 12/2013 | Kuwahara et al. |
| 8,917,985 B2 | 12/2014 | Kuwahara et al. |
| 8,958,026 B2 | 2/2015 | Park et al. |
| 9,013,884 B2 | 4/2015 | Fukuma et al. |
| 9,164,354 B2 | 10/2015 | Ahlstedt et al. |
| 9,229,481 B2 | 1/2016 | Jinbo |
| 9,264,694 B2 | 2/2016 | Kuwahara et al. |
| 9,287,341 B2 | 3/2016 | Cheon et al. |
| 9,325,967 B2 | 4/2016 | Kuwahara et al. |
| 9,344,706 B2 | 5/2016 | Imaizumi et al. |
| 9,370,094 B2 | 6/2016 | Miyaguchi |
| 9,460,643 B2 | 10/2016 | Hirakata et al. |
| 9,735,178 B2 | 8/2017 | Miyaguchi |
| 9,748,275 B2 | 8/2017 | Miyaguchi |
| 9,894,344 B2 | 2/2018 | Imaizumi et al. |
| 2002/0027636 A1 | 3/2002 | Yamada |
| 2003/0032210 A1 | 2/2003 | Takayama et al. |
| 2004/0183958 A1 | 9/2004 | Akiyama et al. |
| 2006/0108588 A1 * | 5/2006 | Osame ................. H01L 25/048 257/72 |
| 2006/0125973 A1 | 6/2006 | Akiyama et al. |
| 2007/0195010 A1 | 8/2007 | Toriumi et al. |
| 2008/0042940 A1 | 2/2008 | Hasegawa |
| 2009/0059497 A1 | 3/2009 | Kuwahara et al. |
| 2009/0278764 A1 | 11/2009 | Kuwahara et al. |
| 2010/0064244 A1 | 3/2010 | Kilpatrick, II et al. |
| 2010/0066643 A1 | 3/2010 | King et al. |
| 2010/0201604 A1 | 8/2010 | Kee et al. |
| 2010/0316367 A1 | 12/2010 | Kuwahara et al. |
| 2011/0140647 A1 | 6/2011 | Park |
| 2012/0038570 A1 * | 2/2012 | Delaporte ............. G06F 1/1616 345/173 |
| 2012/0217516 A1 | 8/2012 | Hatano et al. |
| 2012/0307423 A1 | 12/2012 | Bohn et al. |
| 2013/0010405 A1 | 1/2013 | Rothkopf et al. |
| 2013/0120912 A1 | 5/2013 | Ladouceur et al. |
| 2014/0247544 A1 | 9/2014 | Ryu |
| 2015/0016126 A1 | 1/2015 | Hirakata et al. |
| 2015/0022436 A1 | 1/2015 | Cho et al. |
| 2015/0022515 A1 | 1/2015 | Ikeda et al. |
| 2015/0022561 A1 | 1/2015 | Ikeda et al. |
| 2015/0138103 A1 | 5/2015 | Nishi |
| 2016/0187930 A1 | 6/2016 | Jinbo |
| 2016/0375660 A1 * | 12/2016 | Jinno ..................... B32B 5/024 442/398 |
| 2018/0006064 A1 | 1/2018 | Miyaguchi |
| 2018/0167604 A1 | 6/2018 | Imaizumi et al. |

FOREIGN PATENT DOCUMENTS

| | | |
|---|---|---|
| EP | 2039399 | 3/2009 |
| EP | 2039400 | 3/2009 |
| EP | 2039405 | 3/2009 |
| EP | 2674807 | 12/2013 |
| JP | 50-011683 B | 5/1975 |
| JP | 04-044154 A | 2/1992 |
| JP | 08-044672 A | 2/1996 |
| JP | 11-134087 A | 5/1999 |
| JP | 2001-242831 A | 9/2001 |
| JP | 2003-174153 A | 6/2003 |
| JP | 2003-195973 A | 7/2003 |
| JP | 2005-114759 A | 4/2005 |
| JP | 2006-064911 A | 3/2006 |
| JP | 2007-108611 A | 4/2007 |
| JP | 2007-219312 A | 8/2007 |
| JP | 2007-219313 A | 8/2007 |
| JP | 2007-264258 A | 10/2007 |
| JP | 2008-046565 A | 2/2008 |
| JP | 2008-293680 A | 12/2008 |
| JP | 2009-051620 A | 3/2009 |
| JP | 2009-076038 A | 4/2009 |
| JP | 2010-099122 A | 5/2010 |
| JP | 2011-034066 A | 2/2011 |
| JP | 2012-169139 A | 9/2012 |
| JP | 2013-254021 A | 12/2013 |
| JP | 2013-257564 A | 12/2013 |
| TW | 200416517 | 9/2004 |
| WO | WO-2001/053919 | 7/2001 |
| WO | WO-2013/183466 | 12/2013 |

\* cited by examiner

FIG. 1A1 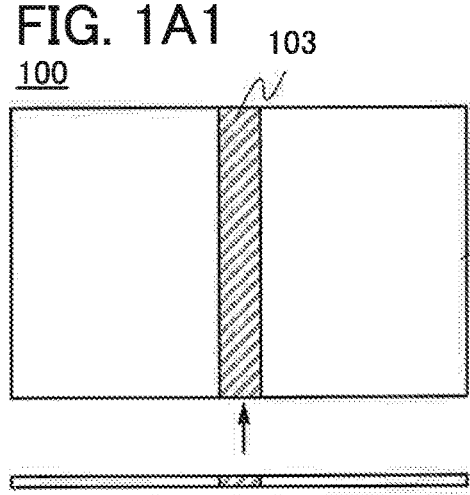
FIG. 1A2 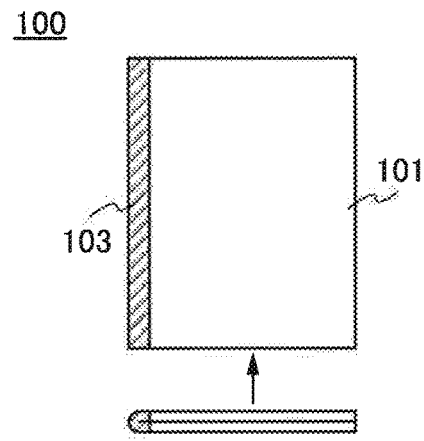
FIG. 1B1 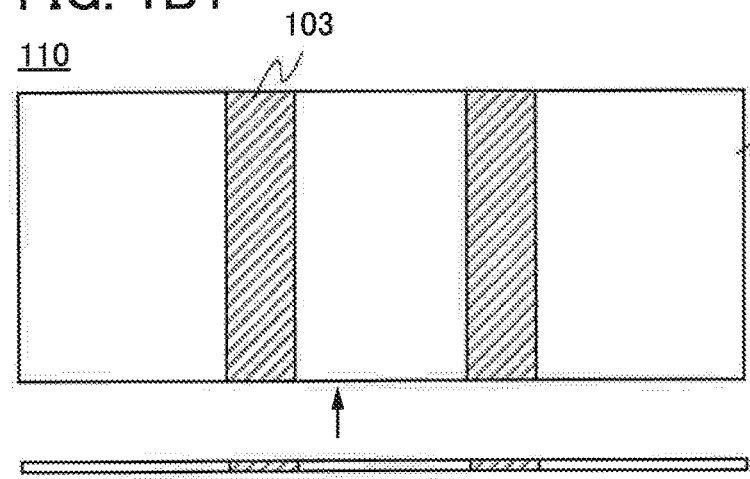
FIG. 1B2 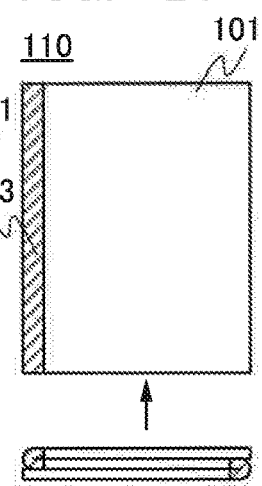

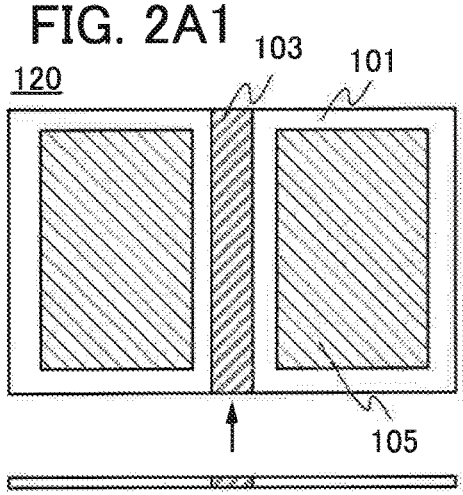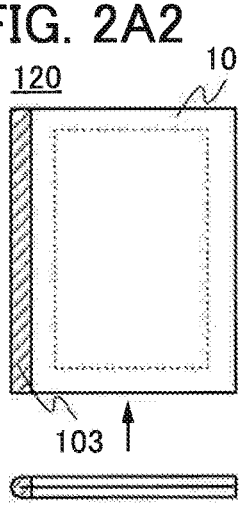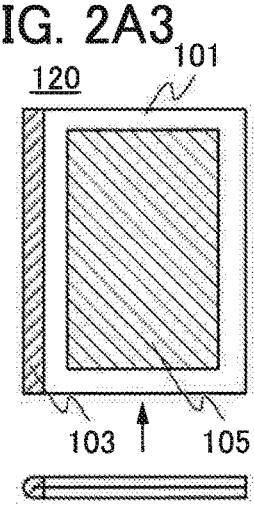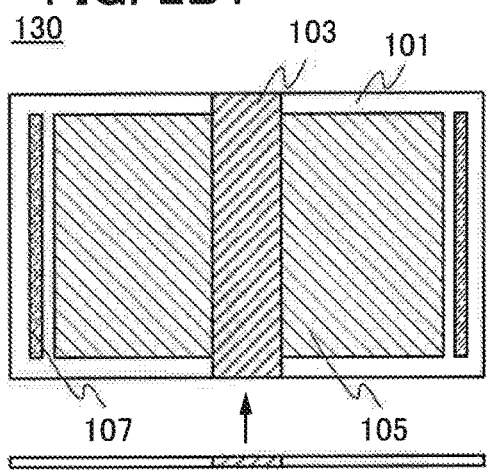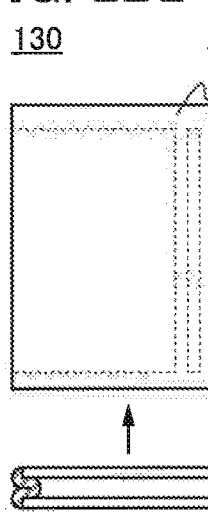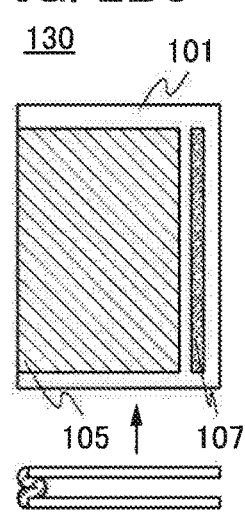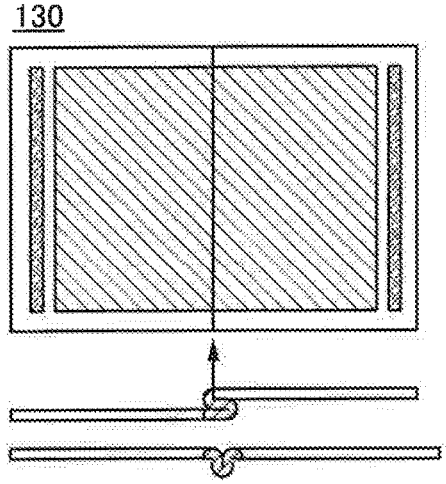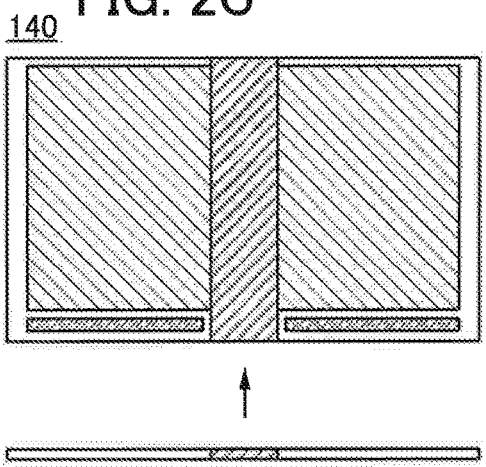

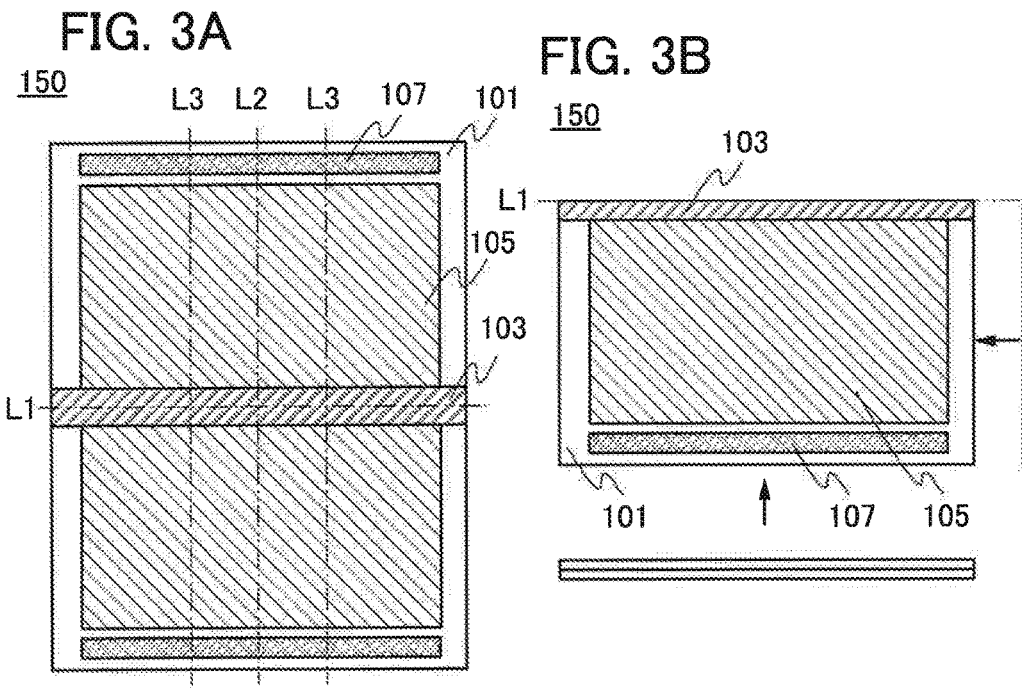
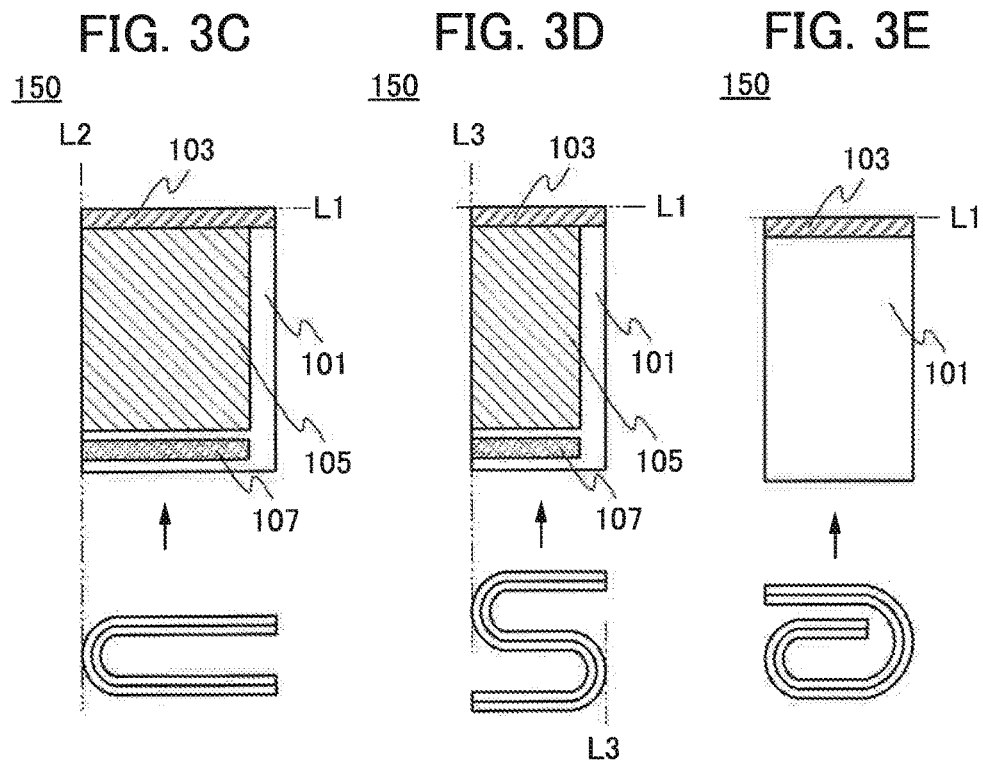

FIG. 6A1
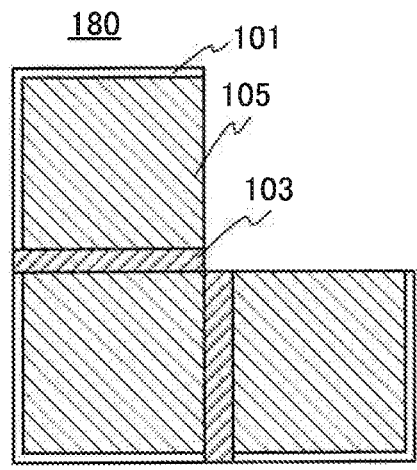
FIG. 6A2
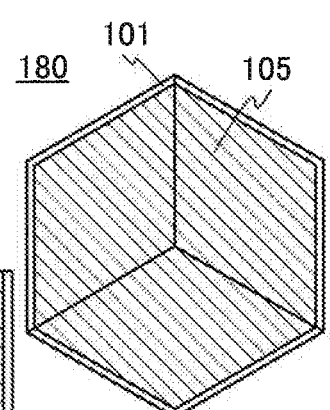
FIG. 6B1
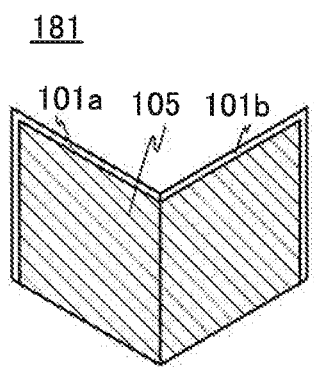
FIG. 6B2
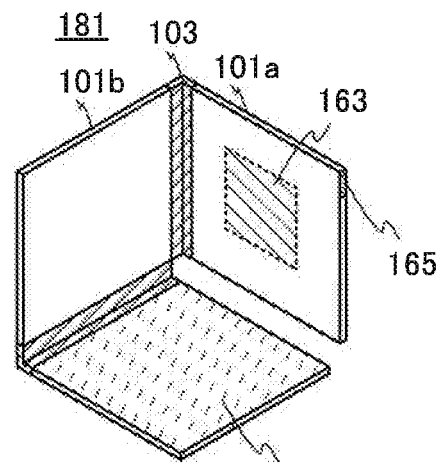
FIG. 6C
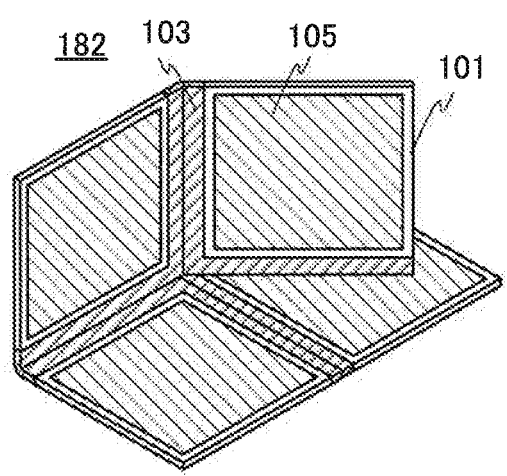
FIG. 6D1
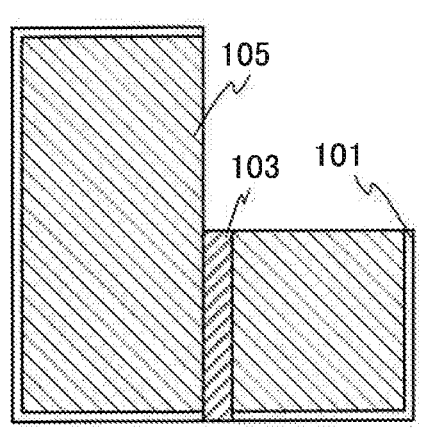
FIG. 6D2
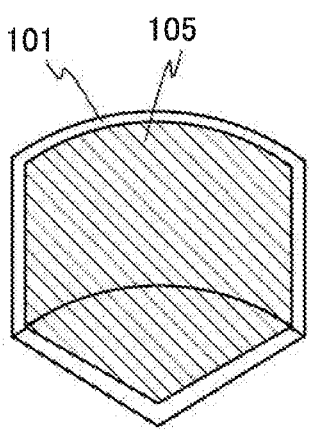

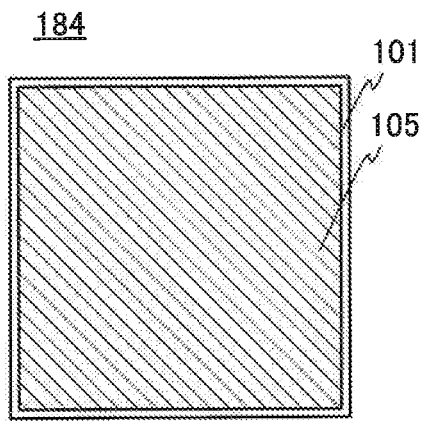
FIG. 7A1
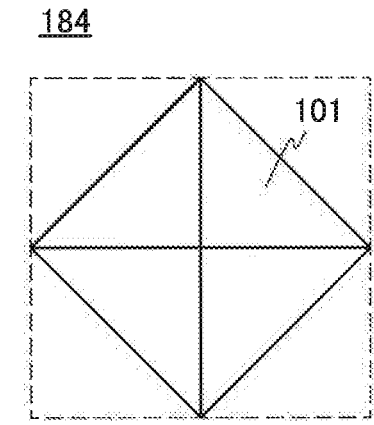
FIG. 7A2
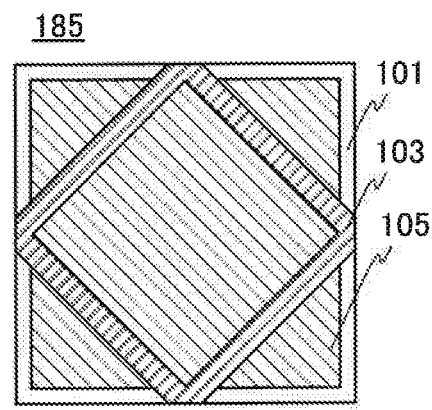
FIG. 7B
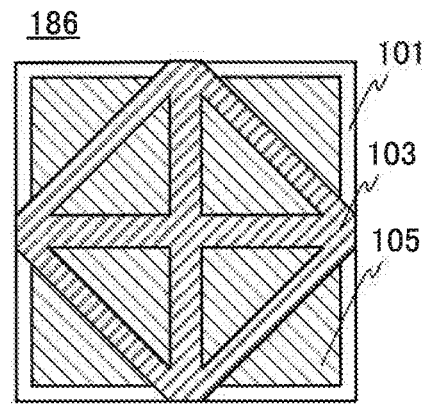
FIG. 7C
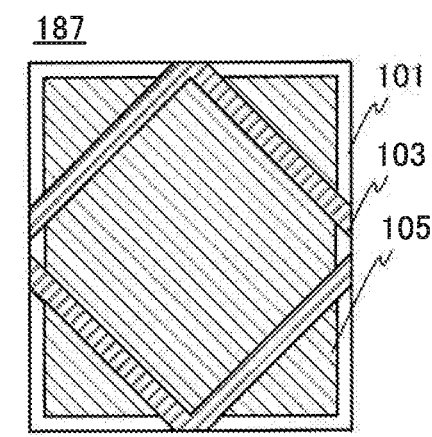
FIG. 7D

190

191

192

193

194

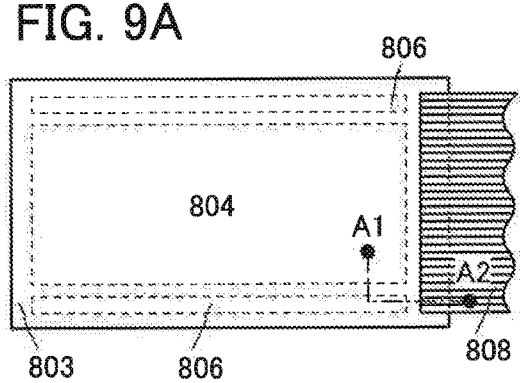
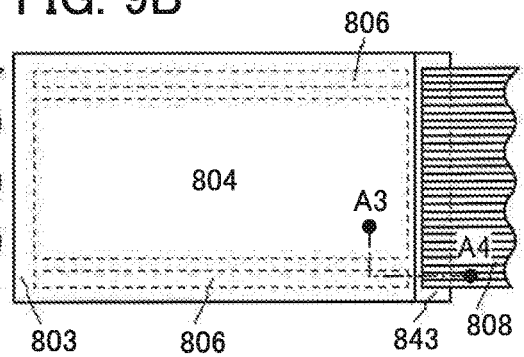
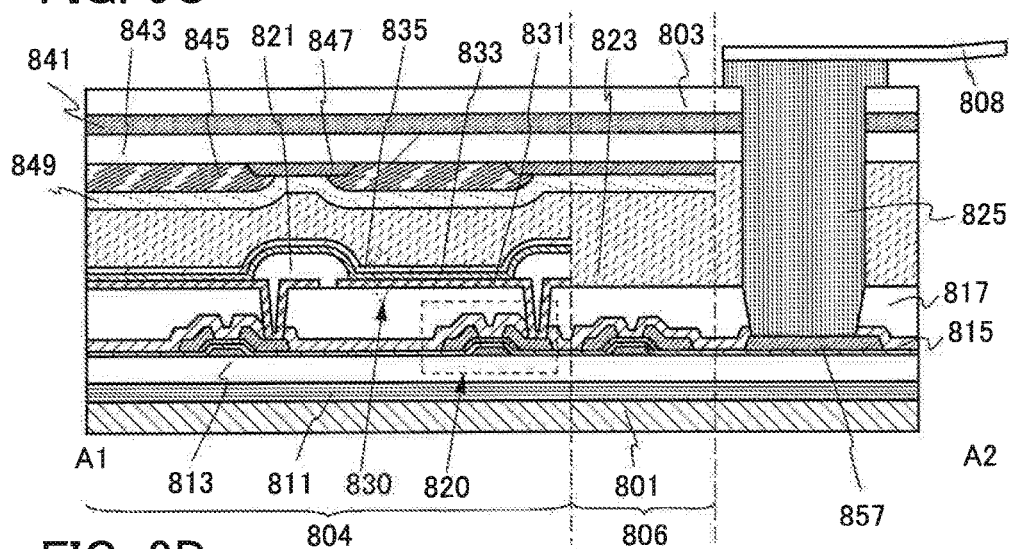
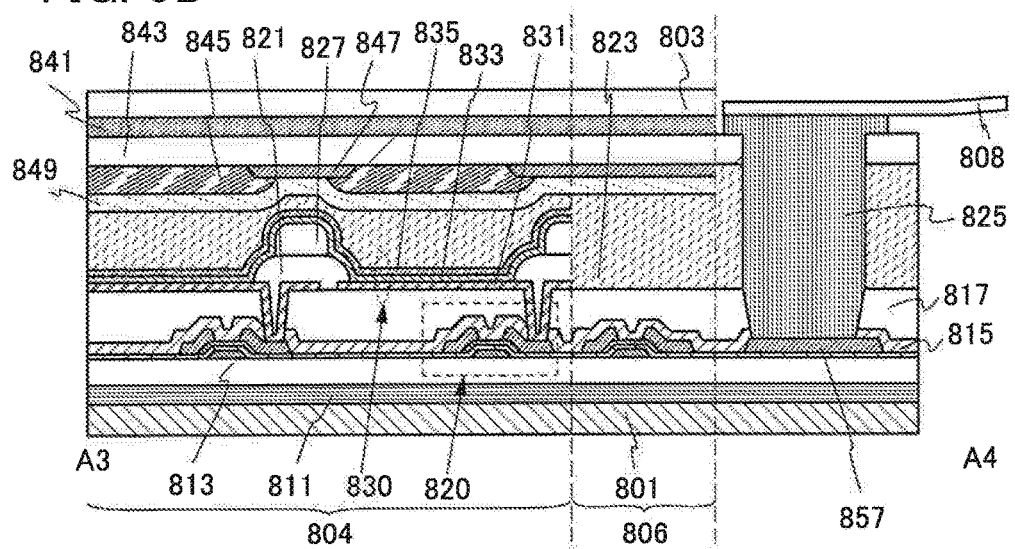

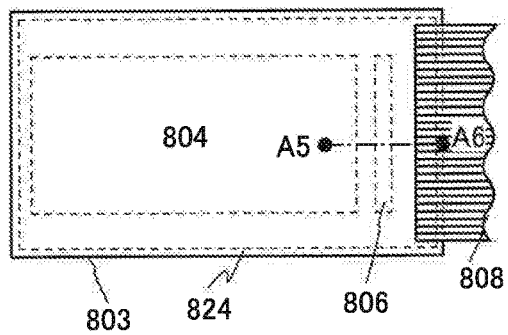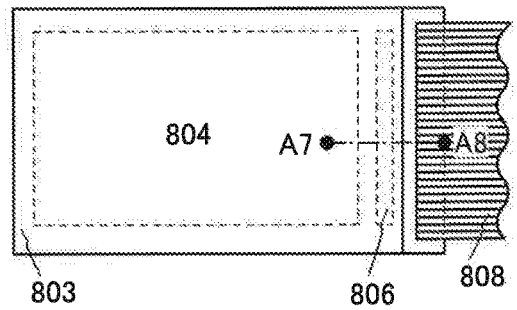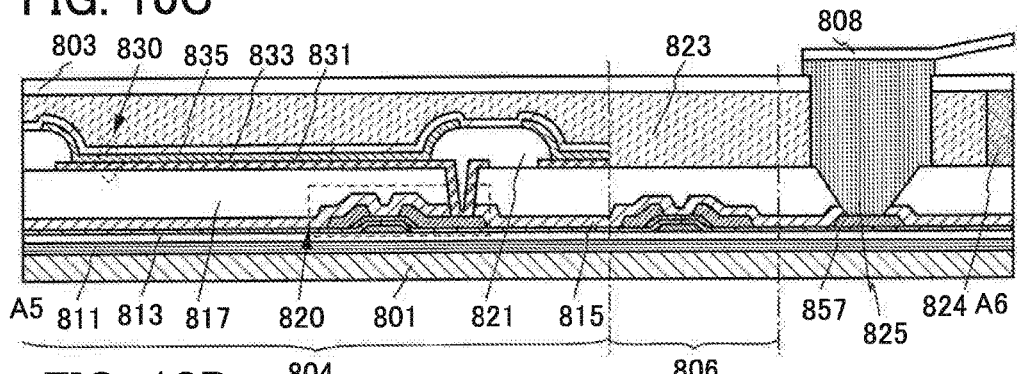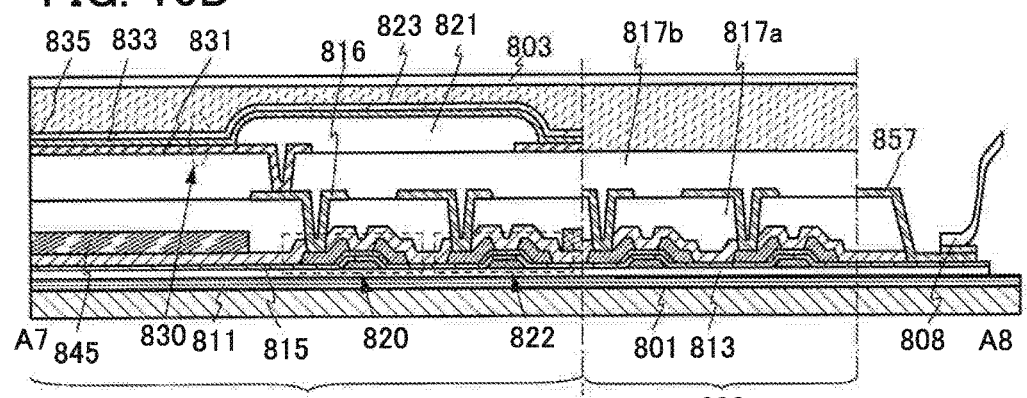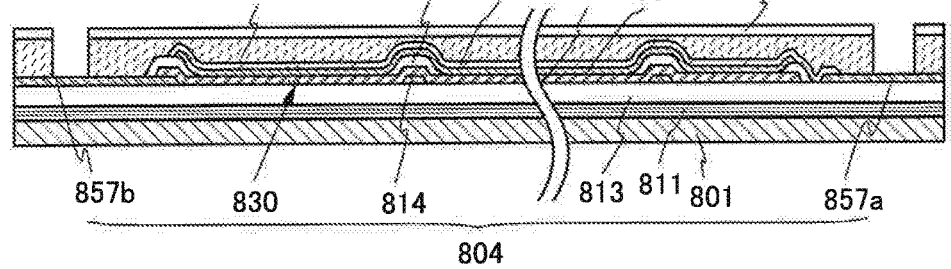

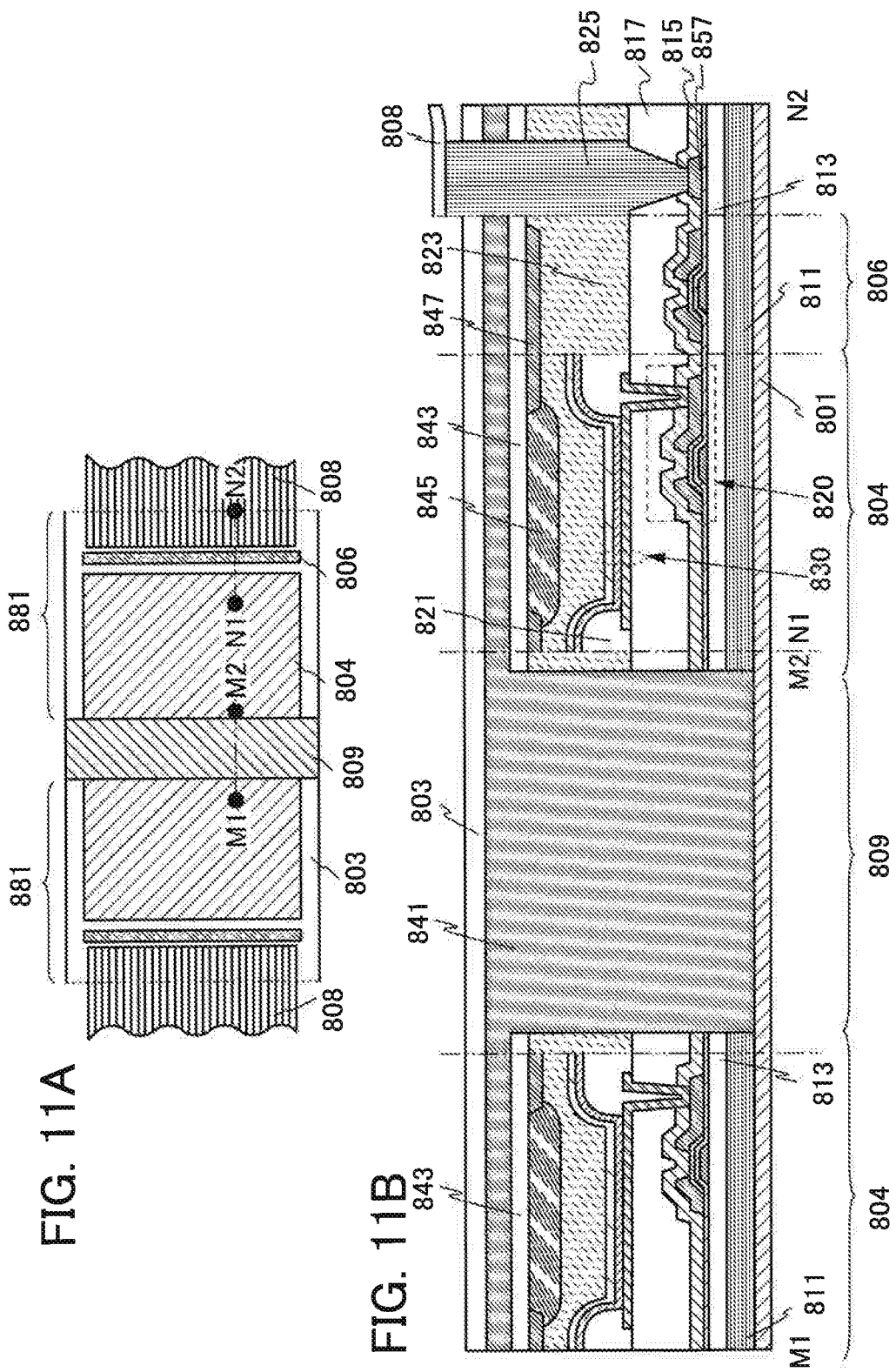

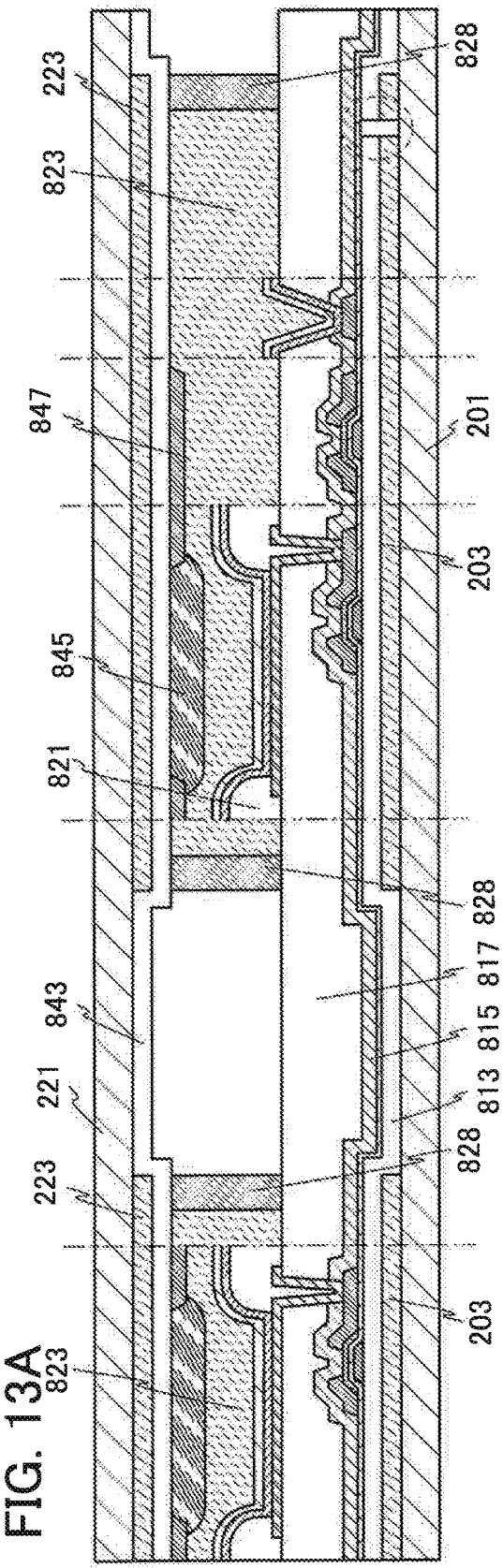
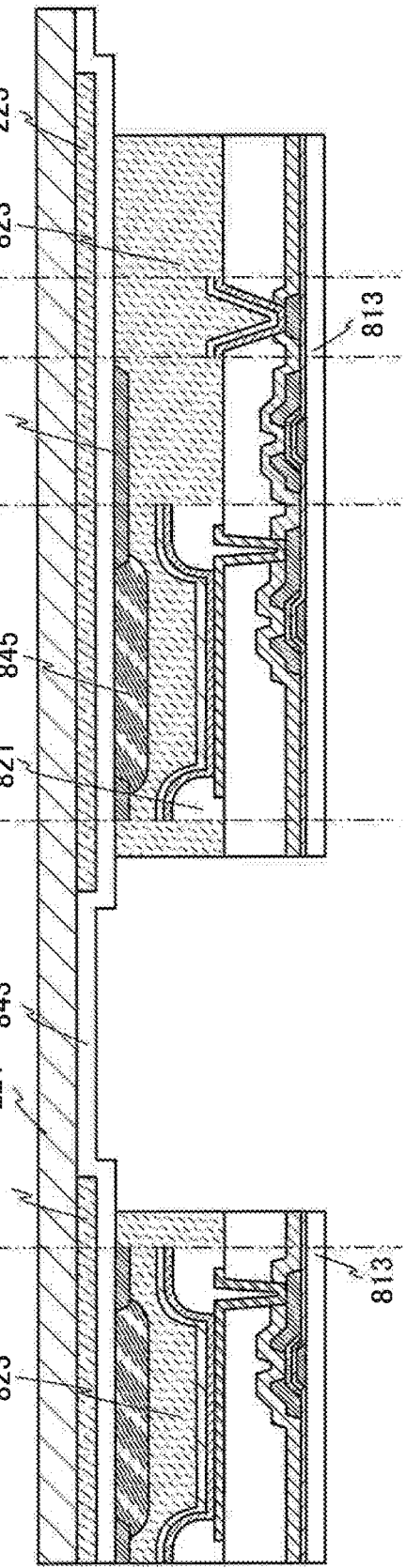
FIG. 13A
FIG. 13B

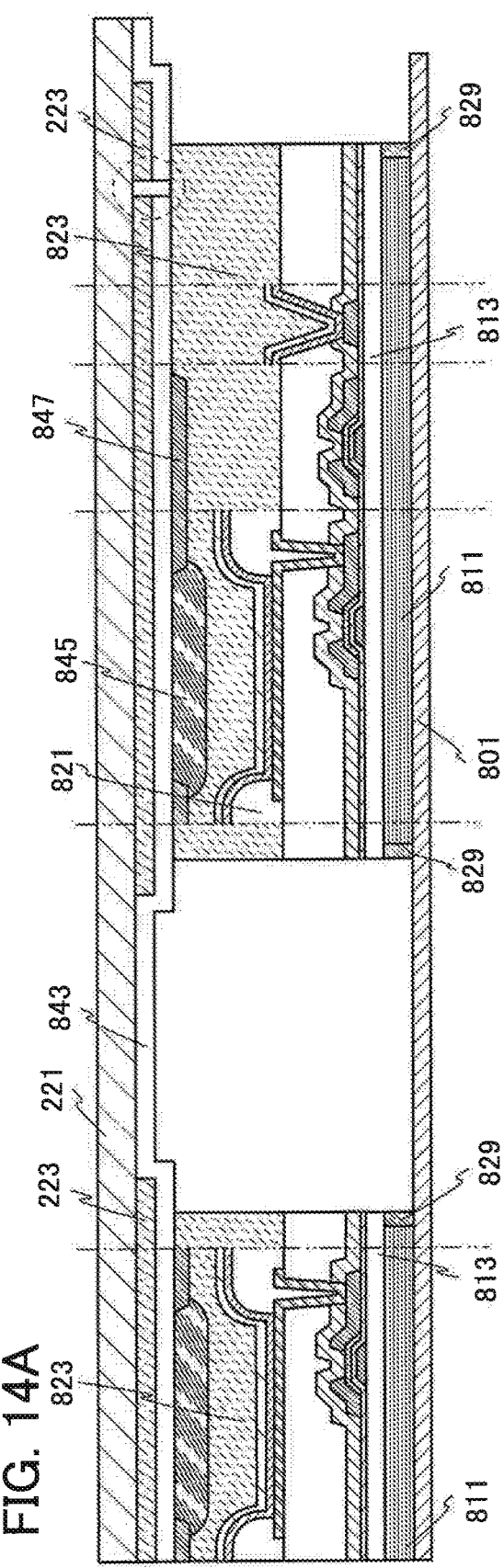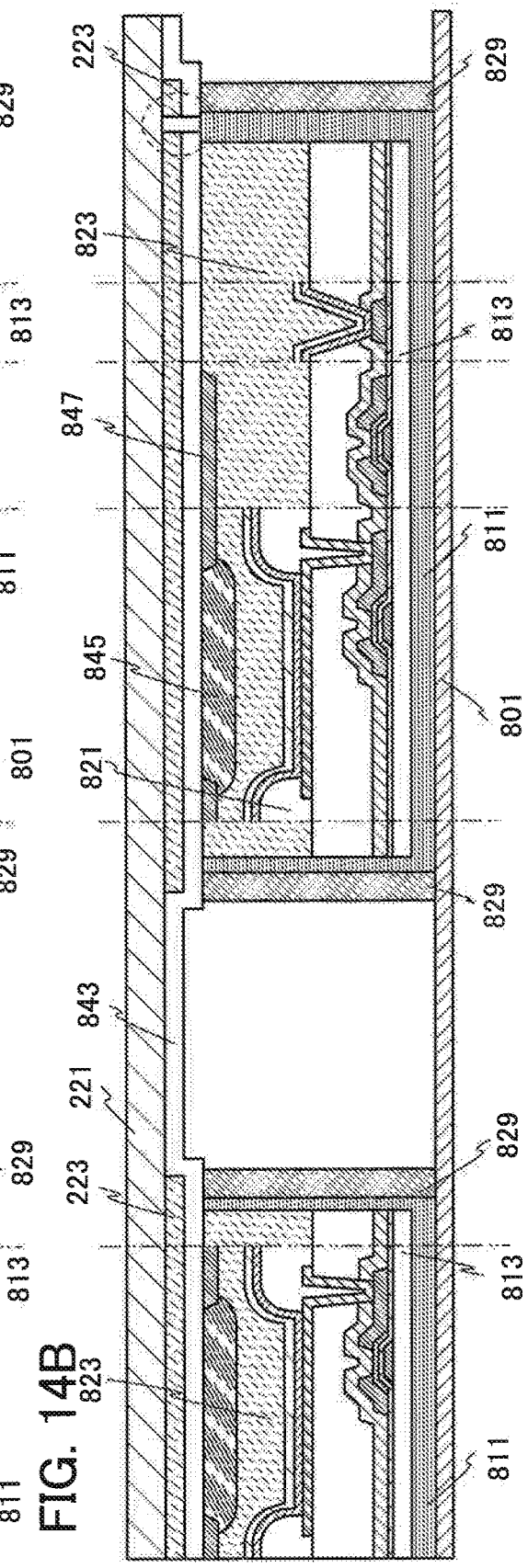

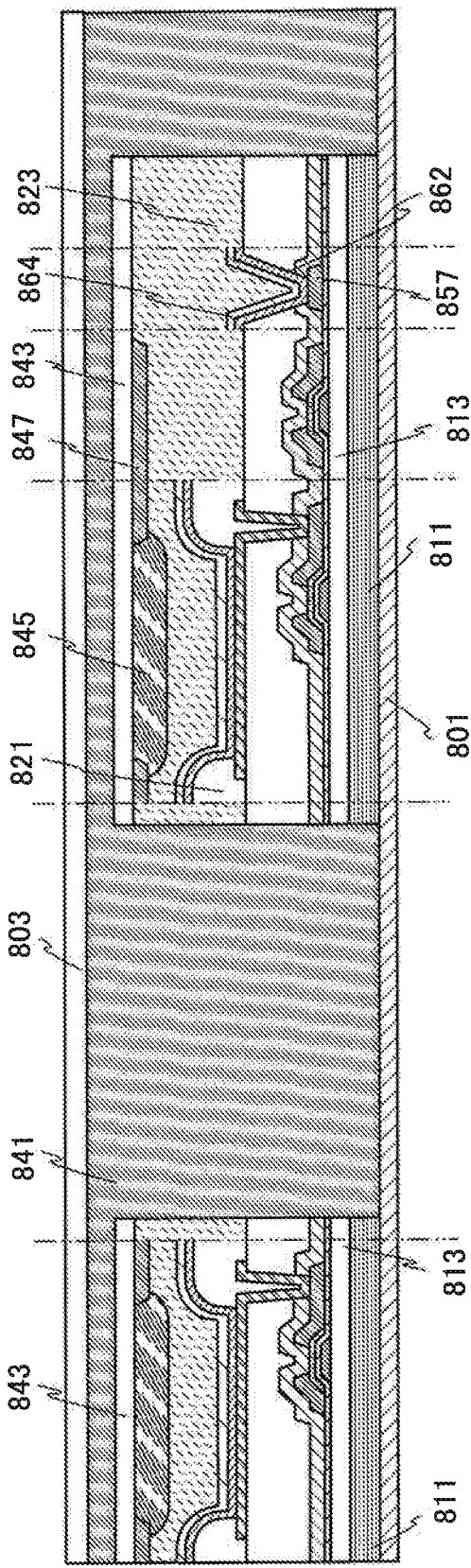
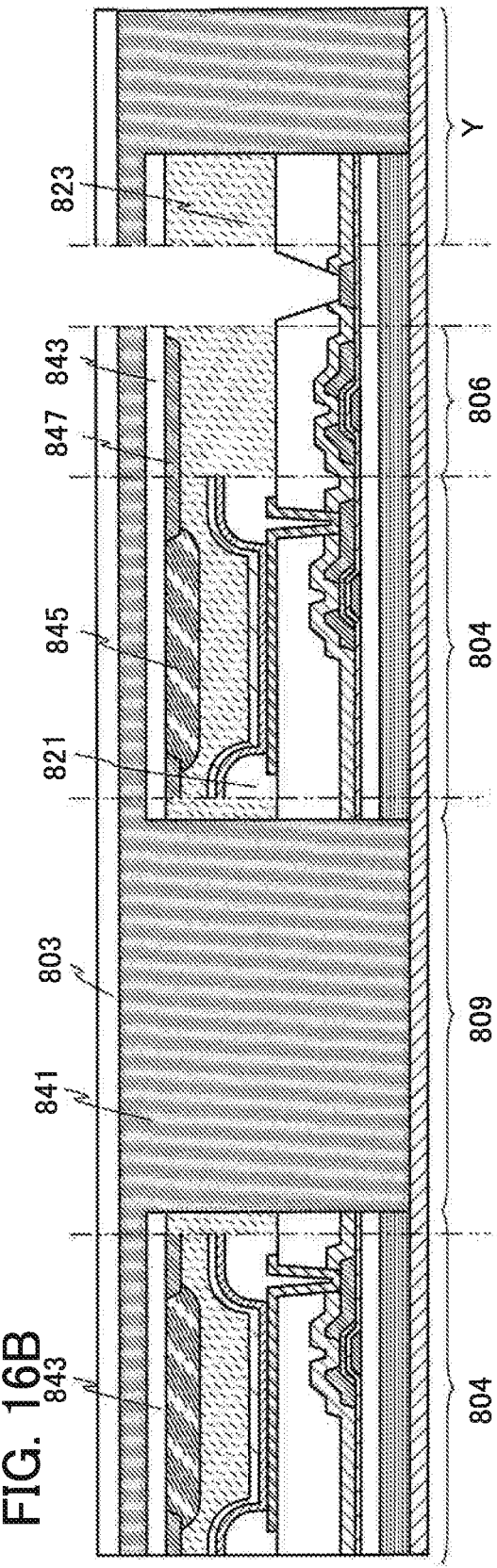

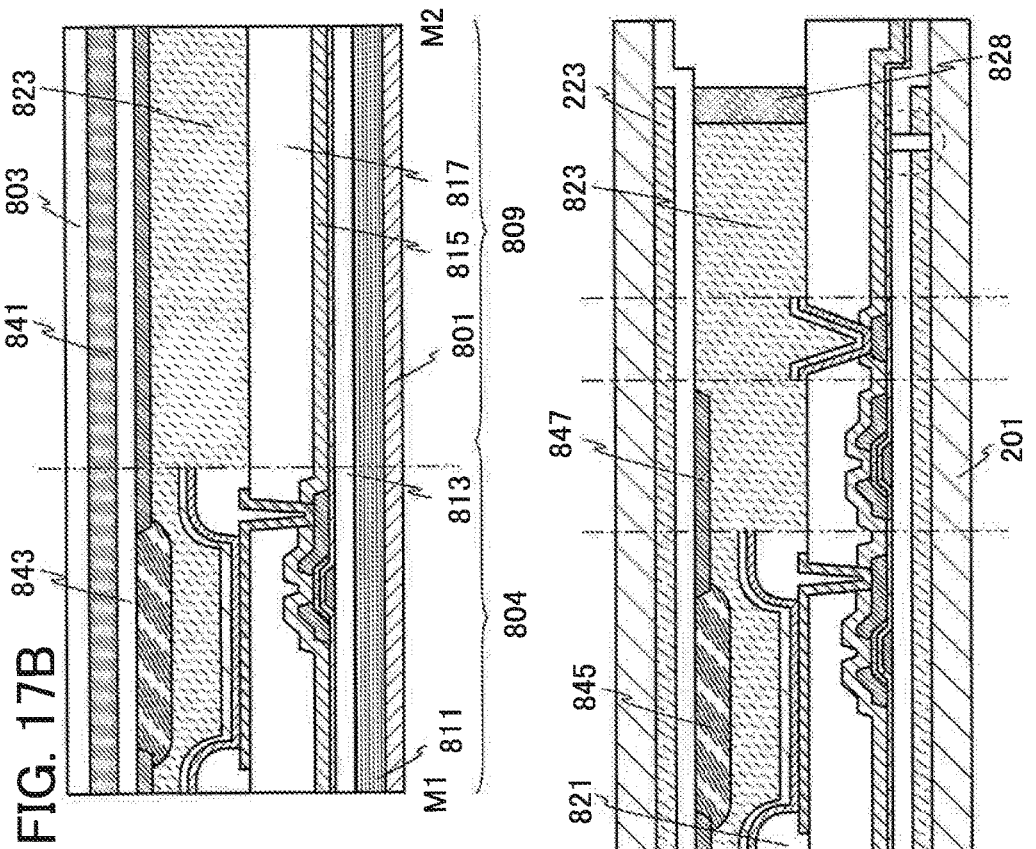
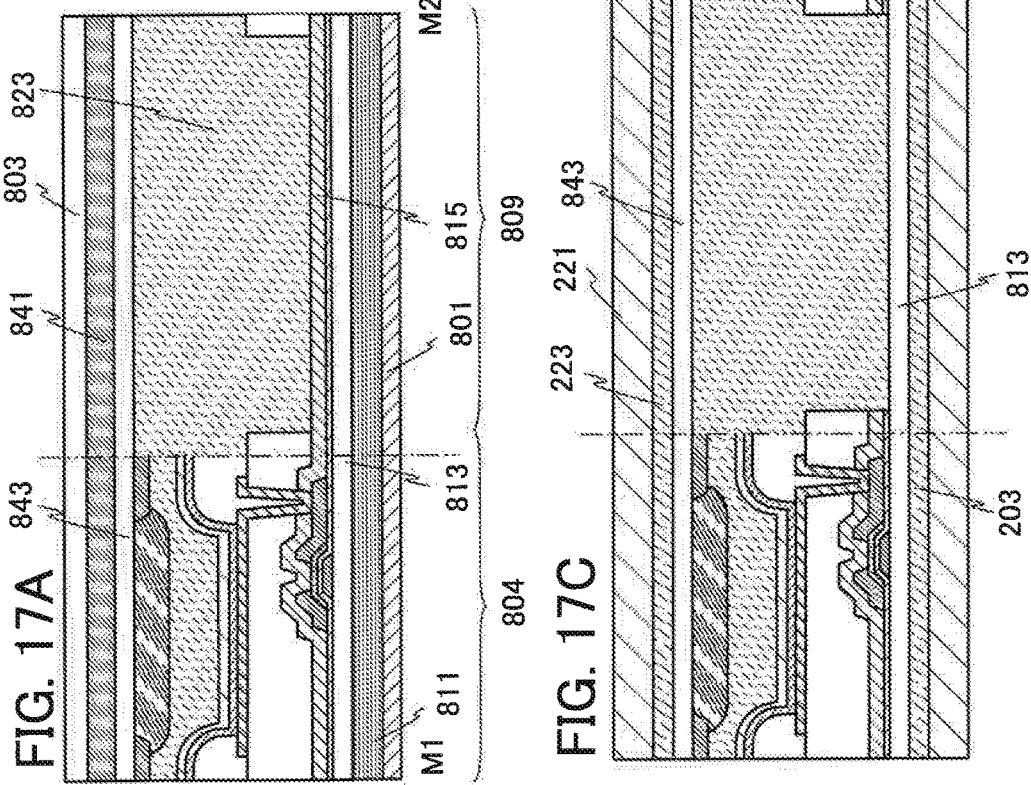
FIG. 17A
FIG. 17B
FIG. 17C

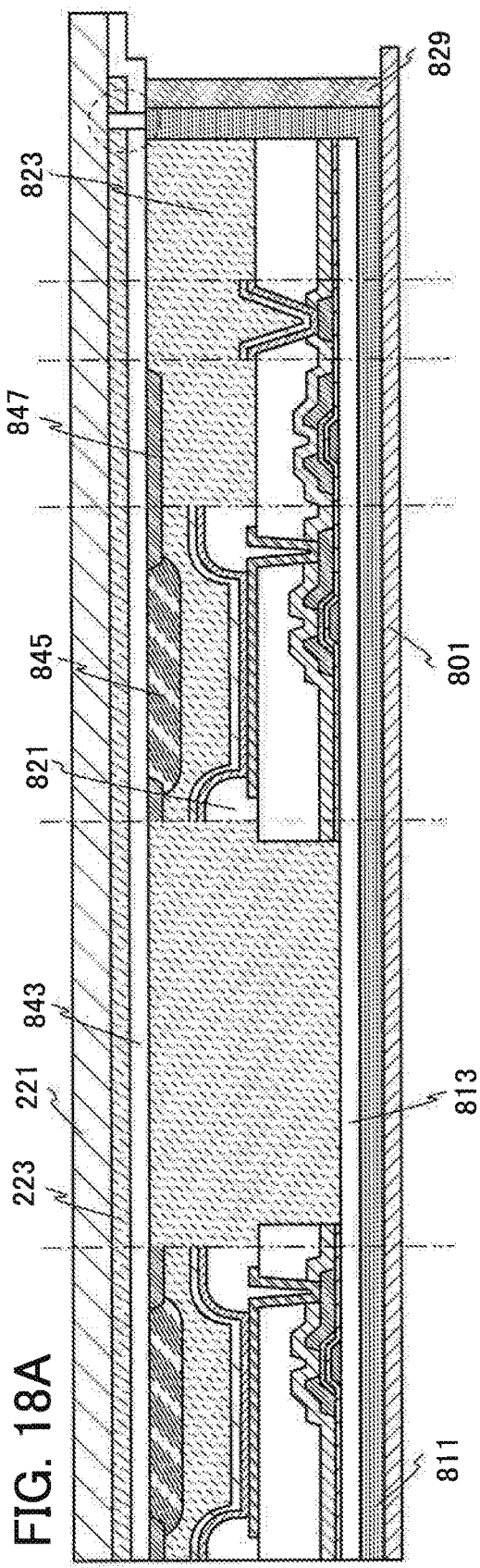
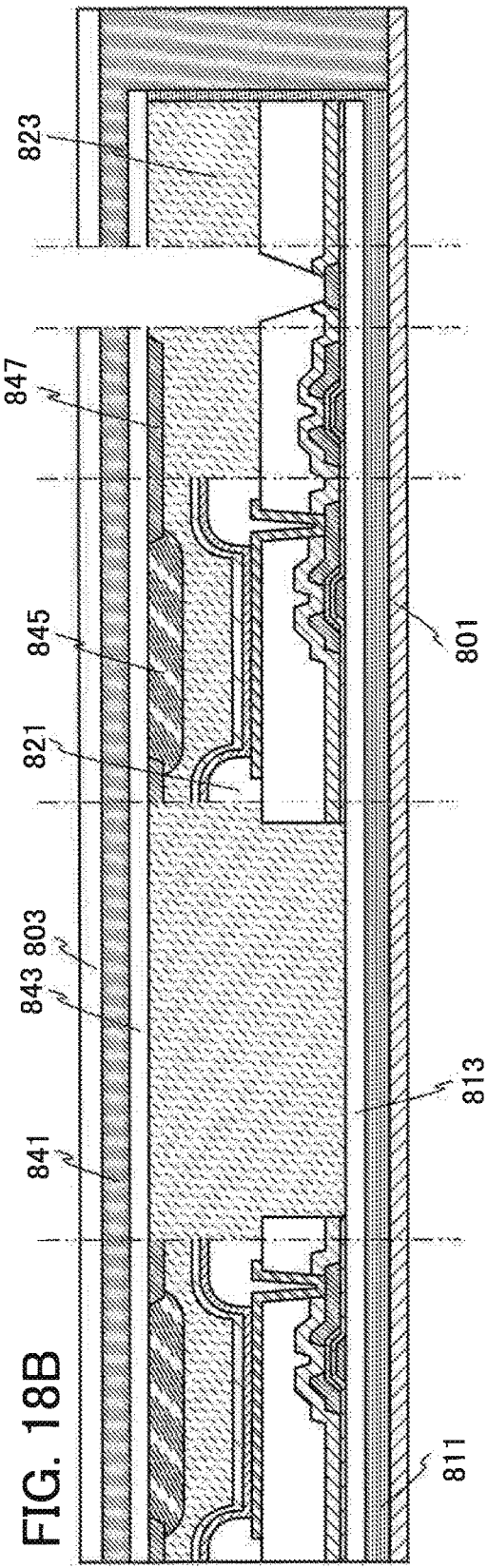

JOINING STRUCTURE OF LIGHT EMITTING UNITS

CROSS-REFERENCE TO RELATED APPLICATIONS

This application is a continuation of U.S. application Ser. No. 14/618,131, filed Feb. 10, 2015, now U.S. Pat. No. 9,909,725, which claims the benefit of a foreign priority application filed in Japan as Serial No. 2014-026273 on Feb. 14, 2014, both of which are incorporated by reference.

BACKGROUND OF THE INVENTION

1. Field of the Invention

One embodiment of the present invention relates to an object, a method, or a manufacturing method. In addition, one embodiment of the present invention relates to a process, a machine, manufacture, or a composition of matter. One embodiment of the present invention relates to a light-emitting device, a display device, an electronic device, a lighting device, or a manufacturing method thereof. In particular, one embodiment of the present invention relates to a light-emitting device, a display device, an electronic device, or a lighting device utilizing electroluminescence (EL) or a manufacturing method thereof.

2. Description of the Related Art

Recent light-emitting devices and display devices are expected to be applied to a variety of uses and become diversified.

For example, light-emitting devices and display devices for mobile devices and the like are required to be thin, lightweight, and robust.

Light-emitting elements utilizing EL (also referred to as EL elements) have features such as ease of thinning and lightening, high-speed response to input signal, and driving with a direct-current low voltage source; therefore, application of the light-emitting elements to light-emitting devices and display devices has been proposed.

For example, Patent Document 1 discloses a flexible active matrix light-emitting device in which an organic EL element and a transistor serving as a switching element are provided over a film substrate.

REFERENCE

Patent Document

[Patent Document 1] Japanese Published Patent Application No. 2003-174153

SUMMARY OF THE INVENTION

For example, a display device that is reduced in size for high portability to have a small display region can display less information on one screen and is less browsable.

An object of one embodiment of the present invention is to provide a highly portable light-emitting device, display device, electronic device, or lighting device. Another object of one embodiment of the present invention is to provide a highly browsable light-emitting device, display device, or electronic device. Another object of one embodiment of the present invention is to provide a highly portable and highly browsable light-emitting device, display device, or electronic device.

Another object of one embodiment of the present invention is to provide a repeatedly bendable light-emitting device, display device, electronic device, or lighting device.

Another object of one embodiment of the present invention is to provide a novel light-emitting device, display device, electronic device, or lighting device. Another object of one embodiment of the present invention is to provide a lightweight light-emitting device, display device, electronic device, or lighting device. Another object of one embodiment of the present invention is to provide a highly reliable light-emitting device, display device, electronic device, or lighting device. Another object of one embodiment of the present invention is to provide a robust light-emitting device, display device, electronic device, or lighting device. Another object of one embodiment of the present invention is to provide a thin light-emitting device, display device, electronic device, or lighting device. Another object of one embodiment of the present invention is to provide a flexible light-emitting device, display device, electronic device, or lighting device. Another object of one embodiment of the present invention is to provide a light-emitting device or lighting device with a large seamless (or almost seamless) light-emitting region or a display device or electronic device with a large seamless display portion. Another object of one embodiment of the present invention is to provide a light-emitting device, display device, electronic device, or lighting device with low power consumption.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a light-emitting device that includes a joint portion, and a plurality of light-emitting units apart from each other with the joint portion positioned therebetween. The joint portion and the light-emitting units are flexible. The joint portion is capable of being bent to a curvature radius smaller than a curvature radius to which the light-emitting unit is capable of being bent.

In the above structure, at least one of the plurality of light-emitting units may be supplied with a signal through a side not adjacent to the joint portion. Alternatively, in the above structure, at least one of the plurality of light-emitting units may be supplied with a signal by wireless communication.

In any of the above structures, the joint portion may include a slit.

In any of the above structures, the joint portion may include an opening portion.

Embodiments of the present invention also include an electronic device including the light-emitting device having any of the above structures and a lighting device including the light-emitting device having any of the above structures.

Another embodiment of the present invention is an electronic device including the light-emitting device having any of the above structures and a secondary battery. It is preferable that the secondary battery is capable of being charged by contactless power transmission.

Note that the light-emitting device in this specification includes, in its category, a display device using a light-emitting element. Furthermore, the light-emitting device may be included in a module in which a light-emitting element is provided with a connector such as an anisotropic conductive film or a tape carrier package (TCP), a module in which a printed wiring board is provided at the end of a TCP, and a module in which an integrated circuit (IC) is directly mounted on a light-emitting element by a chip on glass (COG) method. The light-emitting device may be included in lighting equipment or the like.

In one embodiment of the present invention, a highly portable light-emitting device, display device, electronic device, or lighting device can be provided. In one embodiment of the present invention, a highly browsable light-emitting device, display device, or electronic device can be provided. In one embodiment of the present invention, a highly portable and highly browsable light-emitting device, display device, or electronic device can be provided. In one embodiment of the present invention, a repeatedly bendable light-emitting device, display device, electronic device, or lighting device can be provided.

In one embodiment of the present invention, a novel light-emitting device, display device, electronic device, or lighting device can be provided. In one embodiment of the present invention, a lightweight light-emitting device, display device, electronic device, or lighting device can be provided. In one embodiment of the present invention, a highly reliable light-emitting device, display device, electronic device, or lighting device can be provided. In one embodiment of the present invention, a robust light-emitting device, display device, electronic device, or lighting device can be provided. In one embodiment of the present invention, a thin light-emitting device, display device, electronic device, or lighting device can be provided. In one embodiment of the present invention, a flexible light-emitting device, display device, electronic device, or lighting device can be provided. In one embodiment of the present invention, a light-emitting device or lighting device with a large seamless light-emitting region or a display device or electronic device with a large seamless display portion can be provided. In one embodiment of the present invention, a light-emitting device, display device, electronic device, or lighting device with low power consumption can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 1A1, 1A2, 1B1, 1B2, 1C, 1D, and 1E illustrate examples of light-emitting devices.

FIGS. 2A1, 2A2, 2A3, 2B1, 2B2, 2B3, 2B4, and 2C illustrate examples of light-emitting devices.

FIGS. 3A to 3E illustrate an example of a light-emitting device.

FIGS. 6A1, 6A2, 6B1, 6B2, 6C, 6D1, and 6D2 illustrate examples of light-emitting devices.

FIGS. 7A1, 7A2, 7B, 7C, and 7D illustrate examples of light-emitting devices.

FIGS. 9A to 9D illustrate examples of a light-emitting unit.

FIGS. 10A to 10E illustrate examples of a light-emitting unit.

FIGS. 11A and 11B illustrate an example of a light-emitting device.

FIGS. 13A and 13B illustrate an example of a method for manufacturing a light-emitting device.

FIGS. 14A and 14B illustrate examples of a method for manufacturing a light-emitting device.

FIGS. 16A and 16B illustrate an example of a method for manufacturing a light-emitting device.

FIGS. 17A to 17C illustrate examples of a method for manufacturing a light-emitting device.

FIGS. 18A and 18B illustrate an example of a method for manufacturing a light-emitting device.

DETAILED DESCRIPTION OF THE INVENTION

Figure 1C:
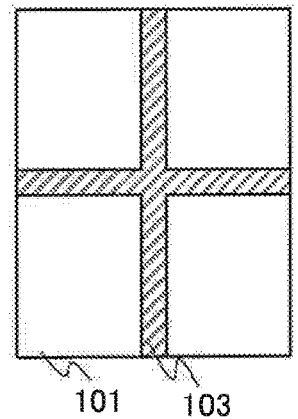

Embodiments will be described in detail with reference to drawings. Note that the present invention is not limited to the description below, and it is easily understood by those skilled in the art that various changes and modifications can be made without departing from the spirit and scope of the present invention. Therefore, the present invention should not be construed as being limited to the description in the following embodiments.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

In addition, the position, size, range, or the like of each constituent part illustrated in drawings and the like is not accurately represented in some cases for easy understanding. Therefore, the disclosed invention is not necessarily limited to the position, the size, the range, or the like disclosed in the drawings and the like.

Embodiment 1

In this embodiment, a device of one embodiment of the present invention will be described with reference to FIGS. 1A1, 1A2, 1B1, 1B2, 1C, 1D, and 1E, FIGS. 2A1, 2A2, 2A3, 2B1, 2B2, 2B3, 2B4, and 2C, FIGS. 3A to 3E, FIGS. 4A to 4D, FIGS. 5A to 5D, FIGS. 6A1, 6A2, 6B1, 6B2, 6C, 6D1, and 6D2, FIGS. 7A1, 7A2, 7B, 7C, and 7D, and FIGS. 8A to 8E.

A light-emitting device of one embodiment of the present invention includes a joint portion, and a plurality of light-emitting units apart from each other with the joint portion positioned therebetween. The joint portion and the light-emitting units are flexible. The joint portion is capable of being bent to a curvature radius smaller than a curvature radius to which the light-emitting unit is capable of being bent. Furthermore, a display device of one embodiment of the present invention includes a joint portion, and a plurality of display units apart from each other with the joint portion positioned therebetween. The joint portion and the display units are flexible. The joint portion is capable of being bent to a curvature radius smaller than a curvature radius to which the display unit is capable of being bent.

In a flexible light-emitting device and a flexible display device, when a region including a functional element such as a semiconductor element, a light-emitting element, or a display element is bent, great force is applied to the element and the element is broken in some cases. The curvature radius to which the device is bent should be such that the element is not broken.

The light-emitting device (display device) of one embodiment of the present invention includes a joint portion that can be bent to a curvature radius smaller than a curvature radius to which a light-emitting unit (display unit) can be bent. The device can be bent to a small curvature radius when the device is bent such that a bend line (fold line) is positioned in the joint portion. Thus, the light-emitting device or display device of one embodiment of the present invention can be folded thin without breaking an element. The display device of one embodiment of the present invention is excellent in browsability when opened, and is excellent in portability while remaining thin when folded. The display device of one embodiment of the present invention is not easily broken even when repeatedly bent, and is highly reliable.

It is preferable that at least a functional element not be provided in the joint portion. The joint portion is preferably made of only a material with high bendability and a material with high toughness. It is particularly preferable that there be no limitation on the curvature radius at the time of bending the device such that a bend line is positioned in the joint portion.

For example, the joint portion may include a flexible substrate. For example, glass, a metal, or an alloy that is thin enough to have flexibility, or an organic resin can be used. When the joint portion includes any of an organic resin, a thin metal, and a thin alloy, which have high toughness, the device can be lighter and more robust than when the joint portion includes glass. The joint portion can be formed using a material for a flexible substrate that can be used for a light-emitting panel described later.

The joint portion may include an adhesive, for example. For example, the joint portion preferably includes an epoxy resin. The joint portion can be formed using a material that can be used for a bonding layer or a sealing layer of the light-emitting panel described later.

The joint portion may be formed using another kind of an organic or inorganic film with high bendability or high toughness. For example, silicone rubber or the like may be used.

Note that the light-emitting unit in the above-described structure does not necessarily have flexibility. For example, at least one of a plurality of light-emitting units may have flexibility, all the light-emitting units may have flexibility, or no light-emitting unit may have flexibility.

A light-emitting device of one embodiment of the present invention will be described as an example; however, the present invention is not limited to a light-emitting device and can be applied to a device such as a display device.

FIG. 1A1 shows a plan view of a light-emitting device 100 in an opened state and a side view of the light-emitting device 100 seen from a direction denoted by an arrow in the plan view.

FIG. 1A2 shows a plan view of the light-emitting device 100 in a folded state and a side view of the light-emitting device 100 seen from a direction denoted by an arrow in the plan view.

The light-emitting device 100 includes one joint portion 103 and two light-emitting units 101 apart from each other with the joint portion 103 positioned therebetween. The joint portion 103 and the light-emitting unit 101 have flexibility. The joint portion 103 can be bent to a curvature radius smaller than a curvature radius to which the light-emitting unit 101 can be bent. When the light-emitting device 100 is bent such that a bend line is positioned in the joint portion 103 as illustrated in FIG. 1A2, the light-emitting device 100 can be folded thin without breaking an element included in the light-emitting unit 101. The light-emitting device 100 can be folded thin because the joint portion 103 can be bent such that the entire surfaces of the two light-emitting units 101 that face each other are in contact with each other.

For example, a curvature radius to which the joint portion 103 can be bent is less than or equal to 10 mm, less than or equal to 5 mm, or less than or equal to 3 mm, preferably less than or equal to 1 mm, further preferably less than or equal to 0.5 mm, still further preferably less than or equal to 0.1 mm.

Note that in this specification, bending such that a light-emitting surface of a light-emitting unit (or a display surface of a display unit) faces inward is referred to as "bending inward," and bending such that the light-emitting surface of the light-emitting unit (or the display surface of the display unit) faces outward is referred to as "bending outward." A light-emitting surface of a light-emitting unit or a light-emitting device refers to a surface through which light emitted from a light-emitting element is extracted.

The light-emitting device of one embodiment of the present invention can be bent inward and/or outward and preferably bent both inward and outward.

The number of the joint portions may be one or more. Two or more light-emitting units may be apart from one another with one joint portion positioned therebetween. A plurality of joint portions may have the respective sizes or the same size. Alternatively, some of the plurality of the joint portions may have the same size and the others may have a different size. There is no particular limitation on the width of the joint portion (the gap between two light-emitting units) and the width of the joint portion can be less than or equal to 10 cm, less than or equal to 5 cm, less than or equal to 3 cm, less than or equal to 10 mm, less than or equal to 5 mm, less than or equal to 3 mm, or less than or equal to 2 mm, for example. Note that the width of the joint portion may exceed 10 cm.

The joint portion 103 is, for example, a region not including a wiring and a functional element such as a semiconductor element, a light-emitting element, a display element, or a capacitor. The joint portion 103 may be a region not even including a film (e.g., a protective film, a base film, or an interlayer insulating film) over or under the functional element. The joint portion 103 may be a region including only a pair of substrates positioned on the outermost surfaces of the light-emitting device or the display device and a bonding layer between the pair of substrates. The joint portion 103 may be a region including the pair of substrates positioned on the outermost surfaces of the light-emitting device or the display device, the bonding layer between the pair of substrates, and a film with high bendability (e.g., an insulating film, a conductive film, or a semiconductor film).

At least one of the plurality of light-emitting units may be externally supplied with a signal through a side not adjacent to the joint portion. The light-emitting unit may include a light-emitting portion and a driver circuit portion, for example.

Alternatively, in the above structure, at least one of the plurality of light-emitting units may be supplied with a signal by wireless communication. The light-emitting unit may include a light-emitting portion and an antenna, for example. When a signal is supplied externally, the light-emitting unit can emit light or display an image, data, or the like. The plurality of light-emitting units may perform display or light emission independently or in synchronization.

The light-emitting unit or the light-emitting device may include a speaker. In that case, the light-emitting device can reproduce sound in response to a signal externally supplied.

FIG. 1B1 shows a plan view of a light-emitting device 110 in an opened state and a side view of the light-emitting device 110 seen from a direction denoted by an arrow in the plan view.

FIG. 1B2 shows a plan view of the light-emitting device 110 in a folded state and a side view of the light-emitting device 110 seen from a direction denoted by an arrow in the plan view.

The light-emitting device 110 includes two joint portions 103 and three light-emitting units 101 apart from one another with the joint portion 103 positioned therebetween. The joint portion 103 and the light-emitting unit 101 have flexibility. The joint portion 103 can be bent to a curvature radius smaller than a curvature radius to which the light-emitting unit 101 can be bent. The joint portions 103 are each positioned between two of the light-emitting units 101.

As described above, a light-emitting device of one embodiment of the present invention includes n joint portion(s) 103 and (n+1) light-emitting units 101 apart from each other with the joint portion positioned therebetween (n is an integer of 1 or more). When the light-emitting device is bent such that a bend line is positioned in the joint portion 103, the light-emitting device 110 can be folded small to have the size of one light-emitting unit 101, without breaking an element included in the light-emitting unit 101. As a result, the light-emitting device of one embodiment of the present invention is highly portable in a folded state, and has high browsability in display in an opened state because of a large light-emitting region.

FIG. 1C illustrates a light-emitting device including four light-emitting units 101 that are apart from one another with one joint portion 103 positioned therebetween.

Even when a light-emitting unit can be bent to a certain curvature radius, bending in two or more directions causes great force to be applied to a region where a bend line in one direction and a bend line in another direction intersect with each other, in which case an element in this region might be broken. In contrast, the light-emitting device of one embodiment of the present invention includes the joint portion that can be bent to a curvature radius smaller than a curvature radius to which the light-emitting unit can be bent. When the device is bent such that a bend line and a region where bend lines in two or more directions intersect with each other are positioned in the joint portion, breakage of the element can be prevented and the curvature radius at the time of bending can be smaller.

Figure 1D:
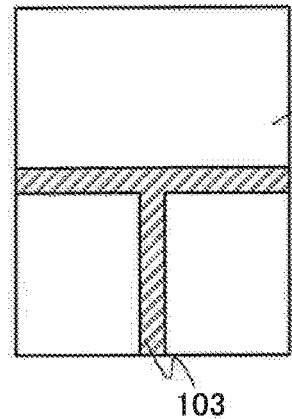

FIG. 1D illustrates a light-emitting device including three light-emitting units 101 that are apart from one another with one joint portion 103 positioned therebetween. Two of the three light-emitting units 101 have the same size and the other one has a different size. In one embodiment of the present invention, the plurality of light-emitting units 101 may have the respective sizes or the same size. Alternatively, some of the plurality of light-emitting units 101 may have the same size.

Figure 1E:
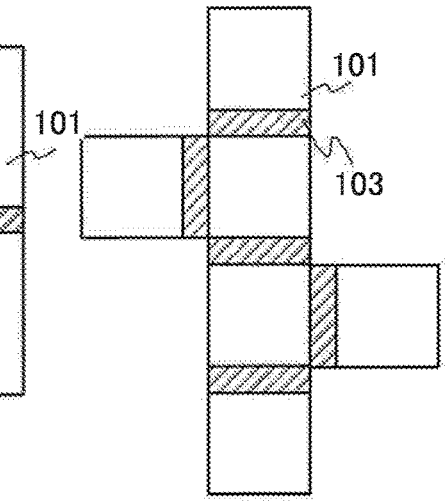

FIG. 1E illustrates a light-emitting device including six light-emitting units 101 that are apart from one another with five joint portions 103 positioned therebetween. In one embodiment of the present invention, there is no limitation on the planar shape of the light-emitting device and the shape can be square or circular, for example. There is no limitation on the planar shape of the light-emitting unit, and the shape can be square or circular, for example.

FIG. 2A1 shows a plan view of a light-emitting device 120 in an opened state and a side view of the light-emitting device 120 seen from a direction denoted by an arrow in the plan view. The light-emitting device 120 includes one joint portion 103 and two light-emitting units 101 apart from each other with the joint portion 103 positioned therebetween. Each of the light-emitting units 101 includes a light-emitting portion 105.

FIGS. 2A2 and 2A3 each show a plan view of the light-emitting device 120 in a folded state and a side view of the light-emitting device 120 seen from a direction denoted by an arrow in the plan view. Specifically, the joint portion is bent inward in FIG. 2A2 such that a light-emitting surface faces inward, and the joint portion is bent outward in FIG. 2A3 such that the light-emitting surface faces outward.

When the light-emitting device of one embodiment of the present invention is not in use, it can be bent such that the light-emitting surfaces of the light-emitting units face inward, whereby the light-emitting surfaces can be prevented from being damaged or contaminated.

When the light-emitting device of one embodiment of the present invention is in use, it can be opened so that all the light-emitting units are used, or it can be bent such that the light-emitting surface of the light-emitting unit faces outward and some of the light-emitting units can be used. Folding the light-emitting device and putting the light-emitting unit that is hidden from a user in anon-light-emitting state can reduce the power consumption of the light-emitting device.

FIG. 2B1 shows a plan view of a light-emitting device 130 in an opened state and a side view of the light-emitting device 130 seen from a direction denoted by an arrow in the plan view. The light-emitting device 130 includes one joint portion 103 and two light-emitting units 101 apart from each other with the joint portion 103 positioned therebetween. Each of the light-emitting units 101 includes the light-emitting portion 105 and a driver circuit portion 107.

In at least one of the plurality of light-emitting units, a driver circuit portion may be provided between the light-emitting portion and a side not adjacent to the joint portion. A modification example in which the position of the driver circuit portion 107 is changed is illustrated in FIG. 2C. FIG. 2C shows a plan view of a light-emitting device 140 in an opened state and a side view of the light-emitting device 140 seen from a direction denoted by an arrow in the plan view.

FIGS. 2B2 and 2B3 each show a plan view of the light-emitting device 130 in a folded state and a side view of the light-emitting device 130 seen from a direction denoted by an arrow in the plan view. Specifically, the joint portion is bent inward in FIG. 2B2 such that a light-emitting surface faces inward, and the joint portion is bent outward in FIG. 2B3 such that the light-emitting surface faces outward.

FIG. 2B4 shows a plan view of the light-emitting device 130 that is opened with the joint portion 103 bent, and two side views of the light-emitting device 130 seen from a direction denoted by an arrow in the plan view. The state illustrated in the upper side view is advantageous in that the gap between two light-emitting portions 105 can be smaller, and the state illustrated in the lower side view is advantageous in that because a step formed between two light-emitting portions 105 can be smaller.

It is preferable to bend the joint portion 103 because the gap between the light-emitting units 101 apart from each other with the joint portion 103 positioned therebetween can be small, which can make display look less separated. It is particularly preferable that the distance between the light-emitting portion 105 and the joint portion 103 be shorter as in the light-emitting device 130 because the gap between the light-emitting units 101 when the joint portion 103 is bent can be smaller. Specifically, the distance between the joint portion 103 and the light-emitting portion 105 is preferably shorter than or equal to 10 mm, and further preferably smaller than or equal to 1 mm.

Note that the light-emitting device of one embodiment of the present invention may be bent at a portion other than the joint portion. An example in which the light-emitting device is bent at the joint portion and a portion other than the joint portion is described below. Note that the light-emitting device of one embodiment of the present invention may be bent at only a portion other than the joint portion.

FIG. 3A shows a plan view of a light-emitting device 150 in an opened state. The light-emitting device 150 may be opened with the joint portion 103 bent twice (mountain-folded and valley-folded) as illustrated in FIG. 2B4. The light-emitting device 150 includes one joint portion 103 and two light-emitting units 101 apart from each other with the joint portion 103 positioned therebetween. Each of the light-emitting units 101 includes the light-emitting portion 105 and the driver circuit portion 107.

FIG. 3B shows a plan view of the light-emitting device 150 that is folded in two by bending the joint portion 103, and two side views of the light-emitting device 150 seen in directions denoted by arrows in the plan view. FIG. 3B illustrates an example in which the light-emitting device 150 is bent along a bend line L1 in FIG. 3A.

FIG. 3C shows a plan view of the light-emitting device 150 and a side view of the light-emitting device 150 seen from a direction denoted by an arrow in the plan view. In FIG. 3C, the light-emitting device 150 that has been folded in two is folded in two again by bending the light-emitting unit 101. FIG. 3C illustrates an example in which the light-emitting device 150 is bent along a bend line L2 in FIG. 3A.

As a modification example, FIGS. 3D and 3E each show a plan view of the light-emitting device 150 and a side view of the light-emitting device 150 seen from a direction denoted by an arrow in the plan view. In each of FIGS. 3D and 3E, the light-emitting device 150 that has been folded in two is folded in three by bending the light-emitting unit 101. FIG. 3D illustrates an example in which the light-emitting device 150 is bent along a bend line L3 in FIG. 3A.

If the light-emitting device 150 is not provided with the joint portion 103 and is bent in two directions to be folded in four or more, great force is applied to a region where bend lines in two directions intersect with each other even when the light-emitting unit can be bent to a certain curvature radius. As a result, an element in this region might be broken. In contrast, the light-emitting device of one embodiment of the present invention includes the joint portion that can be bent to a curvature radius smaller than a curvature radius to which the light-emitting unit can be bent. When the device is bent such that at least one bend line and a region where bend lines in two directions intersect with each other are positioned in the joint portion, breakage of the element can be prevented and the curvature radius at the time of bending can be smaller.

Figure 4A:
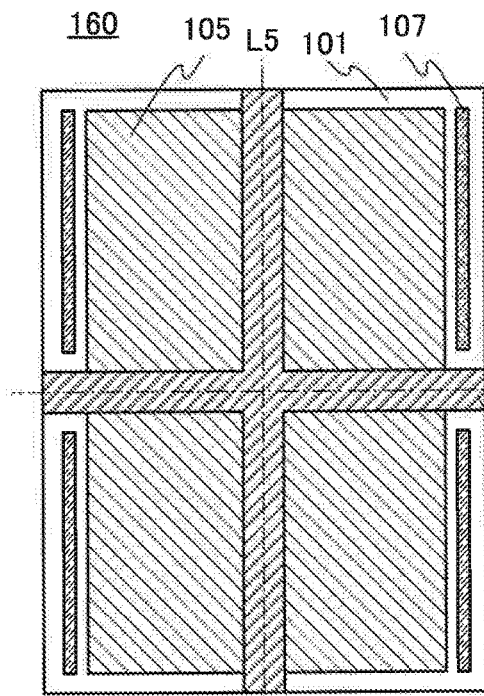
FIGS. 4A to 4D illustrate examples of a light-emitting device.

FIG. 4A shows a plan view of a light-emitting device 160 in an opened state. The light-emitting device 160 includes one joint portion 103 and four light-emitting units 101 apart from one another with the joint portion 103 positioned therebetween. Each of the light-emitting units 101 includes the light-emitting portion 105 and the driver circuit portion 107. As illustrated in FIG. 4D, the light-emitting device 160 may be opened with the joint portion 103 mountain- and valley-folded and not easily seen by a user. In that case, the gap between the plurality of light-emitting units 101 can be small, which can make display look less separated.

Figure 4B:
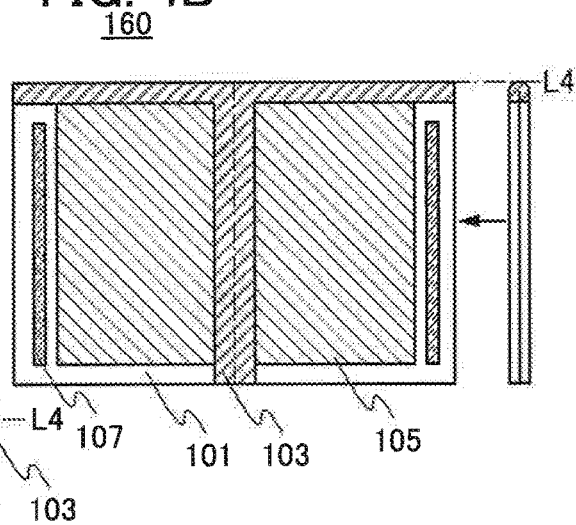

FIG. 4B shows a plan view of the light-emitting device 160 that is folded in two by bending the joint portion 103, and a side view of the light-emitting device 160 seen from a direction denoted by an arrow in the plan view. FIG. 4B illustrates an example in which the light-emitting device 160 is bent along a bend line L4 in FIG. 4A.

Figure 4C:
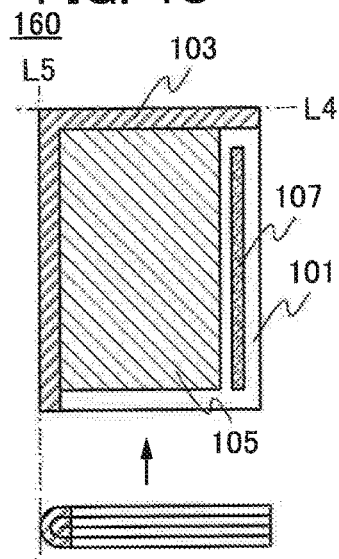
Figure 4D:
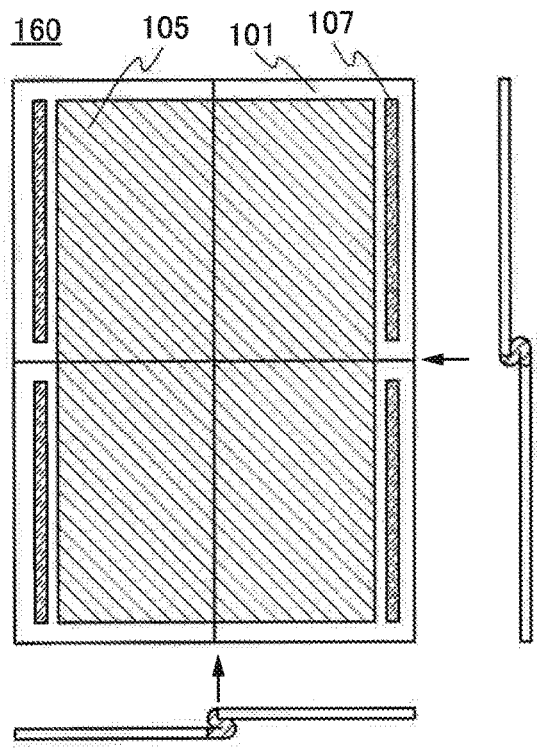

FIG. 4C shows a plan view of the light-emitting device 160 and a side view of the light-emitting device 160 seen from a direction denoted by an arrow in the plan view. In FIG. 4C, the light-emitting device 160 that has been folded in two as in FIG. 4B is folded in two again by bending the joint portion 103. FIG. 4C illustrates an example in which the light-emitting device 160 is bent along a bend line L5 in FIG. 4A.

When the device is bent such that bend lines in two directions and a region where the bend lines in two directions intersect with each other are positioned in the joint portion, breakage of the element can be prevented and the curvature radius at the time of bending can be smaller.

Figure 5A:
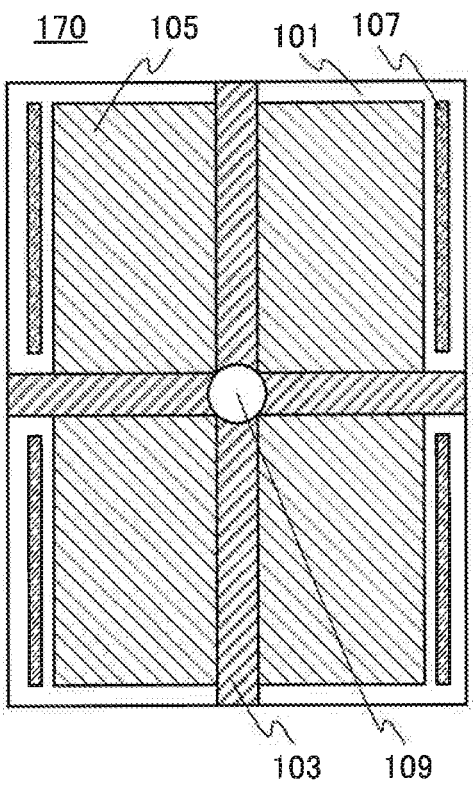
FIGS. 5A to 5D illustrate examples of light-emitting devices.

FIG. 5A illustrates a light-emitting device 170 provided with an opening portion 109 in the joint portion 103. In a region where bend lines in two directions intersect with each other, great force is likely to be applied to a layer included in the joint portion 103. For example, a flexible substrate or the like included in the joint portion 103 is cracked in some cases. Thus, it is preferable that an opening portion be provided in a region to which force is likely to be applied when the light-emitting device is folded, e.g., a region where bend lines in two directions intersect with each other. With this structure, generation of a crack in the region or the like can be inhibited, which can improve the reliability of the light-emitting device.

The opening portion is not limited in position, shape, or size. For example, an opening portion having a circular shape, a square shape, or the like is provided in the joint portion or a region of the light-emitting unit where no element is provided. The number of opening portions in one light-emitting device can be one or more.

Figure 5B:
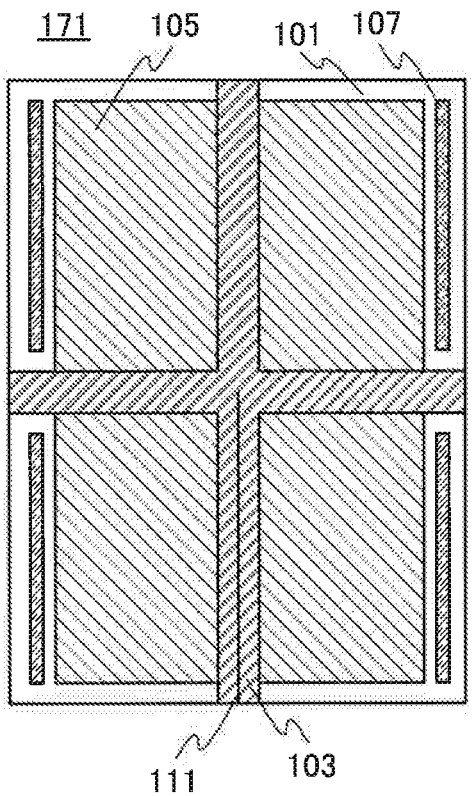
Figure 5C:
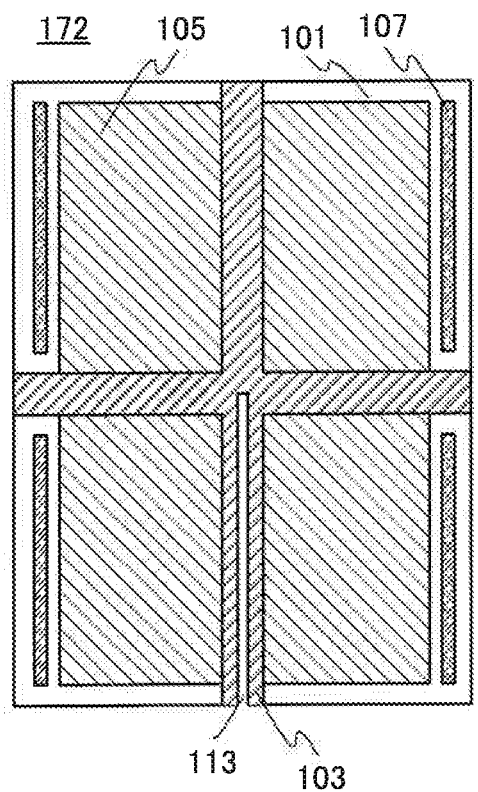

FIG. 5B illustrates a light-emitting device 171 including the joint portion 103 provided with a slit 111. FIG. 5C illustrates a light-emitting device 172 including the joint portion 103 provided with a slit 113 wider than the slit 111. For example, when the light-emitting device is bent in two directions to be folded in four, the light-emitting device that has been folded in two is bent in the second bending. Great force is applied to the part on the second bend line and the region where the bend lines in two directions intersect each other, thereby breaking a layer in the light-emitting device (e.g., the substrate, bonding layer, or element) in some cases. The slit formed in the joint portion 103 can inhibit breakage of the light-emitting device due to the great force at the time of bending the light-emitting device in two or more directions.

The slit, which is not limited in range, may extend from an end portion of the light-emitting device to the region where the bend lines in two directions intersect with each other, for example. The slit is not limited in position, shape, or size. For example, the slit is provided in the joint portion or a region of the light-emitting unit where no element is provided. The number of slits in one light-emitting device can be one or more.

Figure 5D:
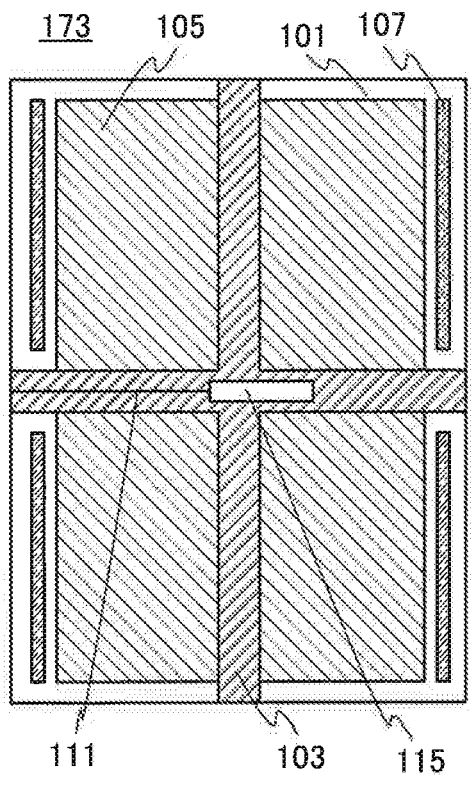
Figure 8A:
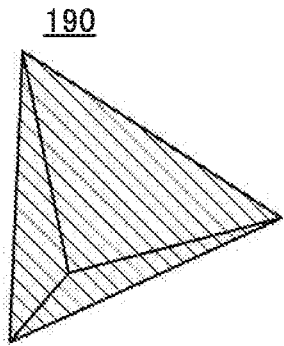
FIGS. 8A to 8E illustrate examples of a light-emitting device.
Figure 8B:
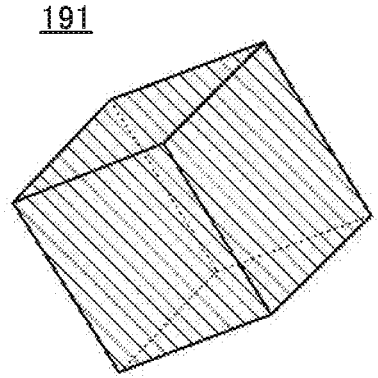
Figure 8C:
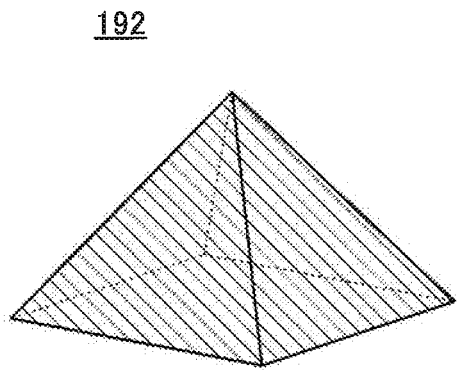
Figure 8D:
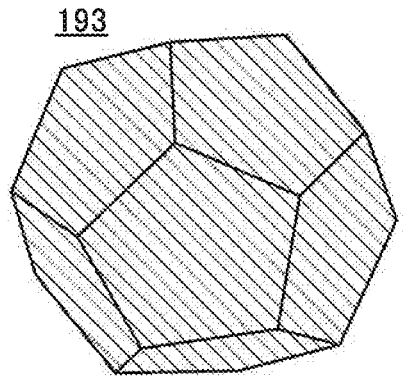
Figure 8E:
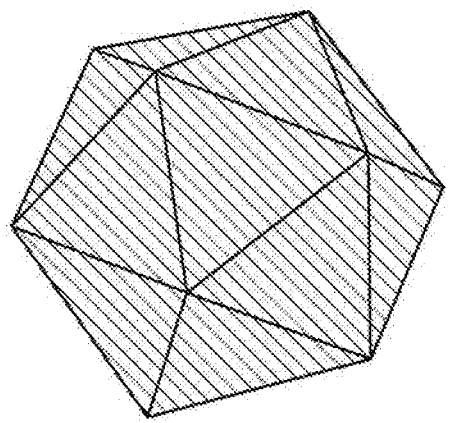

FIG. 5D illustrates a light-emitting device 173 that is provided with the slit 111 and an opening portion 115 in the joint portion 103. When the light-emitting device is provided with both a slit and an opening portion, the slit and the opening portion may be connected to or separated from each other.

When the light-emitting device of one embodiment of the present invention is bent, light-emitting units can be positioned on two or more adjacent planes that are not parallel to each other, which enables a three-dimensional light-emitting region.

FIG. 6A1 illustrates a light-emitting device 180 in an opened state, and FIG. 6A2 illustrates the light-emitting device 180 with a three-dimensional light-emitting region obtained by bending the joint portions 103. FIG. 6A2 illustrates the case where the joint portions 103 are each mountain-folded and valley-folded to reduce the gap between the light-emitting units 101, which are apart from one another with the joint portion 103 positioned therebetween. The light-emitting device 180 includes two joint portions 103 and three light-emitting units 101 apart from one another with the joint portion 103 positioned therebetween.

FIG. 6B1 illustrates a light-emitting device 181 with a three-dimensional light-emitting region obtained by bending the joint portion 103, and FIG. 6B2 is a rear view of the light-emitting device 181 illustrated in FIG. 6B1.

The light-emitting device 181 includes two joint portions 103, two light-emitting units 101*a* and 101*b* apart from each other with one of the joint portions 103 positioned therebetween, and a base 161 apart from the light-emitting unit 101*b* with the other of the joint portions 103 positioned therebetween. FIG. 6B1 illustrates the case where the joint portions 103 are each mountain-folded and valley-folded to reduce the gap between the light-emitting units 101*a* and 101*b*, which are apart from each other with the joint portion 103 positioned therebetween.

In the light-emitting device of one embodiment of the present invention, a unit other than the light-emitting unit may be connected through the joint portion. The unit other than the light-emitting unit may be, for example, two or more kinds of light-emitting units, two or more kinds of display units, a supporting base, or a unit including a camera, a keyboard, a touch panel, or the like. The joint portion is not necessarily used to connect these units (e.g., the light-emitting unit, display unit, and supporting base).

The light-emitting unit 101*a* includes a secondary battery 163 and an antenna 165. In the drawing, the antenna 165 is positioned on a side surface of the light-emitting unit 101*a*; however, the antenna may be positioned on the light-emitting surface or on a surface facing the light-emitting surface. There is no limitation on the position of the secondary battery 163.

An electronic device of one embodiment of the present invention may include a light-emitting device and a secondary battery. It is preferable that the secondary battery can be charged by contactless power transmission. In the electronic device, the secondary battery may be provided in a light-emitting unit, the light-emitting device, another unit, or another device.

As examples of the secondary battery, a lithium battery such as a lithium polymer battery (lithium ion polymer battery) using a gel electrolyte, a lithium ion battery, a nickel-hydride battery, a nickel-cadmium battery, an organic radical battery, a lead-acid battery, an air secondary battery, a nickel-zinc battery, and a silver-zinc battery can be given.

The electronic device of one embodiment of the present invention may include a light-emitting device and an antenna. When a signal is received by the antenna, the light-emitting unit can emit light or display an image, data, or the like. In the electronic device, the antenna may be provided in the light-emitting unit, the light-emitting device, another unit, or another device. When the electronic device includes a secondary battery, the antenna may be used for contactless power transmission.

When a light-emitting device 182 in FIG. 6C that is provided with a slit is bent, light-emitting units can be positioned on two or more adjacent planes that are not parallel to each other, which enables a three-dimensional light-emitting region.

Since the light-emitting unit 101 is flexible, a curved light-emitting region can be obtained as in a light-emitting device 183 illustrated in FIGS. 6D1 and 6D2.

FIG. 7A1 illustrates a light-emitting device 184 that is one embodiment of the present invention. The light-emitting device 184 includes the light-emitting unit 101 having the light-emitting portion 105. The light-emitting device 184 whose four corners are bent toward the center is illustrated in FIG. 7A2.

Because the light-emitting device 184 includes a semiconductor element or a light-emitting element, the curvature radius at the time of bending is preferably set to a value such that the element is not broken.

FIGS. 7B to 7D illustrate a light-emitting device 185, a light-emitting device 186, and a light-emitting device 187 that are embodiments of the present invention. In each of these light-emitting devices, when the four corners are bent toward the center, bend lines are positioned in the joint portion 103 and as a result, the light-emitting device can be folded to a curvature radius smaller than a curvature radius to which the light-emitting device 184 can be folded. In other words, the joint portion allows the light-emitting device to be excellent in portability while remaining thin. Note that the light-emitting device 186 can be folded in eight. The light-emitting unit may include an antenna to perform display in accordance with a signal received by wireless communication.

FIGS. 8A to 8E illustrate examples of the light-emitting device of one embodiment of the present invention, which are respectively a light-emitting device 190 with a regular tetrahedron shape, a light-emitting device 191 with a regular hexahedron shape, a light-emitting device 192 with a quadrangular pyramid shape, a light-emitting device 193 with a regular dodecahedron shape, and a light-emitting device 194 with a regular icosahedron shape. Each of the light-emitting devices includes a light-emitting unit on at least one plane. Each of the light-emitting devices may include light-emitting units on two or more planes. Specifically, the light-emitting devices can each have a three-dimensional light-emitting region by including the light-emitting units on two or more adjacent planes that are not parallel to each other. The light-emitting devices may be capable of being used opened by application of one embodiment of the present invention. In that case, the browsability of display can be high. The light-emitting devices may be capable of being folded after being opened by application of one embodiment of the present invention. In that case, the portability can be high. One light-emitting unit may be placed on one plane or may be placed on two or more planes. In the case where light-emitting units are placed on the respective planes and the joint portion is provided at a boundary between adjacent planes, bending to a smaller curvature radius is possible. When the joint portion is mountain-folded and valley-folded, the light-emitting units on adjacent planes can be in contact with each other, and a three-dimensional light-emitting region in which display looks less separated can be formed. In contrast, when one light-emitting unit is placed over two or more planes, a seamless, three-dimensional light-emitting region can be formed.

Note that there is no limitation on the degree of flexibility of the light-emitting unit in the light-emitting device of one embodiment of the present invention. The light-emitting unit in the light-emitting device of one embodiment of the present invention may be a touch panel including a touch sensor and a light-emitting element.

One embodiment of the present invention can be applied to not only a light-emitting device including a light-emitting unit but also a display device including a display unit. There is no limitation on the degree of flexibility of the display unit. The display unit in the display device of one embodiment of the present invention may be a touch panel including a touch sensor and a display element.

For example, in this specification and the like, a display element, a display device which is a device including a display element, a light-emitting element, and a light-emitting device which is a device including a light-emitting element can employ various modes or can include various elements. The display element, the display device, the light-emitting element, or the light-emitting device includes at least one of an EL element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), an interferometric modulator (IMOD) element, a MEMS shutter display element, an optical-interference-type MEMS display element, an electrowetting element, a piezoelectric ceramic display, a display element including a carbon nanotube, and the like. Other than the above, display media whose contrast, luminance, reflectivity, transmittance, or the like is changed by electrical or magnetic effect may be included. Examples of a display device having an EL element include an EL display. Examples of a display device having an electron emitter include a field emission display (FED) and an SED-type flat panel display (SED: surface-conduction electron-emitter display). Examples of a display device having a liquid crystal element include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption.

For example, in this specification and the like, an active matrix method in which an active element (a non-linear element) is included in a pixel or a passive matrix method in which an active element is not included in a pixel can be used.

In the active matrix method, as an active element, not only a transistor but also various active elements, for example, a metal insulator metal (MIM), a thin film diode (TFD), or the like can be used. Since such an element has a small number of manufacturing steps, manufacturing cost can be reduced or yield can be improved. Alternatively, since the size of the element is small, the aperture ratio can be improved, so that power consumption can be reduced or higher luminance can be achieved.

Since an active element is not used in the passive matrix method, the number of manufacturing steps is small, so that manufacturing cost can be reduced or the yield can be improved. Alternatively, since an active element is not used, the aperture ratio can be improved, so that power consumption can be reduced or higher luminance can be achieved, for example.

Note that an example of the case where a variety of display is performed using the display device is shown here; however, one embodiment of the present invention is not limited thereto. For example, data is not necessarily displayed. As an example, the display device may be used as a lighting device. By using the device as a lighting device, it can be used as interior lighting having an attractive design. Alternatively, in one embodiment of the present invention, it can be used as lighting from which light radiates in various directions. Further alternatively, it may be used as a light source, e.g., a backlight or a front light, not the display device. In other words, it may be used as a lighting device for the display panel.

As described above, one embodiment of the present invention makes it possible to provide the light-emitting device that can be bent to a small curvature radius and that includes the joint portion where a functional element or the like is not included. The light-emitting device of one embodiment of the present invention has high display browsability in an opened state, and has high portability and high carryability while remaining thin when folded. In addition, the light-emitting device of one embodiment of the present invention is robust and highly reliable.

This embodiment can be combined with any other embodiment as appropriate.

Embodiment 2

In this embodiment will be described a structure of a light-emitting panel that can be applied to one embodiment of the present invention, and a method for manufacturing a light-emitting device of one embodiment of the present invention.

In one embodiment of the present invention, although not limited in flexibility, a light-emitting unit is preferably flexible. The light-emitting panels described in this embodiment can be applied to the light-emitting unit in the light-emitting device of one embodiment of the present invention.

When the flexible light-emitting panel described in this embodiment is bent, the minimum curvature radius of a bent portion of the light-emitting panel can be greater than or equal to 1 mm and less than or equal to 150 mm, greater than or equal to 1 mm and less than or equal to 100 mm, greater than or equal to 1 mm and less than or equal to 10 mm, or greater than or equal to 2 mm and less than or equal to 5 mm. There is no limitation on the direction in which the light-emitting panel is bent. Further, the number of bent portions may be one or more than one; for example, the light-emitting panel can be folded in two or three, or even four or more.

Specific Example 1

FIG. 9A is a plan view of a light-emitting panel, and FIG. 9C is an example of a cross-sectional view taken along dashed-dotted line A1-A2 in FIG. 9A. The light-emitting panel in Specific Example 1 is a top-emission light-emitting panel using a color filter method. In this embodiment, the light-emitting panel can have a structure in which subpixels of three colors of, for example, red (R), green (G), and blue (B) express one color, a structure in which subpixels of four colors of R, G, B, and white (W) express one color, or the like. There is no particular limitation on the color element and colors other than R, G, B, and W may be used. For example, yellow, cyan, magenta, and the like may be used.

The light-emitting panel illustrated in FIG. 9A includes a light-emitting portion 804, a driver circuit portion 806, and a flexible printed circuit (FPC) 808. Light-emitting elements and transistors in the light-emitting portion 804 and the driver circuit portion 806 are sealed with a substrate 801, a substrate 803, and a sealing layer 823.

The light-emitting panel illustrated in FIG. 9C includes the substrate 801, a bonding layer 811, an insulating layer 813, a plurality of transistors, a conductive layer 857, an insulating layer 815, an insulating layer 817, a plurality of light-emitting elements, an insulating layer 821, the sealing layer 823, an overcoat 849, a coloring layer 845, a light-blocking layer 847, an insulating layer 843, a bonding layer 841, and the substrate 803. The sealing layer 823, the overcoat 849, the insulating layer 843, the bonding layer 841, and the substrate 803 transmit visible light.

In the light-emitting portion 804, a transistor 820 and a light-emitting element 830 are provided over the substrate 801 with the bonding layer 811 and the insulating layer 813 positioned between the substrate 801 and each of the transistor 820 and the light-emitting element 830. The light-emitting element 830 includes a lower electrode 831 over the insulating layer 817, an EL layer 833 over the lower electrode 831, and an upper electrode 835 over the EL layer 833. The lower electrode 831 is electrically connected to the source electrode or the drain electrode of the transistor 820. An end portion of the lower electrode 831 is covered with the insulating layer 821. The lower electrode 831 preferably reflects visible light. The upper electrode 835 transmits visible light.

In the light-emitting portion 804, the coloring layer 845 overlapping with the light-emitting element 830 and the light-blocking layer 847 overlapping with the insulating layer 821 are provided. The coloring layer 845 and the light-blocking layer 847 are covered with the overcoat 849. The space between the light-emitting element 830 and the overcoat 849 is filled with the sealing layer 823.

The insulating layer 815 has an effect of preventing diffusion of impurities into a semiconductor included in the transistor. As the insulating layer 817, an insulating layer having a planarization function is preferably selected in order to reduce surface unevenness due to the transistor.

In the driver circuit portion 806, a plurality of transistors are provided over the substrate 801 with the bonding layer 811 and the insulating layer 813 positioned therebetween. In FIG. 9C, one of the transistors included in the driver circuit portion 806 is illustrated.

The insulating layer 813 and the substrate 801 are bonded to each other with the bonding layer 811. The insulating layer 843 and the substrate 803 are bonded to each other with the bonding layer 841. It is preferable to use films with low water permeability for the insulating layer 813 and the insulating layer 843, in which case an impurity such as water can be prevented from entering the light-emitting element 830 or the transistor 820, leading to improved reliability of the light-emitting panel.

The conductive layer 857 is electrically connected to an external input terminal through which a signal (e.g., a video signal, a clock signal, a start signal, a reset signal, or the like) or a potential from the outside is transmitted to the driver circuit portion 806. Here, an example in which the FPC 808 is provided as the external input terminal is described. To prevent an increase in the number of manufacturing steps, the conductive layer 857 is preferably formed using the same material and the same step(s) as those of the electrode or the wiring in the light-emitting portion or the driver circuit portion. Here, an example is described in which the conductive layer 857 is formed using the same material and the same step(s) as those of the electrodes of the transistor 820.

In the light-emitting panel illustrated in FIG. 9C, a connector 825 is positioned over the substrate 803. The connector 825 is connected to the conductive layer 857 through an opening provided in the substrate 803, the bonding layer 841, the insulating layer 843, the sealing layer 823, the insulating layer 817, and the insulating layer 815. Furthermore, the connector 825 is connected to the FPC 808. The FPC 808 and the conductive layer 857 are electrically connected to each other through the connector 825. When the conductive layer 857 and the substrate 803 overlap with each other, an opening is formed in the substrate 803 (or a substrate with an opening portion is used) so that the conductive layer 857, the connector 825, and the FPC 808 can be electrically connected to each other.

The light-emitting panel in Specific Example 1 can be manufactured in the following manner: the insulating layer 813, the transistor 820, and the light-emitting element 830 are formed over a formation substrate with high heat resistance; the formation substrate is separated; and the insulating layer 813, the transistor 820, and the light-emitting element 830 are transferred to the substrate 801 and attached thereto with the bonding layer 811. The light-emitting panel in Specific Example 1 can be manufactured in the following manner: the insulating layer 843, the coloring layer 845, and the light-blocking layer 847 are formed over a formation substrate with high heat resistance; the formation substrate is separated; and the insulating layer 843, the coloring layer 845, and the light-blocking layer 847 are transferred to the substrate 803 and attached thereto with the bonding layer 841.

In the case where a material with low heat resistance (e.g., resin) is used for a substrate, it is difficult to expose the substrate to high temperature in the manufacturing process. Thus, there is a limitation on conditions for forming a transistor and an insulating layer over the substrate. Further, in the case where a material with high water permeability (e.g., resin) is used for a substrate of the light-emitting panel, it is preferable to form a film with low water permeability at high temperature between the substrate and a light-emitting element. In the manufacturing method of this embodiment, a transistor and the like can be formed over a formation substrate having high heat resistance; thus, a highly reliable transistor and a film with sufficiently low water permeability can be formed at high temperature. Then, the transistor and the film are transferred to the substrate 801 and the substrate 803, whereby a highly reliable light-emitting panel can be manufactured. Thus, with one embodiment of the present invention, a thin and/or lightweight light-emitting panel with high reliability can be provided. Details of the manufacturing method will be described later.

Specific Example 2

FIG. 9B is a plan view of a light-emitting panel, and FIG. 9D is an example of a cross-sectional view taken along dashed-dotted line A3-A4 in FIG. 9B. The light-emitting panel in Specific Example 2 is a top-emission light-emitting panel using a color filter method, which is different from that in Specific Example 1. Here, the difference from Specific Example 1 is described in detail, and description of the same points is omitted.

The light-emitting panel illustrated in FIG. 9D is different from that in FIG. 9C in the following respects.

The light-emitting panel in FIG. 9D includes a spacer 827 over the insulating layer 821. The spacer 827 can adjust the space between the substrate 801 and the substrate 803.

In the light-emitting panel in FIG. 9D, the substrate 801 and the substrate 803 have different sizes. The connector 825 is positioned over the insulating layer 843, and the connector 825 and the substrate 803 do not overlap with each other. The connector 825 is connected to the conductive layer 857 through an opening provided in the insulating layer 843, the sealing layer 823, the insulating layer 817, and the insulating layer 815. Because an opening does not need to be provided in the substrate 803, there is no limitation on the material for the substrate 803.

Specific Example 3

FIG. 10A is a plan view of a light-emitting panel, and FIG. 10C is an example of a cross-sectional view taken along dashed-dotted line A5-A6 in FIG. 10A. The light-emitting panel in Specific Example 3 is a top-emission light-emitting panel using a separate coloring method.

The light-emitting panel illustrated in FIG. 10A includes the light-emitting portion 804, the driver circuit portion 806, and the FPC 808. A light-emitting element and a transistor in the light-emitting portion 804 and the driver circuit portion 806 are sealed with the substrate 801, the substrate 803, a frame-shaped sealing layer 824, and the sealing layer 823.

The light-emitting panel illustrated in FIG. 10C includes the substrate 801, the bonding layer 811, the insulating layer 813, a plurality of transistors, the conductive layer 857, the insulating layer 815, the insulating layer 817, a plurality of light-emitting elements, the insulating layer 821, the sealing layer 823, the frame-shaped sealing layer 824, and the substrate 803. The sealing layer 823 and the substrate 803 transmit visible light.

The frame-shaped sealing layer 824 preferably has a higher gas barrier property than the sealing layer 823. Accordingly, external moisture or oxygen can be prevented from entering the light-emitting panel. Thus, the light-emitting panel can have high reliability.

In Specific Example 3, light emission from the light-emitting element 830 is transmitted through the sealing layer 823 to be extracted from the light-emitting panel. Therefore, the sealing layer 823 preferably has a higher light-transmitting property than the frame-shaped sealing layer 824. The sealing layer 823 preferably has a higher refractive index than the frame-shaped sealing layer 824. Furthermore, the volume of the sealing layer 823 is preferably less reduced by curing than that of the frame-shaped sealing layer 824.

In the light-emitting portion 804, the transistor 820 and the light-emitting element 830 are provided over the substrate 801 with the bonding layer 811 and the insulating layer 813 positioned between the substrate 801 and each of the transistor 820 and the light-emitting element 830. The light-emitting element 830 includes the lower electrode 831 over the insulating layer 817, the EL layer 833 over the lower electrode 831, and the upper electrode 835 over the EL layer 833. The lower electrode 831 is electrically connected to the source electrode or the drain electrode of the transistor 820. An end portion of the lower electrode 831 is covered with the insulating layer 821. The lower electrode 831 preferably reflects visible light. The upper electrode 835 transmits visible light.

In the driver circuit portion 806, a plurality of transistors are provided over the substrate 801 with the bonding layer 811 and the insulating layer 813 positioned therebetween. In FIG. 10C, one of the transistors included in the driver circuit portion 806 is illustrated.

The insulating layer 813 and the substrate 801 are bonded to each other with the bonding layer 811. It is preferable to use films with low water permeability for the insulating layer 813, in which case an impurity such as water can be prevented from entering the light-emitting element 830 or the transistor 820, leading to improved reliability of the light-emitting panel.

The conductive layer 857 is electrically connected to an external input terminal through which a signal or a potential from the outside is transmitted to the driver circuit portion 806. Here, an example in which the FPC 808 is provided as the external input terminal is described. In this example, the conductive layer 857 is formed using the same material and the same step(s) as those of the electrodes of the transistor 820.

In the light-emitting panel illustrated in FIG. 10C, the connector 825 is positioned over the substrate 803. The connector 825 is connected to the conductive layer 857 through an opening provided in the substrate 803, the sealing layer 823, the insulating layer 817, and the insulating layer 815. Furthermore, the connector 825 is connected to the FPC 808. The FPC 808 and the conductive layer 857 are electrically connected to each other through the connector 825.

The light-emitting panel in Specific Example 3 can be manufactured in the following manner: the insulating layer 813, the transistor 820, and the light-emitting element 830 are formed over a formation substrate with high heat resistance; the formation substrate is separated; and the insulating layer 813, the transistor 820, and the light-emitting element 830 are transferred to the substrate 801 and attached thereto with the bonding layer 811. A transistor and the like can be formed over a formation substrate having high heat resistance; thus, a highly reliable transistor and a film with sufficiently low water permeability can be formed at high temperature. Then, the transistor and the film are transferred to the substrate 801, whereby a highly reliable light-emitting panel can be manufactured. Thus, with one embodiment of the present invention, a thin and/or lightweight light-emitting panel with high reliability can be provided.

Specific Example 4

FIG. 10B is a plan view of a light-emitting panel, and FIG. 10D is an example of a cross-sectional view taken along dashed-dotted line A7-A8 in FIG. 10B. The light-emitting panel in Specific Example 4 is a bottom-emission light-emitting panel using a color filter method.

The light-emitting panel illustrated in FIG. 10D includes the substrate 801, the bonding layer 811, the insulating layer 813, a plurality of transistors, the conductive layer 857, the insulating layer 815, the coloring layer 845, an insulating layer 817a, an insulating layer 817b, a conductive layer 816, a plurality of light-emitting elements, the insulating layer 821, the sealing layer 823, and the substrate 803. The substrate 801, the bonding layer 811, the insulating layer 813, the insulating layer 815, the insulating layer 817a, and the insulating layer 817b transmit visible light.

In the light-emitting portion 804, the transistor 820, a transistor 822, and the light-emitting element 830 are provided over the substrate 801 with the bonding layer 811 and the insulating layer 813 positioned between the substrate 801 and each of the transistor 820, the transistor 822, and the light-emitting element 830. The light-emitting element 830 includes the lower electrode 831 over the insulating layer 817b, the EL layer 833 over the lower electrode 831, and the upper electrode 835 over the EL layer 833. The lower electrode 831 is electrically connected to the source electrode or the drain electrode of the transistor 820. An end portion of the lower electrode 831 is covered with the insulating layer 821. The upper electrode 835 preferably reflects visible light. The lower electrode 831 transmits visible light. There is no particular limitation on the position of the coloring layer 845 overlapping with the light-emitting element 830; for example, the coloring layer 845 is provided between the insulating layer 817a and the insulating layer 817b, or between the insulating layer 815 and the insulating layer 817a.

In the driver circuit portion 806, a plurality of transistors are provided over the substrate 801 with the bonding layer 811 and the insulating layer 813 positioned therebetween. In FIG. 10D, two of the transistors included in the driver circuit portion 806 are illustrated.

The insulating layer 813 and the substrate 801 are bonded to each other with the bonding layer 811. It is preferable to use films with low water permeability for the insulating layer 813, in which case an impurity such as water can be prevented from entering the light-emitting element 830 or the transistors 820 and 822, leading to improved reliability of the light-emitting panel.

The conductive layer 857 is electrically connected to an external input terminal through which a signal or a potential from the outside is transmitted to the driver circuit portion 806. Here, an example in which the FPC 808 is provided as the external input terminal is described. In this example, the conductive layer 857 is formed using the same material and the same step(s) as those of the conductive layer 816.

The light-emitting panel in Specific Example 4 can be manufactured in the following manner: the insulating layer 813, the transistor 820, the light-emitting element 830, and the like are formed over a formation substrate with high heat resistance; the formation substrate is separated; and the insulating layer 813, the transistor 820, the light-emitting element 830, and the like are transferred to the substrate 801 and attached thereto with the bonding layer 811. A transistor and the like can be formed over a formation substrate having high heat resistance; thus, a highly reliable transistor and a film with sufficiently low water permeability can be formed at high temperature. Then, the transistor and the film are transferred to the substrate 801, whereby a highly reliable light-emitting panel can be manufactured. Thus, with one embodiment of the present invention, a thin and/or light-weight light-emitting panel with high reliability can be provided.

Specific Example 5

FIG. 10E illustrates an example of a light-emitting panel that is different from those in Specific Examples 1 to 4.

The light-emitting panel illustrated in FIG. 10E includes the substrate 801, the bonding layer 811, the insulating layer 813, a conductive layer 814, a conductive layer 857a, a conductive layer 857b, the light-emitting element 830, the insulating layer 821, the sealing layer 823, and the substrate 803.

The conductive layer 857a and the conductive layer 857b, which are external connection electrodes of the light-emitting panel, can each be electrically connected to an FPC or the like.

The light-emitting element 830 includes the lower electrode 831, the EL layer 833, and the upper electrode 835. An end portion of the lower electrode 831 is covered with the insulating layer 821. The light-emitting element 830 has a bottom-emission structure, a top-emission structure, or a dual-emission structure. The electrode, substrate, insulating layer, and the like through which light is extracted transmit visible light. The conductive layer 814 is electrically connected to the lower electrode 831.

The substrate through which light is extracted may have, as a light extraction structure, a hemispherical lens, a micro lens array, a film provided with an uneven surface structure, a light diffusing film, or the like. For example, the light extraction structure can be formed by bonding the above lens or film to a resin substrate with an adhesive or the like having substantially the same refractive index as the substrate or the lens or film.

The conductive layer 814 is preferably, though not necessarily, provided because voltage drop due to the resistance of the lower electrode 831 can be inhibited. In addition, for a similar purpose, a conductive layer electrically connected to the upper electrode 835 may be provided over the insulating layer 821, the EL layer 833, the upper electrode 835, or the like.

The conductive layer 814 can be a single layer or a stacked layer formed using a material selected from copper, titanium, tantalum, tungsten, molybdenum, chromium, neodymium, scandium, nickel, and aluminum, an alloy material containing any of these materials as its main component, and the like. The thickness of the conductive layer 814 can be greater than or equal to 0.1 µm and less than or equal to 3 µm, preferably greater than or equal to 0.1 µm and less than or equal to 0.5 µm, for example.

When a paste (e.g., silver paste) is used as a material for the conductive layer electrically connected to the upper electrode 835, metal particles forming the conductive layer aggregate. Consequently, the surface of the conductive layer is rough and has many gaps, so that the conductive layer is difficult to cover with the EL layer 833 completely. Thus, the upper electrode and the conductive layer are electrically connected to each other easily, which is preferable.

The light-emitting panel in Specific Example 5 can be manufactured in the following manner: the insulating layer 813, the light-emitting element 830, and the like are formed over a formation substrate with high heat resistance; the formation substrate is separated; and the insulating layer 813, the light-emitting element 830, and the like are transferred to the substrate 801 and attached thereto with the bonding layer 811. A film with sufficiently low water permeability is formed at high temperature over the formation substrate having high heat resistance and transferred to the substrate 801, whereby a highly reliable light-emitting panel can be manufactured. Thus, with one embodiment of the present invention, a thin and/or lightweight light-emitting panel with high reliability can be provided.

Examples of Materials

Next, materials and the like that can be used for the light-emitting panel are described. Note that description on the constituent parts already described in this specification is omitted in some cases.

For the substrates, a material such as glass, quartz, an organic resin, a metal, or an alloy can be used. The substrate through which light from the light-emitting element is extracted is formed using a material which transmits the light.

It is particularly preferable to use a flexible substrate. For example, glass, a metal, or an alloy that is thin enough to have flexibility, or an organic resin can be used.

An organic resin, which has a specific gravity smaller than that of glass, is preferably used for the flexible substrate, in which case the light-emitting panel can be lightweight compared with the case where glass is used.

It is preferable that a material with high toughness be used for the substrates. In that case, a robust light-emitting panel with high impact resistance can be provided. For example, when an organic resin substrate or a metal or alloy substrate with a small thickness is used, the light-emitting panel can be lightweight and robust as compared with the case where a glass substrate is used.

A metal material and an alloy material, which have high thermal conductivity, are preferred because they can easily conduct heat to the whole substrate and accordingly can prevent a local temperature rise in the light-emitting panel. The thickness of a substrate using a metal material or an alloy material is preferably greater than or equal to 10 μm and less than or equal to 200 μm, further preferably greater than or equal to 20 μm and less than or equal to 50 μm.

Although there is no particular limitation on a material for the metal substrate and alloy substrate, it is preferable to use, for example, aluminum, copper, nickel, a metal alloy such as an aluminum alloy or stainless steel.

Furthermore, when a material with high thermal emissivity is used for the substrate, the surface temperature of the light-emitting panel can be prevented from rising, leading to prevention of breakage or a decrease in reliability of the light-emitting panel. For example, the substrate may have a stacked-layer structure of a metal substrate and a layer with high thermal emissivity (e.g., the layer can be formed using a metal oxide or a ceramic material).

Examples of such a material having flexibility and a light-transmitting property include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose coefficient of thermal expansion is low is preferred, and for example, a polyamide imide resin, a polyimide resin, or PET can be suitably used. A substrate in which a fibrous body is impregnated with a resin (also referred to as prepreg) or a substrate whose coefficient of thermal expansion is reduced by mixing an organic resin with an inorganic filler can also be used.

The flexible substrate may have a stacked-layer structure in which a hard coat layer (such as a silicon nitride layer) by which a surface of the device is protected from damage, a layer (such as an aramid resin layer) which can disperse pressure, or the like is stacked over a layer of any of the above-mentioned materials.

The flexible substrate may be formed by stacking a plurality of layers. When a glass layer is used, a barrier property against water and oxygen can be improved and thus a reliable light-emitting panel can be provided.

A flexible substrate in which a glass layer, a bonding layer, and an organic resin layer are stacked from the side closer to a light-emitting element is preferably used. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and a high flexibility. The thickness of the organic resin layer is greater than or equal to 10 μm and less than or equal to 200 μm, preferably greater than or equal to 20 μm and less than or equal to 50 μm. Providing such an organic resin layer outside the glass layer, occurrence of a crack or a break in the glass layer can be suppressed and mechanical strength can be improved. With the substrate that includes such a composite material of a glass material and an organic resin, a highly reliable and flexible light-emitting panel can be provided.

As the bonding layer or the sealing layer, various curable adhesives such as a reactive curable adhesive, a thermosetting adhesive, an anaerobic adhesive, and a photo curable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Further alternatively, an adhesive sheet or the like may be used.

Further, the resin may include a drying agent. For example, a substance that adsorbs moisture by chemical adsorption, such as oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can prevent an impurity such as moisture from entering the functional element, thereby improving the reliability of the light-emitting panel.

In addition, a filler with a high refractive index or a light scattering member is mixed into the resin, in which case the efficiency of light extraction from the light-emitting element can be improved. For example, titanium oxide, barium oxide, zeolite, zirconium, or the like can be used.

There is no particular limitation on the structure of the transistors in the light-emitting panel. For example, a forward staggered transistor or an inverted staggered transistor may be used. Further, a top-gate transistor or a bottom-gate transistor may be used. There is no particular limitation on a semiconductor material used for the transistors, and for example, silicon or germanium can be used. Alternatively, an oxide semiconductor containing at least one of indium, gallium, and zinc, such as an In—Ga—Zn-based metal oxide, may be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

For stable characteristics of the transistor, a base film is preferably provided. The base film can be formed with an inorganic insulating film such as a silicon oxide film, a silicon nitride film, a silicon oxynitride film, or a silicon nitride oxide film to have a single-layer structure or a stacked-layer structure. The base film can be formed by a sputtering method, a chemical vapor deposition (CVD) method (e.g., a plasma CVD method, a thermal CVD method, or a metal organic CVD (MOCVD) method), an atomic layer deposition (ALD) method, a coating method, a printing method, or the like. Note that the base film is not necessarily provided if not necessary. In each of the above structural examples, the insulating layer 813 can serve as a base film of the transistor.

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may have any of a top-emission structure, a bottom-emission structure, and a dual-emission structure. A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed thin so as to have a light-transmitting property. Alternatively, a stack of any of the above materials can be used as the conductive layer. For example, a stacked film of ITO and an alloy of silver and magnesium is preferably used, in which case conductivity can be increased. Further alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, copper, and palladium, or an alloy of silver and magnesium can be used for the conductive film. An alloy of silver and copper is preferable because of its high heat resistance. Further, by stacking a metal film or a metal oxide film in contact with an aluminum alloy film, oxidation of the aluminum alloy film can be suppressed. Examples of a material for the metal film or the metal oxide film are titanium and titanium oxide. Alternatively, the conductive film having a property of transmitting visible light and a film containing any of the above metal materials may be stacked. For example, a stacked film of silver and ITO or a stacked film of an alloy of silver and magnesium and ITO can be used.

Each of the electrodes may be formed by an evaporation method or a sputtering method. A discharging method such as an ink-jet method, a printing method such as a screen printing method, or a plating method may also be used.

When a voltage higher than the threshold voltage of the light-emitting element is applied between the lower electrode 831 and the upper electrode 835, holes are injected to the EL layer 833 from the anode side and electrons are injected to the EL layer 833 from the cathode side. The injected electrons and holes are recombined in the EL layer 833 and a light-emitting material contained in the EL layer 833 emits light.

The EL layer 833 includes at least a light-emitting layer. In addition to the light-emitting layer, the EL layer 833 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron-transport property and a high hole-transport property), and the like.

For the EL layer 833, either a low molecular compound or a high molecular compound can be used, and an inorganic compound may also be contained. Each of the layers included in the EL layer 833 can be formed by any of the following methods: an evaporation method (including a vacuum evaporation method), a transfer method, a printing method, an ink-jet method, a coating method, and the like.

The light-emitting element is preferably provided between a pair of insulating films with low water permeability. In this way, an impurity such as water can be prevented from entering the light-emitting element, leading to prevention of a decrease in the reliability of the light-emitting device.

As an insulating film with low water permeability, a film containing nitrogen and silicon (e.g., a silicon nitride film or a silicon nitride oxide film), a film containing nitrogen and aluminum (e.g., an aluminum nitride film), or the like can be used. Alternatively, a silicon oxide film, a silicon oxynitride film, an aluminum oxide film, or the like can be used.

For example, the water vapor transmittance of the insulating film with low water permeability is lower than or equal to $1\times10^{-5}$ [g/m$^2$·day], preferably lower than or equal to $1\times10^{-6}$ [g/m$^2$·day], further preferably lower than or equal to $1\times10^{-7}$ [g/m$^2$·day], still further preferably lower than or equal to $1\times10^{-8}$ [g/m$^2$·day].

It is preferable to use insulating films with low water permeability for the insulating layer 813 and the insulating layer 843.

As the insulating layer 815, for example, an inorganic insulating film such as a silicon oxide film, a silicon oxynitride film, or an aluminum oxide film can be used. For example, as the insulating layer 817, the insulating layer 817a, and the insulating layer 817b, an organic material such as polyimide, acrylic, polyamide, polyimide amide, or a benzocyclobutene-based resin can be used. Alternatively, a low-dielectric constant material (a low-k material) or the like can be used. Furthermore, the insulating layers may each be formed by stacking a plurality of insulating films.

The insulating layer 821 is formed using an organic insulating material or an inorganic insulating material. As a resin, for example, a polyimide resin, a polyamide resin, an acrylic resin, a siloxane resin, an epoxy resin, or a phenol resin can be used. It is particularly preferable that the insulating layer 821 be formed to have an inclined side wall with continuous curvature, using a photosensitive resin material.

There is no particular limitation on the method for forming the insulating layer 821; a photolithography method, a sputtering method, an evaporation method, a droplet discharging method (e.g., an ink-jet method), a printing method (e.g., a screen printing method or an off-set printing method), or the like may be used.

The spacer 827 can be formed using an inorganic insulating material, an organic insulating material, a metal material, or the like. As the inorganic insulating material and the organic insulating material, for example, a variety of materials that can be used for the insulating layer can be used. As the metal material, titanium, aluminum, or the like can be used. When the spacer 827 containing a conductive material and the upper electrode 835 are electrically connected to each other, a potential drop due to the resistance of the upper electrode 835 can be suppressed. The spacer 827 may have either a tapered shape or an inverse tapered shape.

For example, a conductive layer used for the light-emitting panel and functioning as an electrode or a wiring of the transistor, an auxiliary wiring of the light-emitting element, or the like can be formed to have a single-layer structure or a layered structure using any of metal materials such as molybdenum, titanium, chromium, tantalum, tungsten, aluminum, copper, neodymium, and scandium, and an alloy material containing any of these elements. The conductive layer may be formed using a conductive metal oxide. As the conductive metal oxide, indium oxide (e.g., $In_2O_3$), tin oxide (e.g., $SnO_2$), zinc oxide (ZnO), ITO, indium zinc oxide (e.g., $In_2O_3$—ZnO), or any of these metal oxide materials in which silicon oxide is contained can be used.

The coloring layer is a colored layer that transmits light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. Each coloring layer is formed in a desired position with any of various materials by a printing method, an inkjet method, an etching method using a photolithography method, or the like.

The light-blocking layer is provided between the adjacent coloring layers. The light-blocking layer blocks light emitted from an adjacent light-emitting element to prevent color mixture between adjacent light-emitting elements. Here, the coloring layer is provided such that its end portion overlaps with the light-blocking layer, whereby light leakage can be reduced. As the light-blocking layer, a material that can block light from the light-emitting element can be used; for example, a black matrix may be formed using a resin material containing a metal material, pigment, or dye. Note that it is preferable to provide the light-blocking layer in a region other than the light-emitting portion, such as a driver circuit portion, in which case undesired leakage of guided light or the like can be suppressed.

Furthermore, an overcoat covering the coloring layer and the light-blocking layer may be provided. The overcoat can prevent an impurity and the like contained in the coloring layer from being diffused into the light-emitting element. The overcoat is formed with a material that transmits light emitted from the light-emitting element; for example, an inorganic insulating film such as a silicon nitride film or a silicon oxide film, an organic insulating film such as an acrylic film or a polyimide film can be used, and further, a stacked structure of an organic insulating film and an inorganic insulating film may be employed.

In the case where upper surfaces of the coloring layer and the light-blocking layer are coated with a material of the sealing layer, a material that has high wettability with respect to the material of the sealing layer is preferably used as the material of the overcoat. For example, an oxide conductive film such as an ITO film or a metal film such as an Ag film which is thin enough to transmit light is preferably used as the overcoat.

For the connector, it is possible to use a paste-like or sheet-like material that is obtained by mixing metal particles into a thermosetting resin and for which anisotropic electric conductivity is provided by thermocompression bonding. As the metal particles, particles in which two or more kinds of metals are layered, for example, nickel particles coated with gold are preferably used.

Example of Manufacturing Method of
Light-Emitting Device

Next, an example of a method for manufacturing a light-emitting device of one embodiment of the present invention will be described with reference to FIGS. 11A and 11B, FIGS. 12A and 12B, FIGS. 13A and 13B, FIGS. 14A and 14B, FIGS. 15A and 15B, FIGS. 16A and 16B, FIGS. 17A to 17C, and FIGS. 18A and 18B.

FIG. 11A is a plan view of the light-emitting device manufactured in this embodiment. FIG. 11B illustrates examples of cross sections taken along dashed-dotted lines M1-M2 and N1-N2 in FIG. 11A. FIGS. 17A and 17B each illustrate a modification example of a cross section taken along dashed-dotted line M1-M2 in FIG. 11A.

The light-emitting device illustrated in FIG. 11A includes two light-emitting units 881 each including the light-emitting portion 804 and the driver circuit portion 806, and a joint portion 809 between the two light-emitting units 881.

The light-emitting units 881 illustrated in FIG. 11B and FIGS. 17A and 17B have the same structure as the light-emitting panel described in Specific Example 1 (FIG. 9C) except that the overcoat 849 is not provided in the light-emitting portion 804 and the driver circuit portion 806.

The joint portion 809 in FIG. 11B includes the substrate 801, the substrate 803, and the bonding layer 841.

The joint portion 809 in FIG. 17A includes the substrate 801, the substrate 803, the insulating layer 813, a gate insulating layer of a transistor, the insulating layer 815, the sealing layer 823, the insulating layer 843, the bonding layer 811, and the bonding layer 841.

The joint portion 809 in FIG. 17B includes the substrate 801, the substrate 803, the insulating layer 813, the gate insulating layer of the transistor, the insulating layer 815, the insulating layer 817, the sealing layer 823, the light-blocking layer 847, the insulating layer 843, the bonding layer 811, and the bonding layer 841.

In this embodiment, the joint portion 809 does not include a wiring or a functional element such as a semiconductor element, a light-emitting element, a display element, or a capacitor. Accordingly, breakage of the functional element at the time of bending the joint portion 809 can be prevented. The joint portion 809 is preferably made of only a material with high bendability. When having high bendability, the insulating layer 813, the gate insulating layer of the transistor, the insulating layer 815, the insulating layer 817, the light-blocking layer 847, the insulating layer 843, and the like may be included in the joint portion 809 as illustrated in FIGS. 17A and 17B.

An example of a method for manufacturing the light-emitting device illustrated in FIG. 11B will be described below. By this method, the structures in Specific Examples 1 and 2 (FIGS. 9C and 9D) and the like can also be manufactured.

Figure 12A:
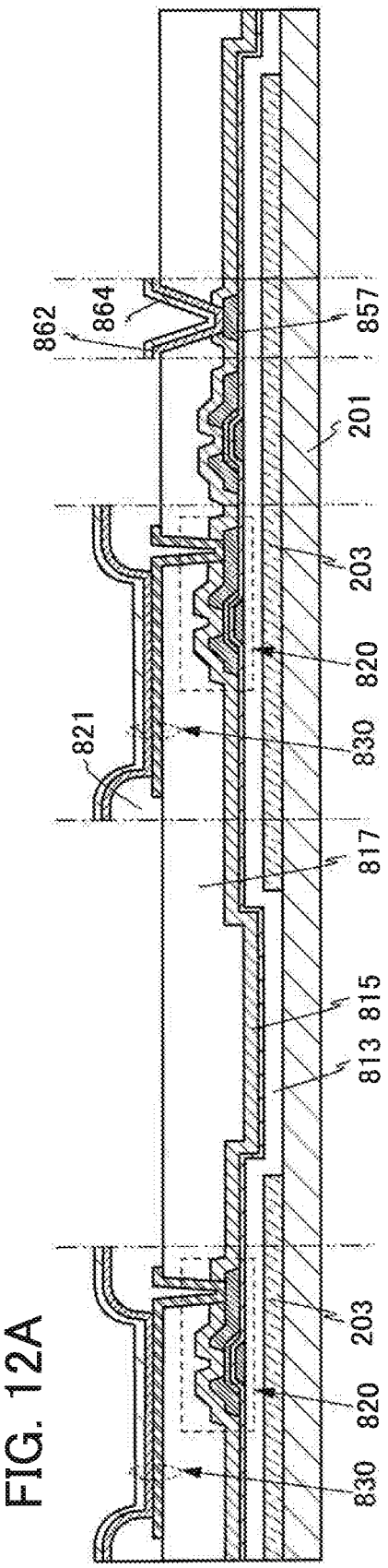
FIGS. 12A and 12B illustrate an example of a method for manufacturing a light-emitting device.

First, a separation layer 203 is formed over a formation substrate 201, and the insulating layer 813 is formed over the separation layer 203. Next, a plurality of transistors (the transistor 820 and the like), the conductive layer 857, the insulating layer 815, the insulating layer 817, a plurality of light-emitting elements (the light-emitting element 830 and the like), and the insulating layer 821 are formed over the insulating layer 813. An opening is formed in the insulating layers 821, 817, and 815 to expose the conductive layer 857. Here, an EL layer 862 is formed over the exposed conductive layer 857 using the same material and the same process as the EL layer of the light-emitting element, and a conductive layer 864 is formed over the EL layer 862 using the same material and the same process as the upper electrode of the light-emitting element (FIG. 12A). Note that the EL layer 862 and the conductive layer 864 are not necessarily provided.

Figure 12B:
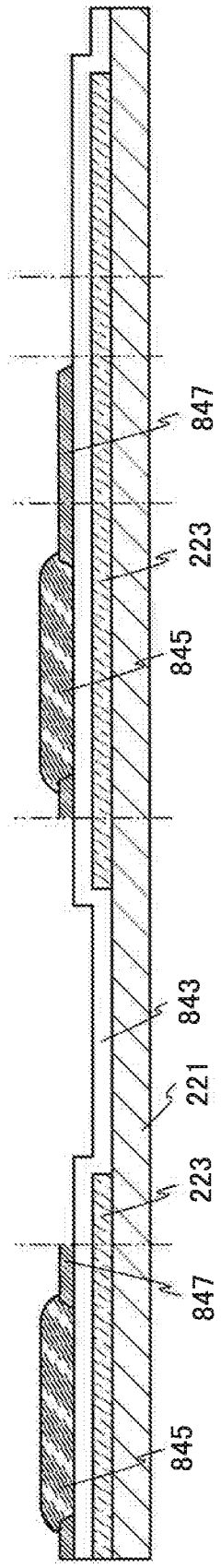

Further, a separation layer 223 is formed over a formation substrate 221, and the insulating layer 843 is formed over the separation layer 223. Then, the light-blocking layer 847 and the coloring layer 845 are formed over the insulating layer 843 (FIG. 12B). Although not shown, an overcoat may be provided to cover the light-blocking layer 847 and the coloring layer 845 as illustrated in FIG. 9B.

In FIGS. 12A and 12B, over each of the formation substrates, one island-like separation layer is formed per light-emitting unit. The shapes of the separation layers over the formation substrates may be the same or different. FIG. 13A illustrates the case where the separation layer 203 and the separation layer 223 have the same size. Note that the insulating layer 813, the insulating layer 815, the insulating layer 817, the insulating layer 843, and the like may be formed to have an island shape. For example, a structure may be employed in which, over the formation substrate, a layer to be separated is formed in only a region overlapping with the separation layer and nothing is formed in a region not provided with the separation layer. Note that layers formed over the separation layer are collectively referred to as the layer to be separated in some cases. For example, the insulating layer 813, the light-emitting element 830 (or the conductive layer 864), and constituent parts therebetween in FIG. 12A can be referred to as the layer to be separated.

As will be described below with reference to drawings including FIG. 17C, in one embodiment of the present invention, one island-like separation layer may be formed for a plurality of light-emitting units.

In this step, the material of the separation layer is selected such that peeling occurs at the interface between the formation substrate and the separation layer, the interface between the separation layer and the layer to be separated, or in the separation layer when the layer to be separated is peeled from the formation substrate. In this embodiment, an example in which peeling occurs at the interface between the insulating layer 813 and the separation layer 203 and between the insulating layer 843 and the separation layer 223 is described; however, one embodiment of the present invention is not limited to such an example and depends on a material used for the separation layer or the layer to be separated. Note that in the case where the layer to be separated has a stacked-layer structure, a layer in contact with the separation layer is particularly referred to as a first layer, in some cases. For example, the first layer is the insulating layer 813 with a single-layer structure, or a layer that is included in the insulating layer 813 with a stacked-layer structure and is in contact with the separation layer.

As the formation substrate, a substrate having at least heat resistance high enough to withstand process temperature in a manufacturing process is used. For example, a glass substrate, a quartz substrate, a sapphire substrate, a semiconductor substrate, a ceramic substrate, a metal substrate, a resin substrate, or a plastic substrate can be used.

Note that it is preferable to use a large-sized glass substrate as the formation substrate in terms of productivity. For example, a glass substrate having any of the following sizes or a larger size can be used: the 3rd generation (550 mm×650 mm), the 3.5th generation (600 mm×720 mm or 620 mm×750 mm), the 4th generation (680 mm×880 mm or 730 mm×920 mm), the 5th generation (1100 mm×1300 mm), the 6th generation (1500 mm×1850 mm), the 7th generation (1870 mm×2200 mm), the 8th generation (2200 mm×2400 mm), the 9th generation (2400 mm×2800 mm or 2450 mm×3050 mm), and the 10th generation (2950 mm×3400 mm).

For the glass substrate, for example, a glass material such as aluminosilicate glass, aluminoborosilicate glass, or barium borosilicate glass can be used. When the temperature of heat treatment performed later is high, a substrate having a strain point of 730° C. or higher is preferably used. Note that when containing a large amount of barium oxide (BaO), the glass substrate can be heat-resistant and more practical. Alternatively, crystallized glass or the like may be used.

In the case where a glass substrate is used as the formation substrate, an insulating film such as a silicon oxide film, a silicon oxynitride film, a silicon nitride film, or a silicon nitride oxide film is preferably formed between the formation substrate and the separation layer, in which case contamination from the glass substrate can be prevented.

The separation layer 203 and the separation layer 223 can each have a single-layer structure or a stacked-layer structure containing an element selected from tungsten, molybdenum, titanium, tantalum, niobium, nickel, cobalt, zirconium, zinc, ruthenium, rhodium, palladium, osmium, iridium, and silicon; an alloy material containing any of the elements; or a compound material containing any of the elements. A crystal structure of a layer containing silicon may be amorphous, microcrystal, or polycrystal. Furthermore, a metal oxide such as aluminum oxide, gallium oxide, zinc oxide, titanium dioxide, indium oxide, indium tin oxide, indium zinc oxide, or an In—Ga—Zn oxide can be used. The separation layer is preferably formed using a high-melting point metal material such as tungsten, titanium, or molybdenum, in which case the degree of freedom of the process for forming the layer to be separated can be increased.

The separation layer can be formed by a sputtering method, a plasma CVD method, a coating method, a printing method, or the like. Note that a coating method includes a spin coating method, a droplet discharge method, and a dispensing method. The thickness of the separation layer can be, for example, 0.1 nm or more, 10 nm or more, or 20 nm or more. Furthermore, the thickness of the separation layer can be, for example, 200 nm or less, 100 nm or less, less than 10 nm, or 5 nm or less.

In the case where the separation layer has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum may be formed. Note that the mixture of tungsten and molybdenum corresponds to an alloy of tungsten and molybdenum, for example.

In the case where the separation layer is formed to have a stacked-layer structure including a layer containing tungsten and a layer containing an oxide of tungsten, the layer containing an oxide of tungsten may be formed as follows: the layer containing tungsten is formed first and an insulating film formed of an oxide is formed thereover, so that the layer containing an oxide of tungsten is formed at the interface between the tungsten layer and the insulating film. Alternatively, the layer containing an oxide of tungsten may be formed by performing thermal oxidation treatment, oxygen plasma treatment, nitrous oxide ($N_2O$) plasma treatment, treatment with a highly oxidizing solution such as ozone water, or the like on the surface of the layer containing tungsten. Plasma treatment or heat treatment may be performed in an atmosphere of oxygen, nitrogen, or nitrous oxide alone, or a mixed gas of any of these gasses and another gas. Surface condition of the separation layer is changed by the plasma treatment or heat treatment, whereby adhesion between the separation layer and the insulating film formed later can be controlled.

Note that the separation layer is not necessarily provided in the case where separation at an interface between the formation substrate and the layer to be separated is possible. For example, a glass substrate is used as the formation substrate, and an organic resin such as polyimide, polyester, polyolefin, polyamide, polycarbonate, or acrylic is formed in contact with the glass substrate. Next, adhesion between the formation substrate and the organic resin is improved by laser light irradiation or heat treatment. Then, an insulating film, a transistor, and the like are formed over the organic resin. After that, peeling at the interface between the formation substrate and the organic resin can be performed by performing laser light irradiation with energy density higher than that of the previous laser light irradiation or performing heat treatment at a temperature higher than that of the previous heat treatment. Moreover, the interface between the formation substrate and the organic resin may be soaked in a liquid to be separated when peeled.

Since the insulating film, the transistor, and the like are formed over the organic resin having low heat resistance in the above method, it is not possible to expose the substrate to high temperatures in the manufacturing process. Here, a manufacturing process at high temperatures is dispensable for a transistor including an oxide semiconductor; therefore, the transistor can be favorably formed over the organic resin.

The organic resin may be used for a substrate of the device. Alternatively, the organic resin may be removed and another substrate may be bonded to an exposed surface of the layer to be separated using an adhesive.

Alternatively, separation at the interface between a metal layer and the organic resin may be performed in the following manner: the metal layer is provided between the formation substrate and the organic resin and current is made to flow in the metal layer so that the metal layer is heated.

There is no particular limitation on a layer formed as the layer to be separated. In this embodiment, the insulating layer 813 on and in contact with the separation layer 203, a functional element over the insulating layer 813, and the like are formed as the layer to be separated.

Each of the insulating layers can be formed by a sputtering method, a plasma CVD method, a coating method, a printing method, or the like. For example, the insulating layer is formed at a temperature of higher than or equal to 250° C. and lower than or equal to 400° C. by a plasma CVD method, whereby the insulating layer can be a dense film with very low water permeability.

Then, a material for the sealing layer 823 is placed on a surface of the formation substrate 221 over which the coloring layer 845 and the like are formed or a surface of the formation substrate 201 over which the light-emitting element 830 and the like are formed, and the formation substrate 201 and the formation substrate 221 are attached so that these two surfaces face each other with the sealing layer 823 positioned therebetween. Then, the sealing layer 823 is cured (FIG. 13A). Here, a frame-shaped partition 828 and the sealing layer 823 on the inner side than the partition 828 are provided and then the formation substrate 201 and the formation substrate 221 face each other to be attached to each other.

Note that the formation substrate 201 and the formation substrate 221 are preferably attached to each other in a reduced-pressure atmosphere.

The sealing layer 823 is positioned to overlap with the separation layer 203, the layer to be separated, and the separation layer 223. When there is a region where the sealing layer 823 does not overlap with the separation layer on the side where separation is desirably performed first, failure of separation is likely to occur depending on the area of the region and a degree of adhesion between the sealing layer 823 and a layer in contact therewith. Thus, an end portion of the sealing layer 823 is preferably positioned on an inner side than at least an end portion of either the separation layer 203 or the separation layer 223 (the separation layer which is desirably peeled first). Note that the end portion of the sealing layer 823 and that of the separation layer may overlap with each other. Accordingly, strong adhesion between the formation substrate 201 and the formation substrate 221 can be suppressed; thus, a decrease in yield of a subsequent peeling process can be suppressed.

In this embodiment, the frame-shaped partition 828 is provided, and the portion surrounded by the partition 828 is filled with the sealing layer 823. Accordingly, expansion of the sealing layer 823 to the outside of the separation layer and a further decrease in yield of the peeling process can be suppressed. Thus, the yield of the peeling process can be improved.

It is particularly preferable that an end portion of the frame-shaped partition 828 be positioned on an inner side than the end portion of the separation layer. Accordingly, the end portion of the sealing layer 823 can also be positioned on an inner side than the end portion of the separation layer. Note that the end portion of the partition 828 and that of the separation layer may overlap with each other.

There is no particular limitation on the formation order of the partition 828 and the sealing layer 823. For example, the partition 828 may be formed by a coating method or the like after the sealing layer 823 is formed by a screen printing method or the like. Alternatively, after the partition 828 is formed by a coating method or the like, the sealing layer 823 may be formed using a device or the like employing a one drop fill (ODF) method.

Note that the partition 828 is not necessarily provided in the case where the sealing layer 823 does not spread (or does not easily spread) outside the separation layer because of, for example, low fluidity of the bonding layer 823 or the use of an adhesive sheet as the sealing layer 823.

The material that can be used for the partition 828 is similar to that can be used for the sealing layer 823.

The partition 828 may be in any of a cured state, a semi-cured state, and an uncured state as long as the sealing layer 823 can be prevented from spreading outside of the separation layer. When the partition 828 is in a cured state, it can be used, together with the sealing layer 823, as a layer for sealing the layer to be separated after separation; thus, deterioration of the functional element due to entry of moisture in the air can be suppressed. Note that when the partition 828 is cured, it is preferable that the end portion of the partition 828 not be positioned on an outer side than the end portion of the separation layer so that a decrease in yield of the peeling process can be prevented.

Next, a separation trigger is formed by laser light irradiation.

Either the formation substrate 201 or the formation substrate 221 may be separated first. In the case where the separation layers have different sizes or thicknesses, a substrate over which a larger or thicker separation layer is formed may be separated first or a substrate over which a smaller or thinner separation layer is formed may be separated first. In the case where a functional element such as a semiconductor element, a light-emitting element, or a display element is formed only over one of the substrates, the substrate on the side where the element is formed may be separated first or the other substrate may be separated first. Here, an example in which the formation substrate 201 is separated first is described.

A region where the sealing layer 823 in a cured state or the partition 828 in a cured state, the layer to be separated, and the separation layer 203 overlap with one another is irradiated with laser light. In the case where the partition 828 is in a cured state, a region where the partition 828, the layer to be separated, and the separation layer 203 overlap with one another is preferably irradiated with laser light.

In the example described here, the sealing layer 823 is in a cured state and the partition 828 is not in a cured state, and the sealing layer 823 in a cured state is irradiated with laser light.

Part of the first layer can be removed and the separation trigger (see a region surrounded by a dashed line in FIG. 13A) can be formed by cracking at least the first layer (i.e., the insulating layer 813, or a layer that is included in the insulating layer 813 and is in contact with the separation layer 203). At this time, not only the first layer but also the separation layer 203, the sealing layer 823, or another layer included in the layer to be separated may be partly removed. Laser light irradiation enables part of the films to be dissolved, evaporated, or thermally broken.

It is preferable that laser light irradiation be performed from the substrate side provided with the separation layer which is desirably separated. In the case where a region where the separation layer 203 and the separation layer 223 overlap with each other is irradiated with laser light, the formation substrate 201 and the separation layer 203 can be selectively separated by cracking (causing break or crack) only the insulating layer 813 and not the insulating layer 843.

When a separation trigger is formed in both the insulating layer 813 and the insulating layer 843 in the case where the region where the separation layer 203 and the separation layer 223 overlap with each other is irradiated with laser light, it might be difficult to selectively separate one of the formation substrates. Therefore, only one of the insulating layer 813 and the insulating layer 843 needs to be cracked, which limits laser light irradiation conditions in some cases.

It is preferable that at a peeling process, force of separating the layer to be separated and the separation layer be concentrated at the separation trigger; therefore, it is preferable to form the separation trigger not at the center portion of the sealing layer 823 in a cured state or the partition 828 but in the vicinity of the end portion. It is particularly preferable to form the separation trigger in the vicinity of the corner portion compared to the vicinity of the side portion among the vicinities of the end portion. The separation trigger is preferably formed in the form of a solid line or a dashed line by continuous or intermittent irradiation with laser light, in which case separation is performed easily.

There is no particular limitation on a laser used to form a separation trigger. For example, a continuous wave laser or a pulsed oscillation laser can be used. Note that a condition for laser light irradiation such as frequency, power density, energy density, or beam profile is controlled as appropriate in consideration of thicknesses, materials, or the like of the formation substrate and the separation layer.

A separation trigger can be prevented from being formed in both the separation layer 203 and the separation layer 223 by irradiating a region that overlaps with the separation layer 203 and does not overlap with the separation layer 223 with laser light. Therefore, there is preferably a small restrict on the laser light irradiation conditions. Although laser light irradiation may be performed from either substrate side at this time, it is preferable to perform laser light irradiation from the formation substrate 201 side in which the separation layer 203 is provided so that irradiation of the functional element or the like with scattered light can be suppressed.

Then, the insulating layer 813 and the formation substrate 201 are separated from each other from the formed separation trigger (FIG. 13B).

At this time, one of the formation substrates is preferably fixed to a suction stage or the like. For example, the formation substrate 201 may be fixed to the suction stage to separate the layer to be separated from the formation substrate 201. Alternatively, the formation substrate 221 may be fixed to the suction stage to separate the formation substrate 201 from the separation substrate 221.

For example, the layer to be separated and the formation substrate 201 may be separated by mechanical force (a peeling process with a human hand or a gripper, a peeling process by rotation of a roller, or the like) by utilizing the separation trigger.

The formation substrate 201 and the layer to be separated may be separated by filling the interface between the separation layer 203 and the layer to be separated with a liquid such as water. A portion between the separation layer 203 and the insulating layer 813 absorbs a liquid through capillarity action, so that the separation layer 203 can be separated easily. Furthermore, an adverse effect on the functional element included in the layer to be separated due to static electricity caused at separation (e.g., a phenomenon in which a semiconductor element is broken by static electricity) can be suppressed. Note that liquid can be sprayed in the form of mist or steam. As the liquid, pure water is preferably used. It is also possible to use an organic solvent or the like. A neutral, alkaline, or acid aqueous solution, an aqueous solution in which salt is dissolved may be used, for example. Alternatively, a hydrogen peroxide solution or a mixed solution of ammonia water and a hydrogen peroxide solution may be used.

Note that after the separation, the sealing layer 823, the partition 828, or the like which does not contribute to attachment between the layer to be separated and the formation substrate 221 and which remains over the formation substrate 221 may be removed. By such removal, an adverse effect on the functional element in a subsequent step (e.g., entry of impurities) can be preferably suppressed. For example, an unnecessary layer can be removed by wiping or cleaning. The separation layer remaining on the layer to be separated side may be removed. To remove the layer containing tungsten oxide, water or an alkaline aqueous solution can be used. A mixed solution of ammonia water and a hydrogen peroxide solution, a hydrogen peroxide solution, an ethanol aqueous solution, or the like can also be used. Since the rate at which the tungsten oxide film can be removed depends on the temperature of water or a solution, the water or the solution may be selected as appropriate. For example, water at a temperature of approximately 60° C. can remove the tungsten oxide film more easily than water at room temperature.

Although a separation trigger is formed using laser light in this embodiment, any of a variety of methods can be used as appropriate for the separation process. For example, when a layer including a metal oxide film is formed as the separation layer on the side in contact with the layer to be separated, the metal oxide film is embrittled by crystallization, whereby the layer to be separated can be separated from the formation substrate. Alternatively, when an amorphous silicon film containing hydrogen is formed as the separation layer between a formation substrate having high heat resistance and a layer to be separated, the amorphous silicon film is removed by laser light irradiation or etching, whereby the layer to be separated can be separated from the formation substrate. Alternatively, after a layer including a metal oxide film is formed as the separation layer on the side in contact with the layer to be separated, the metal oxide film is embrittled by crystallization, and part of the separation layer is removed by etching using a solution or a fluoride gas such as $NF_3$, $BrF_3$, or $ClF_3$, whereby the separation can be performed at the embrittled metal oxide film. Further alternatively, a method carried out as follows may be employed: a film containing nitrogen, oxygen, hydrogen, or the like (e.g., an amorphous silicon film containing hydrogen, an alloy film containing hydrogen, an alloy film containing oxygen, or the like) is used as the separation layer, and the separation layer is irradiated with laser light to release the nitrogen, oxygen, or hydrogen contained in the separation layer as gas, thereby promoting separation between the layer to be separated and the formation substrate. Alternatively, it is possible to use a method in which the formation substrate provided with the layer to be separated is removed mechanically or by etching using a solution or a fluoride gas such as $NF_3$, $BrF_3$, or $ClF_3$, or the like. In this case, the separation layer is not necessarily provided.

When a plurality of the above-described separation methods are combined, the separation process can be conducted easily. In other words, separation can be performed with physical force (by a machine or the like) after performing laser light irradiation, etching on the separation layer with a gas, a solution, or the like, or mechanical removal with a sharp knife, scalpel or the like so that the separation layer and the layer to be separated can be easily separated from each other.

As another separation method, in the case where the separation layer is formed using tungsten, it is preferable that the separation be performed while etching the separation layer using a mixed solution of ammonium water and a hydrogen peroxide solution.

Next, the exposed insulating layer 813 is attached to the substrate 801 with the bonding layer 811, and the bonding layer 811 is cured (FIGS. 14A and 14B). Here, a frame-shaped partition 829 and the bonding layer 811 on the inner side than the partition 829 are provided and then the insulating layer 813 and the substrate 801 are attached to each other.

The bonding layer 811 is positioned to overlap with the separation layer 223. When there is a region where the bonding layer 811 does not overlap with the separation layer 223, failure of separation is likely to occur depending on the area of the region and a degree of adhesion between the bonding layer 811 and a layer in contact therewith. Thus, an end portion of the bonding layer 811 is preferably positioned on an inner side than an end portion of the separation layer 223. Note that the end portion of the bonding layer 811 and that of the separation layer 223 may overlap with each other. Accordingly, strong adhesion between the substrate 801 and the formation substrate 221 can be suppressed; thus, a decrease in yield of a subsequent peeling process can be suppressed.

End portions of the bonding layer 811 and the partition 829 may overlap with an end portion of the insulating layer 813, may be positioned on an inner side than an end portion of the insulating layer 813, or may be positioned on an outer side than the end portion of the insulating layer 813. FIG. 14A illustrates an example in which the end portion of the partition 829 and that of the insulating layer 813 overlap with each other, and FIG. 14B illustrates an example in which the end portion of the bonding layer 811 and that of the partition 829 are positioned on an outer side than the end portion of the insulating layer 813.

Note that the insulating layer 813 and the substrate 801 are preferably attached to each other in a reduced-pressure atmosphere.

Next, a separation trigger is formed by laser light irradiation (FIGS. 14A and 14B).

In the example described here, the bonding layer 811 is in a cured state and the partition 829 is not in a cured state, and the bonding layer 811 in a cured state is irradiated with laser light. Part of the first layer (i.e., the insulating layer 843, or a layer that is included in the insulating layer 843 and that is in contact with the separation layer 223) is removed, whereby the separation trigger can be formed (see a region surrounded by a dotted line in FIGS. 14A or 14B). At this time, not only the first layer but also the separation layer 223, the sealing layer 823, or another layer included in the layer to be separated may be partly removed.

It is preferable that laser light irradiation be performed from the formation substrate 221 side in which the separation layer 223 is provided.

Figure 15A:
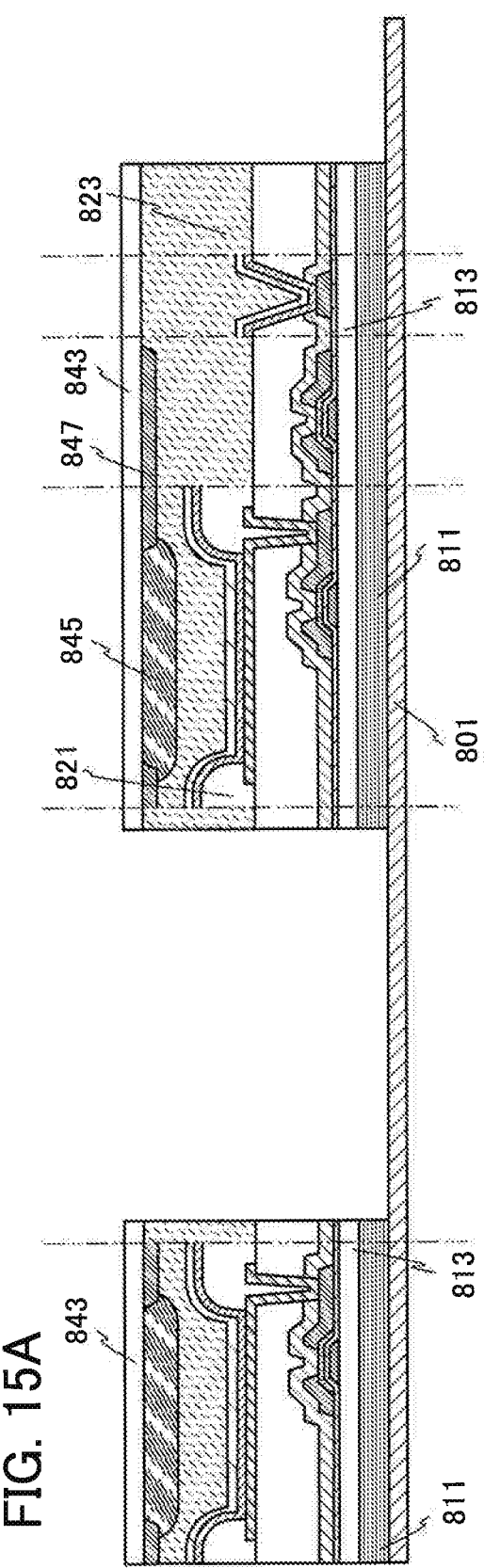
FIGS. 15A and 15B illustrate examples of a method for manufacturing a light-emitting device.
Figure 15B:
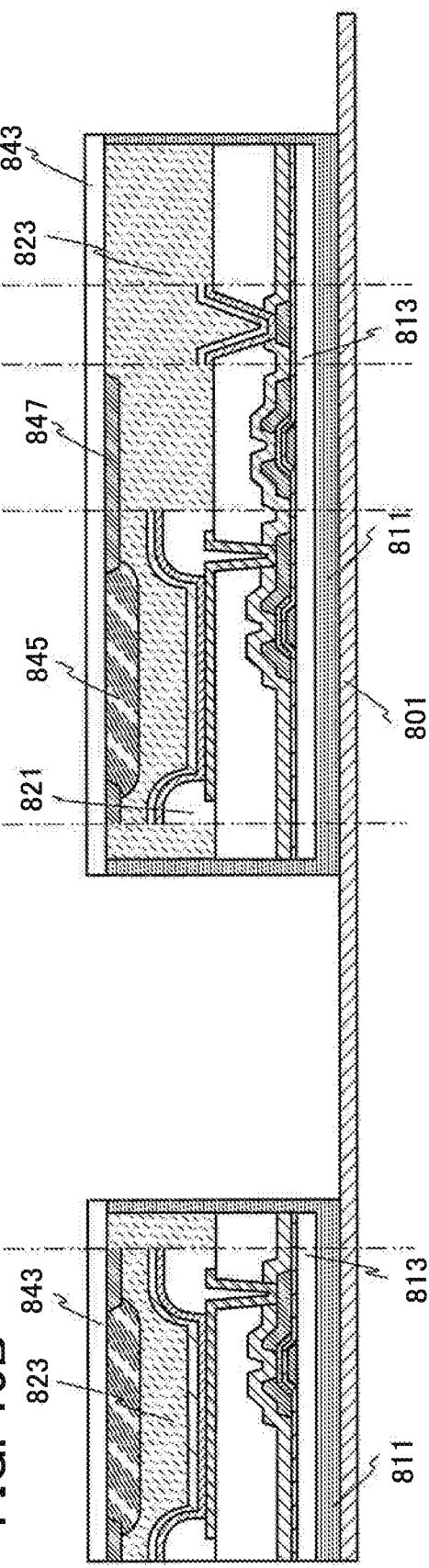

Then, the insulating layer 843 and the formation substrate 221 are separated from each other from the formed separation trigger (FIGS. 15A and 15B). In the above manner, the layers to be separated that are formed over the formation substrate 201 and the formation substrate 221 can be transferred to the substrate 801.

After that, the exposed insulating layer 843 and the substrate 803 are attached to each other with the use of the bonding layer 841. FIG. 16A illustrates an example in which this step is performed after the step illustrated in FIG. 15A.

Then, an opening is formed in the insulating layer 843 and the sealing layer 823 to expose the conductive layer 857. In the case where the substrate 803 overlaps with the conductive layer 857, the opening is formed also in the substrate 803 and the bonding layer 841 so that the conductive layer 857 is exposed.

There is no particular limitation on the method for forming the opening and the method may be, for example, a laser ablation method, an etching method, an ion beam sputtering method, or the like. As another method, a slit may be made in a film over the conductive layer 857 with a needle, a sharp knife such as a cutter, or the like and part of the film may be peeled by physical force.

For example, the removed region of the film leads to removal of the substrate 803, the bonding layer 841, the insulating layer 843, the sealing layer 823, the EL layer 862, and the conductive layer 864 each overlapping with the conductive layer 857 (FIG. 16B). For example, an adhesive roller is pressed to the substrate 803 and the roller is rolled and moved relatively. Alternatively, an adhesive tape may be attached to the substrate 803 and then peeled. Adhesion between the EL layer 862 and the conductive layer 864 and adhesion between layers included in the EL layer 862 are low; therefore, separation occurs at an interface between the EL layer 862 and the conductive layer 864 or in the EL layer 862. Accordingly, a region where the substrate 803, the bonding layer 841, the insulating layer 843, the sealing layer 823, the EL layer 862, or the conductive layer 864 overlaps with the conductive layer 857 can be removed selectively. Note that in the case where the EL layer 862 or the like remains over the conductive layer 857, it may be removed with an organic solvent or the like.

Note that there is no limitation on a method for removing the layer overlapping with the conductive layer 857 as long as the conductive layer 857 can be exposed and can be electrically connected to the FPC 808 in subsequent steps. The EL layer 862 or the conductive layer 864 does not necessarily overlap with the conductive layer 857. For example, the conductive layer 864 is not necessarily provided in the case where separation occurs in the EL layer 862. Moreover, when the EL layer 862 and the sealing layer 823 are in contact with each other, for example, materials of the two layers might be mixed or an interface between the layers might become unclear depending on the material to be used. In such a case, the conductive layer 864 is preferably provided between the EL layer 862 and the sealing layer 823 so as to suppress a reduction of the reliability of the light-emitting device.

Finally, the FPC 808 is attached to each electrode (conductive layer 857) of an input-output terminal portion with the use of an anisotropic conductive member (connector 825). An IC chip or the like may be mounted if necessary. Note that when the flexible substrate warps easily, the attachment accuracy might deteriorate at the time of attachment of the FPC or a TCP. Therefore, the manufactured device may be supported by glass, silicone rubber, or the like at the time of attachment of the FPC or the TCP. Thus, the electrical connection of the FPC or the TCP to the functional element can be performed surely.

A region which is positioned between the two light-emitting units and in which the substrate 801 and the substrate 803 are directly attached to each other with the bonding layer 841 is the joint portion 809 of the light-emitting device of one embodiment of the present invention. Note that a region Y which is formed in an end portion of the light-emitting device and in which the substrate 801 and the substrate 803 are directly attached to each other with the bonding layer 841 may be removed when not needed. When the region Y is small, the light-emitting device can obtain a narrow bezel. In that case, when the light-emitting device is bent to make the light-emitting units adjacent to each other without the joint portion positioned therebetween (for example, see FIG. 6A2), a seam between the light-emitting units can be small (narrow), and a light-emitting region with high browsability can be obtained.

As illustrated in FIG. 17C and FIGS. 18A and 18B, a plurality of light-emitting units can be fabricated with the use of one island-like separation layer 203. This method can be used when the insulating layer 813 and the insulating layer 843 are positioned in the joint portion 809, for example. FIG. 17C and FIGS. 18A and 18B show the case where the joint portion 809 includes the substrate 801, the substrate 803, the insulating layer 813, the insulating layer 843, the sealing layer 823, the bonding layer 811, and the bonding layer 841. By this method, the light-emitting device illustrated in FIGS. 17A and 17B and the like can also be fabricated.

In the above method for manufacturing the light-emitting device of one embodiment of the present invention, separation is performed after the following steps: the pair of formation substrates each provided with the separation layer and the layer to be separated are attached to each other, the separation trigger is formed by laser light irradiation, and then the interface between each separation layer and each layer to be separated is made in a state where separation can be easily performed. Accordingly, the yield of the peeling process can be improved.

In addition, attachment of a substrate over which a device is formed can be performed after the following procedure: a pair of formation substrates each provided with the layer to be separated are attached to each other and then, separation is performed. Therefore, formation substrates having low flexibility can be attached to each other when the layers to be separated are attached to each other, whereby alignment accuracy at the time of attachment can be improved as compared to the case where flexible substrates are attached to each other.

This embodiment can be combined with any other embodiment as appropriate.

Embodiment 3

In this embodiment, the structure of a foldable touch panel will be described with reference to FIGS. 19A to 19C, FIGS. 20A and 20B, FIGS. 21A to 21C, and FIGS. 22A to 22C. Note that Embodiment 2 can be referred to for the material of each layer. Although a touch panel formed using an organic EL element is described in this embodiment, one embodiment of the present invention is not limited thereto and can be a touch panel formed using any of the other elements described in Embodiment 1, for example.

Structural Example 1

Figure 19A:
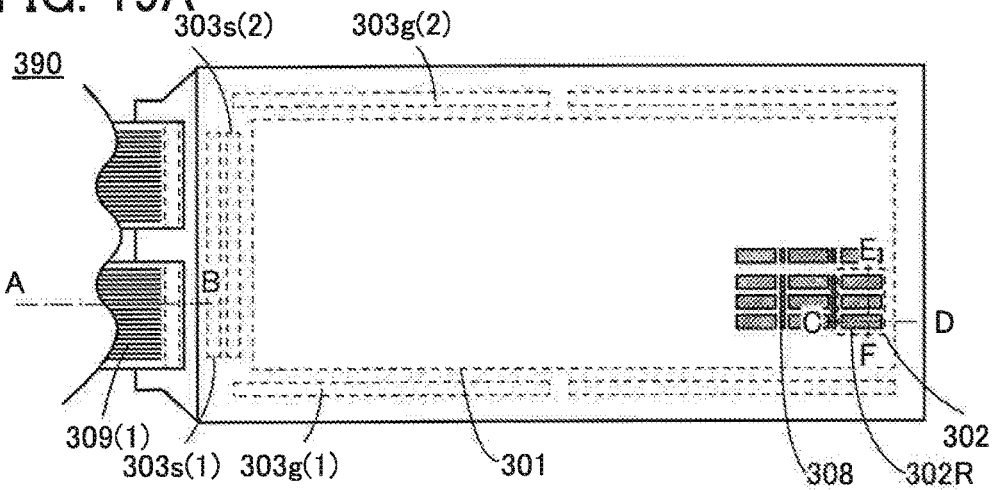
FIGS. 19A to 19C illustrate an example of a touch panel.
Figure 19B:
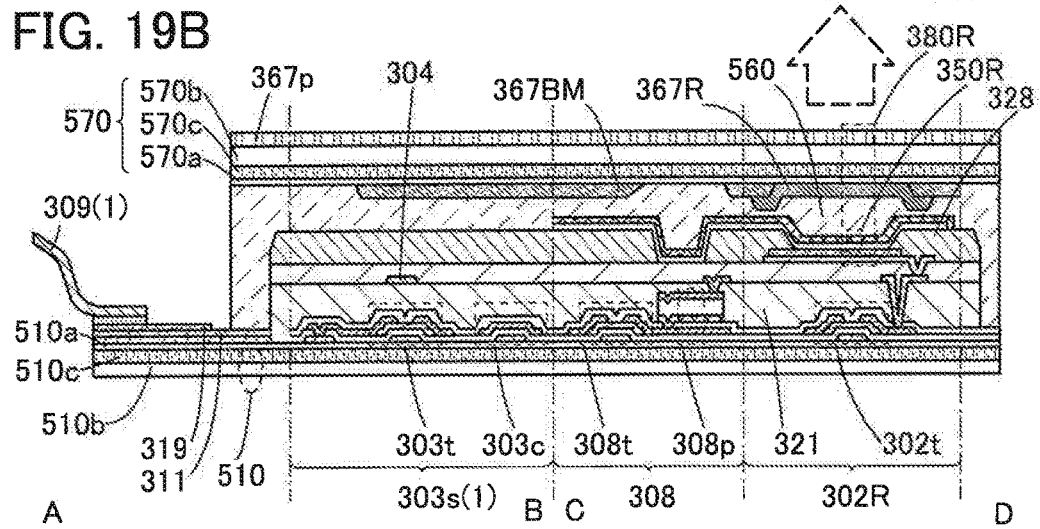
Figure 19C:
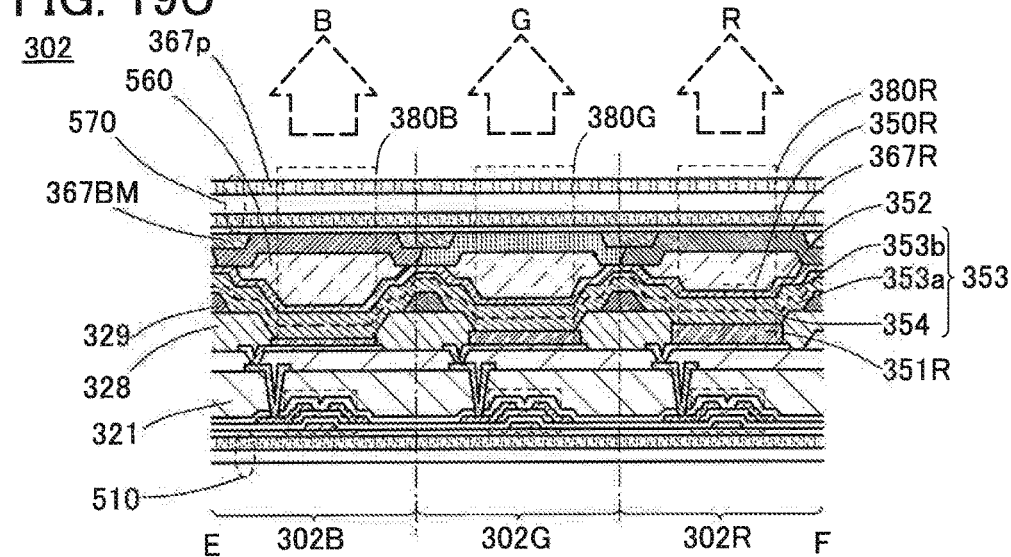

FIG. 19A is a top view of the touch panel. FIG. 19B is a cross-sectional view taken along dashed-dotted line A-B and dashed-dotted line C-D in FIG. 19A. FIG. 19C is a cross-sectional view taken along dashed-dotted line E-F in FIG. 19A.

As illustrated in FIG. 19A, a touch panel 390 includes a display portion 301.

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the touch panel 390 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The touch panel 390 is provided with an imaging pixel driver circuit 303g(2) that can supply control signals to the imaging pixels 308 and an imaging signal line driver circuit 303s(2) that reads out imaging signals.

As illustrated in FIG. 19B, the touch panel 390 includes a substrate 510 and a substrate 570 that faces the substrate 510.

Flexible materials can be favorably used for the substrate 510 and the substrate 570.

Materials with which passage of impurities is inhibited can be favorably used for the substrate 510 and the substrate 570. For example, materials with a vapor permeability of lower than or equal to $10^{-5}$ g/m$^2$·day, preferably lower than or equal to $10^{-6}$ g/m$^2$·day can be favorably used.

The substrate 510 can be favorably formed using a material whose coefficient of linear expansion is substantially equal to that of the substrate 570. For example, the coefficient of linear expansion of the materials are preferably lower than or equal to $1 \times 10^{-3}$/K, further preferably lower than or equal to $5 \times 10^{-5}$/K, and still further preferably lower than or equal to $1 \times 10^{-5}$/K.

The substrate 510 is a stacked body including a flexible substrate 510b, an insulating layer 510a that prevents diffusion of impurities to the light-emitting elements, and an adhesive layer 510c that bonds the insulating layer 510a to the flexible substrate 510b.

The substrate 570 is a stacked body including a flexible substrate 570b, an insulating layer 570a that prevents diffusion of impurities to the light-emitting elements, and an adhesive layer 570c that bonds the insulating layer 570a to the flexible substrate 570b.

For example, materials that include polyester, polyolefin, polyamide (e.g., nylon, aramid), polyimide, polycarbonate, or a resin having an acrylic bond, a urethane bond, an epoxy bond, or a siloxane bond can be used for the adhesive layer.

A sealing layer 560 bonds the substrate 570 to the substrate 510. The sealing layer 560 has a refractive index higher than that of air. The pixel circuits and the light-emitting elements (e.g., a light-emitting element 350R) are provided between the substrate 510 and the substrate 570.

Each of the pixels 302 includes the sub-pixel 302R, a sub-pixel 302G, and a sub-pixel 302B (FIG. 19C). The sub-pixel 302R includes a light-emitting module 380R, the sub-pixel 302G includes a light-emitting module 380G, and the sub-pixel 302B includes a light-emitting module 380B.

For example, the sub-pixel 302R includes the light-emitting element 350R and the pixel circuit that can supply electric power to the light-emitting element 350R and includes a transistor 302t (FIG. 19B). Furthermore, the light-emitting module 380R includes the light-emitting element 350R and an optical element (e.g., a coloring layer 367R).

The light-emitting element 350R includes a lower electrode 351R, an upper electrode 352, and an EL layer 353 between the lower electrode 351R and the upper electrode 352 (FIG. 19C).

The EL layer 353 includes a first EL layer 353a, a second EL layer 353b, and an intermediate layer 354 between the first EL layer 353a and the second EL layer 353b.

The light-emitting module 380R includes the coloring layer 367R on the substrate 570. The coloring layer transmits light of a particular wavelength and is, for example, a layer that selectively transmits light of red, green, or blue color. Note that a region that transmits light emitted from the light-emitting element as it is may be provided as well.

The light-emitting module 380R, for example, includes a sealing layer 560 that is in contact with the light-emitting element 350R and the coloring layer 367R.

The coloring layer 367R is positioned in a region overlapping with the light-emitting element 350R. Accordingly, part of light emitted from the light-emitting element 350R passes through the sealing layer 560 and the coloring layer 367R and is emitted to the outside of the light-emitting module 380R as indicated by arrows in FIGS. 19B and 19C.

The touch panel 390 includes a light-blocking layer 367BM on the substrate 570. The light-blocking layer 367BM is provided so as to surround the coloring layer (e.g., the coloring layer 367R).

The touch panel 390 includes an anti-reflective layer 367p positioned in a region overlapping with the display portion 301. As the anti-reflective layer 367p, a circular polarizing plate can be used, for example.

The touch panel 390 includes an insulating layer 321. The insulating layer 321 covers the transistor 302t. Note that the insulating layer 321 can be used as a layer for planarizing unevenness caused by the pixel circuits. An insulating film on which a layer that can prevent diffusion of impurities to the transistor 302t and the like is stacked can be used as the insulating layer 321.

The touch panel 390 includes the light-emitting elements (e.g., the light-emitting element 350R) over the insulating layer 321.

The touch panel 390 includes, over the insulating layer 321, a partition 328 that overlaps with an end portion of the lower electrode 351R. In addition, a spacer 329 that controls the distance between the substrate 510 and the substrate 570 is provided on the partition 328.

The image signal line driver circuit 303s(1) includes a transistor 303t and a capacitor 303c. Note that the driver circuit can be formed in the same process and over the same substrate as those of the pixel circuits. As illustrated in FIG. 19B, the transistor 303t may include a second gate 304 over the insulating layer 321. The second gate 304 may be electrically connected to a gate of the transistor 303t. Alternatively, different potentials may be supplied to the second gate 304 and the gate of the transistor 303t. The second gate 304 may be provided in a transistor 308t, the transistor 302t, or the like if necessary.

The imaging pixels 308 each include a photoelectric conversion element 308p and an imaging pixel circuit for sensing light received by the photoelectric conversion element 308p. The imaging pixel circuit includes the transistor 308t.

For example, a PIN photodiode can be used as the photoelectric conversion element 308p.

The touch panel 390 includes a wiring 311 through which a signal can be supplied. The wiring 311 is provided with a terminal 319. Note that an FPC 309(1) through which a signal such as an image signal or a synchronization signal can be supplied is electrically connected to the terminal 319. Note that a printed wiring board (PWB) may be attached to the FPC 309(1).

Transistors formed in the same process can be used as the transistor 302*t*, the transistor 303*t*, the transistor 308*t*, and the like.

As a gate, source, and drain of a transistor, and a wiring and an electrode included in a touch panel, a single-layer structure or a stacked structure using any of metals such as aluminum, titanium, chromium, nickel, copper, yttrium, zirconium, molybdenum, silver, tantalum, and tungsten, or an alloy containing any of these metals as its main component can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. Copper containing manganese is preferably used because controllability of a shape by etching is increased.

Structural Example 2

Figure 20A:
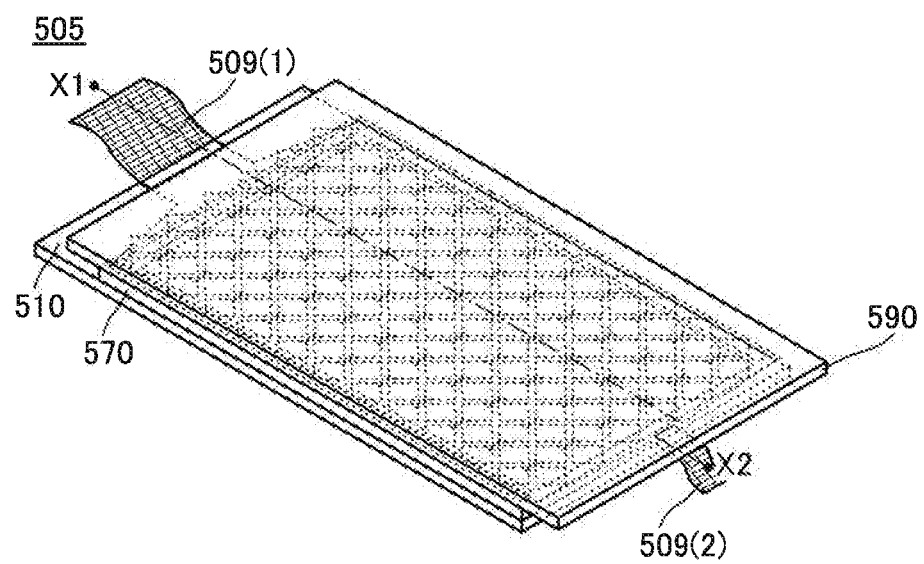
FIGS. 20A and 20B illustrate an example of a touch panel.
Figure 20B:
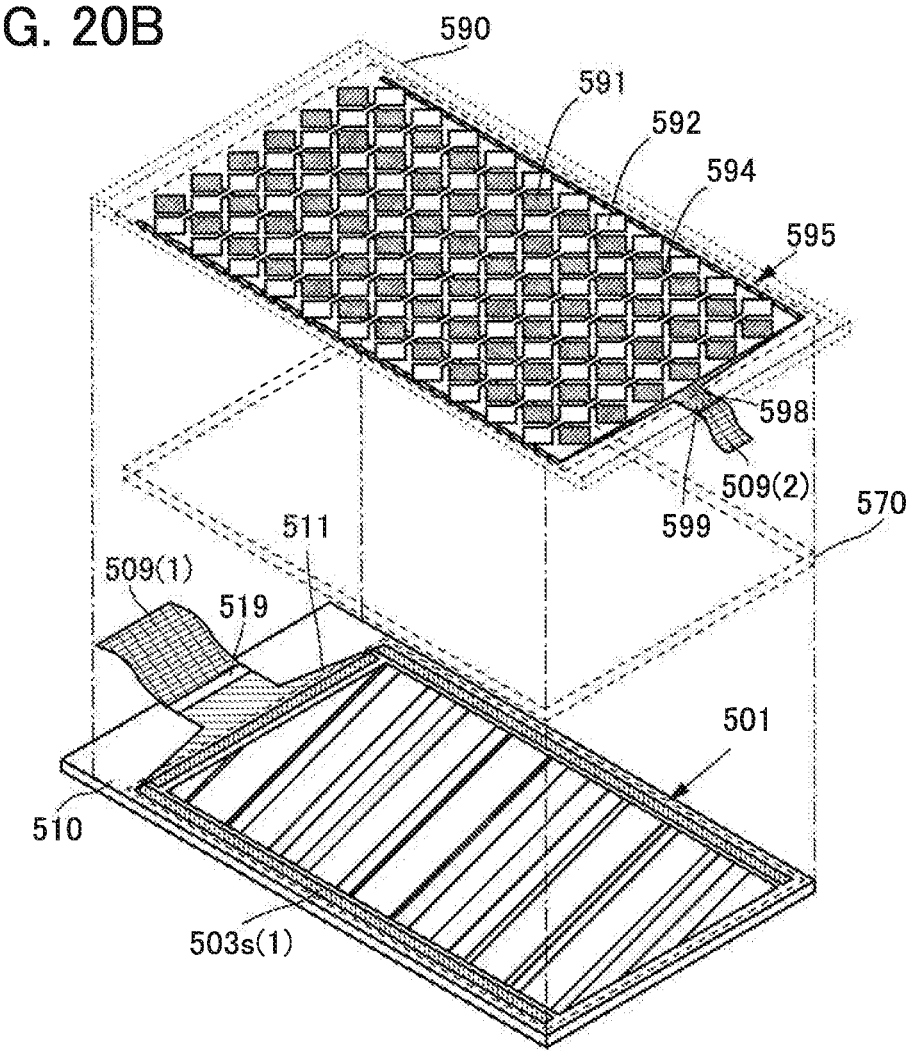
Figure 21A:
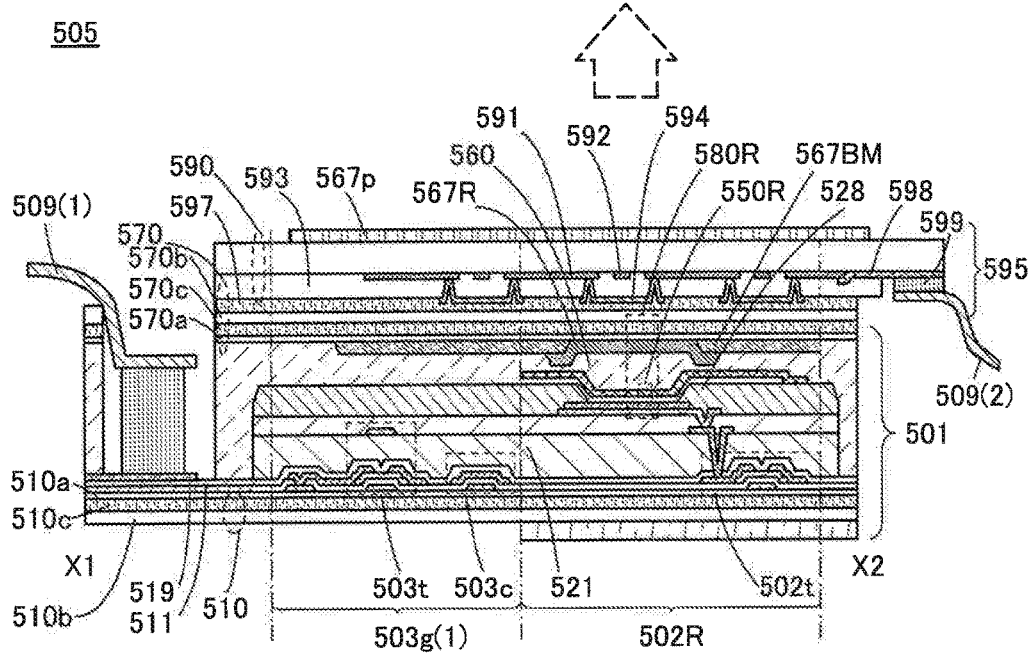
FIGS. 21A to 21C illustrate examples of a touch panel.
Figure 21B:
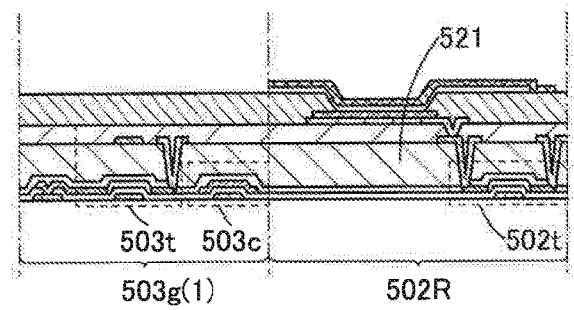
Figure 21C:
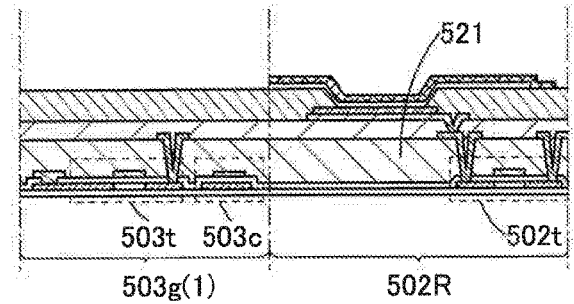

FIGS. 20A and 20B are perspective views of a touch panel 505. For simplicity, only main constituent parts are illustrated. FIGS. 21A to 21C are cross-sectional views along dashed-dotted line X1-X2 in FIG. 20A.

The touch panel 505 includes a display portion 501 and a touch sensor 595 (FIG. 20B). Furthermore, the touch panel 505 includes the substrate 510, the substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 are led to a peripheral portion of the substrate 510, and part of the plurality of wirings 511 form a terminal 519. The terminal 519 is electrically connected to an FPC 509(1).

The substrate 590 includes the touch sensor 595 and a plurality of wirings 598 electrically connected to the touch sensor 595. The plurality of wirings 598 are led to a peripheral portion of the substrate 590, and part of the plurality of wirings 598 form a terminal. The terminal is electrically connected to an FPC 509(2). Note that in FIG. 20B, electrodes, wirings, and the like of the touch sensor 595 provided on the back side of the substrate 590 (on the side that faces the substrate 510) are indicated by solid lines for clarity.

As the touch sensor 595, a capacitive touch sensor can be used. Examples of the capacitive touch sensor are a surface capacitive touch sensor and a projected capacitive touch sensor.

Examples of the projected capacitive touch sensor are a self-capacitive touch sensor and a mutual capacitive touch sensor, which differ mainly in the driving method. The use of a mutual capacitive touch sensor is preferable because multiple points can be sensed simultaneously.

An example of using a projected capacitive touch sensor will be described below with reference to FIG. 20B.

Note that a variety of sensors that can sense the closeness or the contact of a sensing target such as a finger can be used.

The projected capacitive touch sensor 595 includes first electrodes 591 and second electrodes 592. The first electrodes 591 are electrically connected to any of the plurality of wirings 598, and the second electrodes 592 are electrically connected to any of the other wirings 598.

The second electrodes 592 each have a shape of a plurality of quadrangles arranged in one direction with one corner of a quadrangle connected to one corner of another quadrangle as illustrated in FIGS. 20A and 20B.

The first electrodes 591 each have a quadrangular shape and are arranged in a direction intersecting with the direction in which the second electrodes 592 extend.

A wiring 594 electrically connects two first electrodes 591 between which one second electrode 592 is positioned. The intersecting area of the second electrode 592 and the wiring 594 is preferably as small as possible. Such a structure enables a reduction in the area of a region where the electrodes are not provided, reducing unevenness in transmittance. As a result, unevenness in luminance of light from the touch sensor 595 can be reduced.

Note that the shapes of the first electrodes 591 and the second electrodes 592 are not limited to the above-mentioned shapes and can be any of a variety of shapes. For example, a plurality of first electrodes each having a stripe shape may be arranged so that the space between two adjacent first electrodes are reduced as much as possible, and a plurality of second electrodes each having a stripe shape may be arranged so as to intersect the first electrodes with an insulating layer sandwiched between the first electrodes and the second electrodes. In that case, two adjacent second electrodes may be spaced apart from each other. Moreover, between the two adjacent second electrodes, a dummy electrode which is electrically insulated from these electrodes is preferably provided, whereby the area of a region having a different transmittance can be reduced.

The touch sensor 595 includes the substrate 590, the first electrodes 591 and the second electrodes 592 provided in a staggered arrangement on the substrate 590, an insulating layer 593 covering the first electrodes 591 and the second electrodes 592, and the wiring 594 that electrically connects the adjacent first electrodes 591 to each other.

An adhesive layer 597 bonds the substrate 590 to the substrate 570 so that the touch sensor 595 overlaps with the display portion 501 as illustrated in FIG. 20B and FIG. 21A.

The first electrodes 591 and the second electrodes 592 are formed using a light-transmitting conductive material. As the light-transmitting conductive material, a conductive oxide such as indium oxide, indium tin oxide, indium zinc oxide, zinc oxide, or zinc oxide to which gallium is added can be used. Note that a film including graphene may be used as well. The film containing graphene can be formed, for example, by reducing a film containing graphene oxide. As a reducing method, a method with application of heat or the like can be employed.

The first electrodes 591 and the second electrodes 592 may be formed by depositing a light-transmitting conductive material on the substrate 590 by a sputtering method and then removing an unnecessary portion by any of various patterning techniques such as photolithography.

Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the first electrodes 591 are formed in the insulating layer 593, and the wiring 594 electrically connects the adjacent first electrodes 591. A light-transmitting conductive material can be favorably used as the wiring 594 because the aperture ratio of the touch panel can be increased. Moreover, a material with higher conductivity than the conductivities of the first electrodes 591 and the second electrodes 592 can be favorably used for the wiring 594 because electric resistance can be reduced.

Each of the second electrodes 592 extends in one direction, and a plurality of second electrodes 592 are provided in the form of stripes.

The wiring 594 intersects with one of the second electrodes 592.

The adjacent first electrodes 591 are provided with one of the second electrodes 592 provided therebetween. The wiring 594 electrically connects the adjacent first electrodes 591.

Note that the plurality of first electrodes 591 are not necessarily arranged in the direction orthogonal to one of the second electrodes 592.

The wiring 598 is electrically connected to any of the first electrodes 591 and the second electrodes 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of various anisotropic conductive films (ACF), anisotropic conductive pastes (ACP), and the like can be used.

The adhesive layer 597 has a light-transmitting property. For example, a thermosetting resin or an ultraviolet curable resin can be used; specifically, a resin such as an acrylic resin, a urethane resin, an epoxy resin, or a resin having a siloxane bond can be used.

The display portion 501 includes a plurality of pixels arranged in a matrix. Each of the pixels includes a display element and a pixel circuit for driving the display element.

In this embodiment, an example of using an organic EL element that emits white light as a display element will be described; however, the display element is not limited to such element.

For example, organic EL elements that emit light of different colors may be included in sub-pixels so that the light of different colors can be emitted from the respective sub-pixels.

The substrate 510, the substrate 570, and the sealing layer 560 can have structures similar to those in Structural Example 1.

A pixel includes a sub-pixel 502R, and the sub-pixel 502R includes a light-emitting module 580R.

The sub-pixel 502R includes a light-emitting element 550R and a pixel circuit that can supply electric power to the light-emitting element 550R and includes a transistor 502t. Furthermore, the light-emitting module 580R includes the light-emitting element 550R and an optical element (e.g., a coloring layer 567R).

The light-emitting element 550R includes a lower electrode, an upper electrode, and an EL layer between the lower electrode and the upper electrode.

The light-emitting module 580R includes the coloring layer 567R on the light extraction side.

In the case where the sealing layer 560 is provided on the light extraction side, the sealing layer 560 is in contact with the light-emitting element 550R and the coloring layer 567R.

The coloring layer 567R is positioned in a region overlapping with the light-emitting element 550R. Accordingly, part of light emitted from the light-emitting element 550R passes through the coloring layer 567R and is emitted to the outside of the light-emitting module 580R as indicated by an arrow in FIG. 21A.

The display portion 501 includes a light-blocking layer 567BM on the light extraction side. The light-blocking layer 567BM is provided so as to surround the coloring layer (e.g., the coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. A stacked film including a layer that can prevent diffusion of impurities can be used as the insulating film 521. This can prevent the reliability of the transistor 502t or the like from being lowered by diffusion of impurities.

The display portion 501 includes the light-emitting elements (e.g., the light-emitting element 550R) over the insulating film 521.

The display portion 501 includes, over the insulating film 521, a partition 528 that overlaps with an end portion of a lower electrode. In addition, a spacer that controls the distance between the substrate 510 and the substrate 570 is provided on the partition 528.

A scan line driver circuit 503g(1) includes a transistor 503t and a capacitor 503c. Note that the driver circuit can be formed in the same process and over the same substrate as those of the pixel circuits.

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

The display portion 501 includes wirings such as scan lines, signal lines, and power supply lines. Any of various conductive films described above can be used as the wirings.

Note that any of various kinds of transistors can be used in the display portion 501. A structure in the case of using bottom-gate transistors in the display portion 501 is illustrated in FIGS. 21A and 21B.

For example, a semiconductor layer containing an oxide semiconductor, amorphous silicon, or the like can be used in the transistor 502t and the transistor 503t illustrated in FIG. 21A.

For example, a semiconductor layer containing polycrystalline silicon that is obtained by crystallization process such as laser annealing can be used in the transistor 502t and the transistor 503t illustrated in FIG. 21B.

A structure in the case of using top-gate transistors in the display portion 501 is illustrated in FIG. 21C.

For example, a semiconductor layer including polycrystalline silicon, a single crystal silicon film that is transferred from a single crystal silicon substrate, or the like can be used in the transistor 502t and the transistor 503t illustrated in FIG. 21C.

Structural Example 3

Figure 22A:
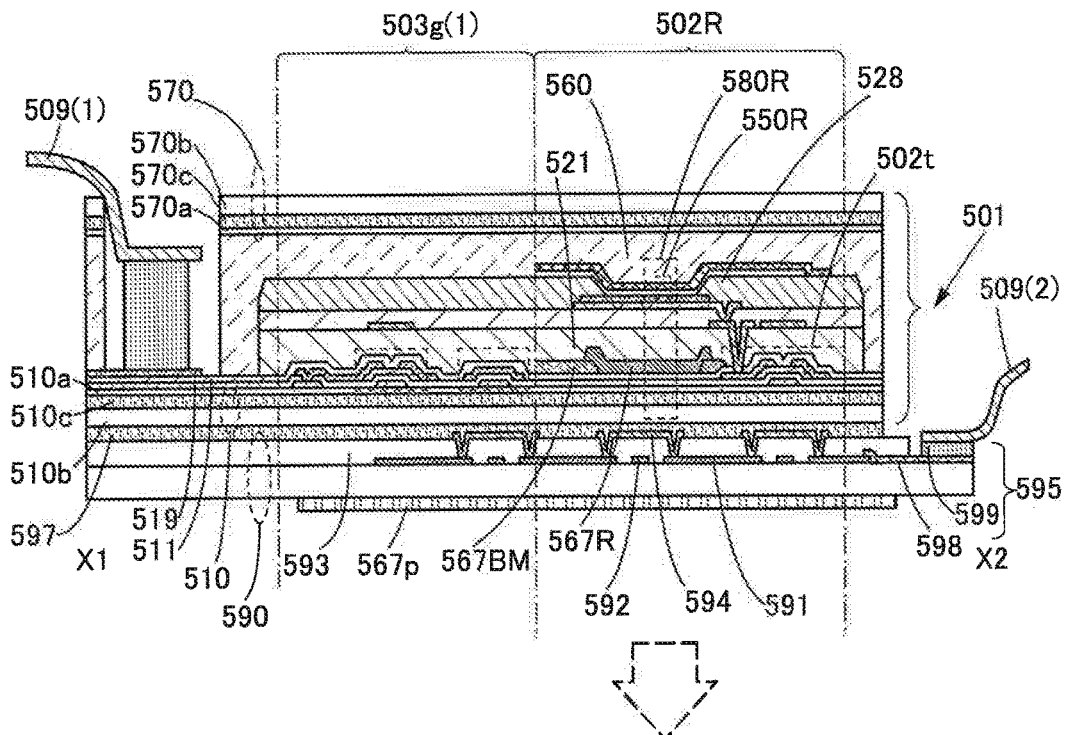
FIGS. 22A to 22C illustrate examples of a touch panel.
Figure 22B:
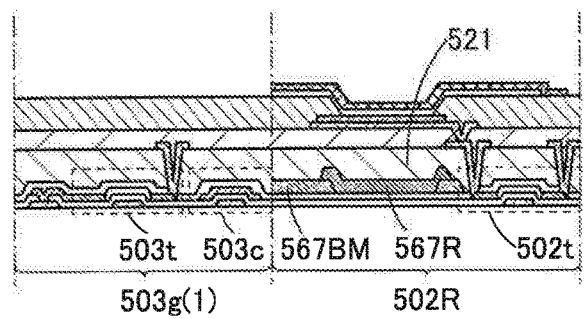
Figure 22C:
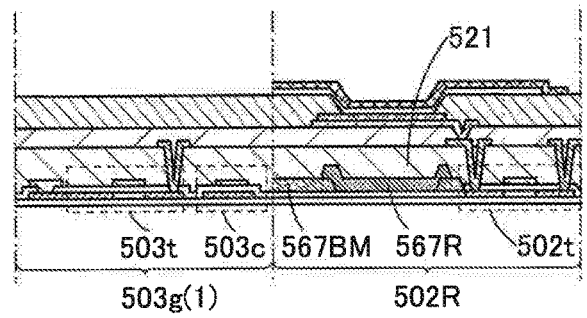

FIGS. 22A to 22C are cross-sectional views of a touch panel 505B. The touch panel 505B described in this embodiment is different from the touch panel 505 described in Structural Example 2 in that the display portion 501 displays received image data to the side where the transistors are provided and that the touch sensor is provided on the substrate 510 side of the display portion. Different structures will be described in detail below, and the above description is referred to for the other similar structures.

The coloring layer 567R is positioned in a region overlapping with the light-emitting element 550R. The light-emitting element 550R illustrated in FIG. 22A emits light to the side where the transistor 502t is provided. Accordingly, part of light emitted from the light-emitting element 550R passes through the coloring layer 567R and is emitted to the outside of the light-emitting module 580R as indicated by an arrow in FIG. 22A.

The display portion 501 includes the light-blocking layer 567BM on the light extraction side. The light-blocking layer 567BM is provided so as to surround the coloring layer (e.g., the coloring layer 567R).

The touch sensor 595 is provided on the substrate 510 side of the display portion 501 (FIG. 22A).

The adhesive layer 597 is provided between the substrate 510 and the substrate 590 and bonds the touch sensor 595 to the display portion 501.

Note that any of various kinds of transistors can be used in the display portion 501. A structure in the case of using bottom-gate transistors in the display portion 501 is illustrated in FIGS. 22A and 22B.

For example, a semiconductor layer containing an oxide semiconductor, amorphous silicon, or the like can be used in the transistor 502t and the transistor 503t illustrated in FIG. 22A.

For example, a semiconductor layer containing polycrystalline silicon or the like can be used in the transistor 502t and the transistor 503t illustrated in FIG. 22B.

A structure in the case of using top-gate transistors in the display portion 501 is illustrated in FIG. 22C.

For example, a semiconductor layer containing polycrystalline silicon, a transferred single crystal silicon film, or the like can be used in the transistor 502t and the transistor 503t illustrated in FIG. 22C.

This embodiment can be combined with any other embodiment as appropriate.

This application is based on Japanese Patent Application serial no. 2014-026273 filed with Japan Patent Office on Feb. 14, 2014, the entire contents of which are hereby incorporated by reference.

What is claimed is:

1. A light-emitting device comprising:
a first light-emitting unit comprising:
a first insulating layer over a substrate;
a first transistor over the first insulating layer;
a first light-emitting element electrically connected to the first transistor; and
a bonding layer over the first light-emitting element;
a second light-emitting unit comprising:
a second insulating layer over the substrate;
a second transistor over the second insulating layer;
a second light-emitting element electrically connected to the second transistor; and
the bonding layer over the second light-emitting element; and
a joint portion between the first light-emitting unit and the second light-emitting unit, the joint portion comprising the bonding layer over the substrate,
wherein the bonding layer is in contact with a side surface of the first insulating layer and a side surface of the second insulating layer.

2. The light-emitting device according to claim 1, wherein the bonding layer is in direct contact with the substrate.

3. The light-emitting device according to claim 1, wherein the substrate is a flexible substrate comprising an organic material.

4. The light-emitting device according to claim 1, further comprising:
a first flexible printed circuit in the first light-emitting unit; and
a second flexible printed circuit in the second light-emitting unit.

5. The light-emitting device according to claim 1, further comprising a first driver circuit and a second driver circuit, wherein the joint portion is provided between the first driver circuit and the second driver circuit.

6. The light-emitting device according to claim 1, wherein at least one of the first light-emitting unit and the second light-emitting unit is supplied with a signal by wireless communication.

7. The light-emitting device according to claim 1, wherein the bonding layer comprises an opening portion.

8. An electronic device comprising:
the light-emitting device according to claim 1; and
a secondary battery.

9. The electronic device according to claim 8, wherein the secondary battery is capable of being charged by contactless power transmission.

10. A light-emitting device comprising:
a first light-emitting unit comprising:
a first insulating layer over a substrate;
a first transistor over the first insulating layer;
a first light-emitting element electrically connected to the first transistor;
a first sealing layer covering the first light-emitting element; and
a second insulating layer over the first sealing layer;
a second light-emitting unit comprising:
a third insulating layer over the substrate;
a second transistor over the third insulating layer;
a second light-emitting element electrically connected to the second transistor;
a second sealing layer covering the second light-emitting element; and
the second insulating layer over the second sealing layer; and
a joint portion between the first light-emitting unit and the second light-emitting unit, the joint portion comprising:
the second insulating layer over the substrate; and
a partition in contact with the second insulating layer and a side surface of the first sealing layer.

11. The light-emitting device according to claim 10, wherein the partition is in direct contact with the substrate.

12. The light-emitting device according to claim 10, wherein the substrate is a flexible substrate comprising an organic material.

13. The light-emitting device according to claim 10, further comprising:
a first flexible printed circuit in the first light-emitting unit; and
a second flexible printed circuit in the second light-emitting unit.

14. The light-emitting device according to claim 10, further comprising a first driver circuit and a second driver circuit,
wherein the joint portion is provided between the first driver circuit and the second driver circuit.

15. The light-emitting device according to claim 10, wherein at least one of the first light-emitting unit and the second light-emitting unit is supplied with a signal by wireless communication.

16. The light-emitting device according to claim 10, wherein the first sealing layer comprises an opening portion.

17. An electronic device comprising:
the light-emitting device according to claim 10; and
a secondary battery.

18. The electronic device according to claim 17, wherein the secondary battery is capable of being charged by contactless power transmission.

* * * * *